United States Patent
Karlsson

(10) Patent No.: US 7,689,321 B2
(45) Date of Patent: Mar. 30, 2010

(54) ROBUST SENSOR FUSION FOR MAPPING AND LOCALIZATION IN A SIMULTANEOUS LOCALIZATION AND MAPPING (SLAM) SYSTEM

(75) Inventor: Lars Niklas Karlsson, Pasadena, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 1220 days.

(21) Appl. No.: 11/055,210

(22) Filed: Feb. 10, 2005

(65) Prior Publication Data

US 2005/0182518 A1    Aug. 18, 2005

Related U.S. Application Data

(60) Provisional application No. 60/544,486, filed on Feb. 13, 2004.

(51) Int. Cl.
G05B 19/18    (2006.01)
G01C 22/00    (2006.01)
B64C 13/18    (2006.01)

(52) U.S. Cl. .......... 700/253; 700/245; 701/26; 701/28; 701/250; 701/207; 318/587; 318/568.12; 318/568.16; 318/103

(58) Field of Classification Search .......... 700/253, 700/245; 701/24, 26, 250, 28, 23, 207, 211, 701/209; 219/540; 382/153, 157; 318/587, 318/568.16, 103, 568.12; 348/169, 119
See application file for complete search history.

(56) References Cited

U.S. PATENT DOCUMENTS

| | | | | |
|---|---|---|---|---|
| 4,628,453 A | * | 12/1986 | Kamejima et al. | 701/28 |
| 4,942,539 A | * | 7/1990 | McGee et al. | 700/253 |
| 4,954,692 A | * | 9/1990 | Shikama et al. | 219/540 |
| 4,954,962 A | * | 9/1990 | Evans et al. | 701/28 |
| 5,040,116 A | * | 8/1991 | Evans et al. | 701/28 |
| 5,109,425 A | * | 4/1992 | Lawton | 382/107 |
| 5,111,401 A | * | 5/1992 | Everett et al. | 701/24 |
| 5,144,685 A | * | 9/1992 | Nasar et al. | 382/153 |
| 5,155,775 A | * | 10/1992 | Brown | 382/153 |
| 5,321,614 A | * | 6/1994 | Ashworth | 701/26 |
| 5,525,882 A | * | 6/1996 | Asaka et al. | 318/568.16 |
| 5,525,883 A | * | 6/1996 | Avitzour | 318/587 |
| 5,581,629 A | * | 12/1996 | Hanna et al. | 382/103 |
| 5,793,934 A | * | 8/1998 | Bauer | 700/250 |

(Continued)

OTHER PUBLICATIONS

A computationally efficient solution to the simultaneous localisation and map building (SLAM) problem Dissanayake, G.; Durrant-Whyte, H.; Bailey, T. Robotics and Automation, 2000. Proceedings. ICRA '00. IEEE International Conference on vol. 2, 2000 pp. 1009-1014 vol. 2.*

(Continued)

Primary Examiner—Khoi Tran
Assistant Examiner—Ian Jen
(74) Attorney, Agent, or Firm—Andrew S. Naglestad

(57) ABSTRACT

This invention is generally related to methods and apparatus that permit the measurements from a plurality of sensors to be combined or fused in a robust manner. For example, the sensors can correspond to sensors used by a mobile device, such as a robot, for localization and/or mapping. The measurements can be fused for estimation of a measurement, such as an estimation of a pose of a robot.

21 Claims, 25 Drawing Sheets

U.S. PATENT DOCUMENTS

| | | | |
|---|---|---|---|
| 5,911,767 A * | 6/1999 | Garibotto et al. | 701/28 |
| 5,957,984 A * | 9/1999 | Rencken | 701/23 |
| 5,961,571 A * | 10/1999 | Gorr et al. | 701/207 |
| 6,005,610 A * | 12/1999 | Pingali | 348/169 |
| 6,108,597 A * | 8/2000 | Kirchner et al. | 701/23 |
| 6,269,763 B1 * | 8/2001 | Woodland | 114/382 |
| 6,285,393 B1 * | 9/2001 | Shimoura et al. | 348/119 |
| 6,427,118 B1 * | 7/2002 | Suzuki | 701/209 |
| 6,453,223 B1 * | 9/2002 | Kelly et al. | 701/28 |
| 6,459,955 B1 * | 10/2002 | Bartsch et al. | 700/245 |
| 6,496,754 B2 * | 12/2002 | Song et al. | 700/245 |
| 6,516,267 B1 * | 2/2003 | Cherveny et al. | 701/208 |
| 6,552,729 B1 * | 4/2003 | Di Bernardo et al. | 345/473 |
| 6,711,293 B1 * | 3/2004 | Lowe | 382/219 |
| 6,728,635 B2 * | 4/2004 | Hamada et al. | 701/211 |
| 6,766,245 B2 * | 7/2004 | Padmanabhan | 701/207 |
| 6,771,932 B2 * | 8/2004 | Caminiti et al. | 455/41.1 |
| 6,836,701 B2 * | 12/2004 | McKee | 700/245 |
| 6,898,518 B2 * | 5/2005 | Padmanabhan | 701/207 |
| 6,917,855 B2 * | 7/2005 | Gonzalez-Banos et al. | 700/245 |
| 6,922,632 B2 * | 7/2005 | Foxlin | 701/207 |
| 7,015,831 B2 * | 3/2006 | Karlsson et al. | 340/995.1 |
| 7,082,350 B2 * | 7/2006 | Skoog | 700/245 |
| 7,135,992 B2 * | 11/2006 | Karlsson et al. | 340/995.1 |
| 7,145,478 B2 * | 12/2006 | Goncalves et al. | 340/995.1 |
| 7,162,338 B2 * | 1/2007 | Goncalves et al. | 701/23 |
| 7,177,737 B2 * | 2/2007 | Karlsson et al. | 701/23 |
| 7,272,467 B2 * | 9/2007 | Goncalves et al. | 700/245 |
| 7,302,345 B2 * | 11/2007 | Kwon et al. | 702/5 |
| 2002/0072646 A1 * | 6/2002 | Irion | 600/9 |
| 2002/0072848 A1 * | 6/2002 | Hamada et al. | 701/211 |
| 2003/0007682 A1 * | 1/2003 | Koshizen et al. | 382/157 |
| 2003/0025472 A1 * | 2/2003 | Jones et al. | 318/568.12 |
| 2003/0030398 A1 * | 2/2003 | Jacobs et al. | 318/568.12 |
| 2003/0044048 A1 * | 3/2003 | Zhang et al. | 382/107 |
| 2004/0166148 A1 * | 8/2004 | Schenk et al. | 424/449 |
| 2004/0167667 A1 * | 8/2004 | Goncalves et al. | 700/245 |
| 2004/0167669 A1 * | 8/2004 | Karlsson et al. | 700/259 |
| 2004/0167670 A1 * | 8/2004 | Goncalves et al. | 700/259 |
| 2004/0167688 A1 * | 8/2004 | Karlsson et al. | 701/23 |
| 2004/0167716 A1 * | 8/2004 | Goncalves et al. | 701/217 |
| 2004/0168148 A1 * | 8/2004 | Goncalves et al. | 717/104 |
| 2005/0234679 A1 * | 10/2005 | Karlsson | 702/181 |
| 2006/0012493 A1 * | 1/2006 | Karlsson et al. | 340/995.24 |
| 2007/0090973 A1 * | 4/2007 | Karlsson et al. | 340/995.22 |

OTHER PUBLICATIONS

A solution to the simultaneous localization and map building (SLAM) problem Dissanayake, M.W.M.G.; Newman, P.; Clark, S.; Durrant-Whyte, H.F.; Csorba, M. Robotics and Automation, IEEE Transactions on vol. 17, Issue 3, Jun. 2001 pp. 229-241.*

Structured light 2D range finder for simultaneous localization and map-building (SLAM) in home environments Myung-Jin Jung; Hyun Myung; Sun-Gi Hong; Dong-Ryeol Park; Hyoung-Ki Lee; SeokWon Bang Micro-Nanomechatronics and Human Science, 2004 and The Fourth Symposium Micro-Nanomechatronics for Information-Based Society, 2004. Proceedings of the 2004.*

A closed form solution to the single degree of freedom simultaneous localisation and map building (SLAM) problem Gibbens, P.W.; Dissanayake, G.M.W.M.; Durrant-Whyte, H.F. Decision and Control, 2000. Proceedings of the 39th IEEE Conference on vol. 1, 2000 pp. 191-196 vol. 1.*

Using multiple SLAM algorithms Julier, S.J.; Uhlmann, J.K. Intelligent Robots and Systems, 2003. (IROS 2003). Proceedings. 2003 IEEE/RSJ International Conference on vol. 1, Oct. 27-31, 2003 pp. 200-205 vol. 1.*

An augmented state SLAM formulation for multiple line-of-sight features with millimetre wave RADAR Jose, E.; Adams, M.D. Intelligent Robots and Systems, 2005. (IROS 2005). 2005 IEEE/RSJ International Conference on Aug. 2-6, 2005 pp. 3087-3092.*

Simultaneous Localization and Map Building Using the Probabilistic Multi-Hypothesis Tracker Davey, S.J. Robotics, IEEE Transactions on [see also Robotics and Automation, IEEE Transactions on] vol. 23, Issue 2, Apr. 2007 pp. 271-280.*

* cited by examiner

FIG. 5A
(TOP VIEW)
LANDMARK RECORD CREATION
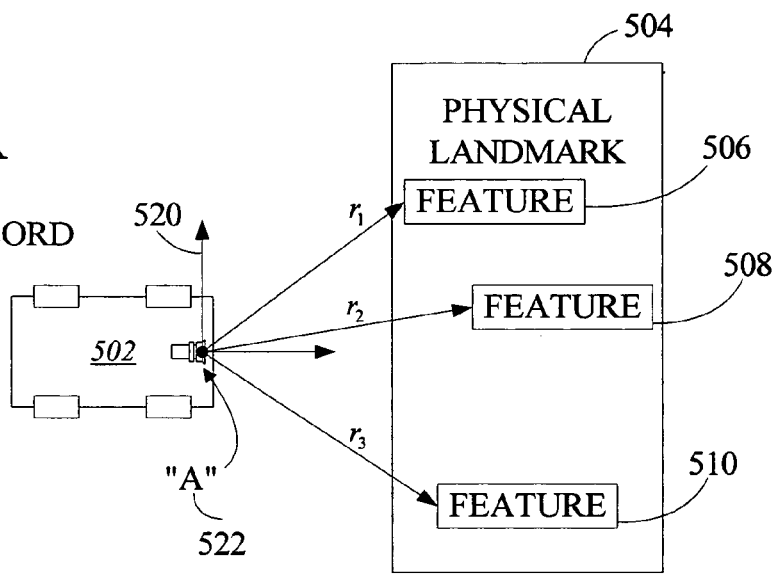
FIG. 5B
(TOP VIEW)
LANDMARK REVISIT
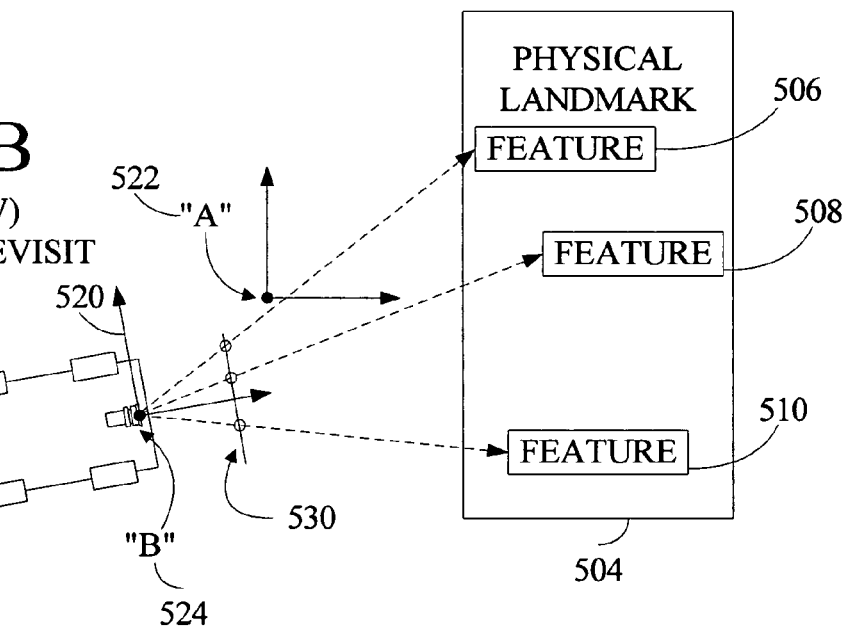
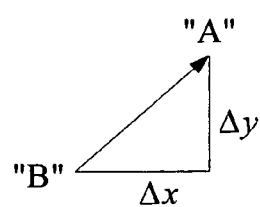
FIG. 5C
FIG. 5D

VISUAL PROCESSING

VISUAL FRONT END
LANDMARK
CREATION

SLAM NEW LANDMARK

PRE-FILTERING

SLAM REVIST LANDMARK

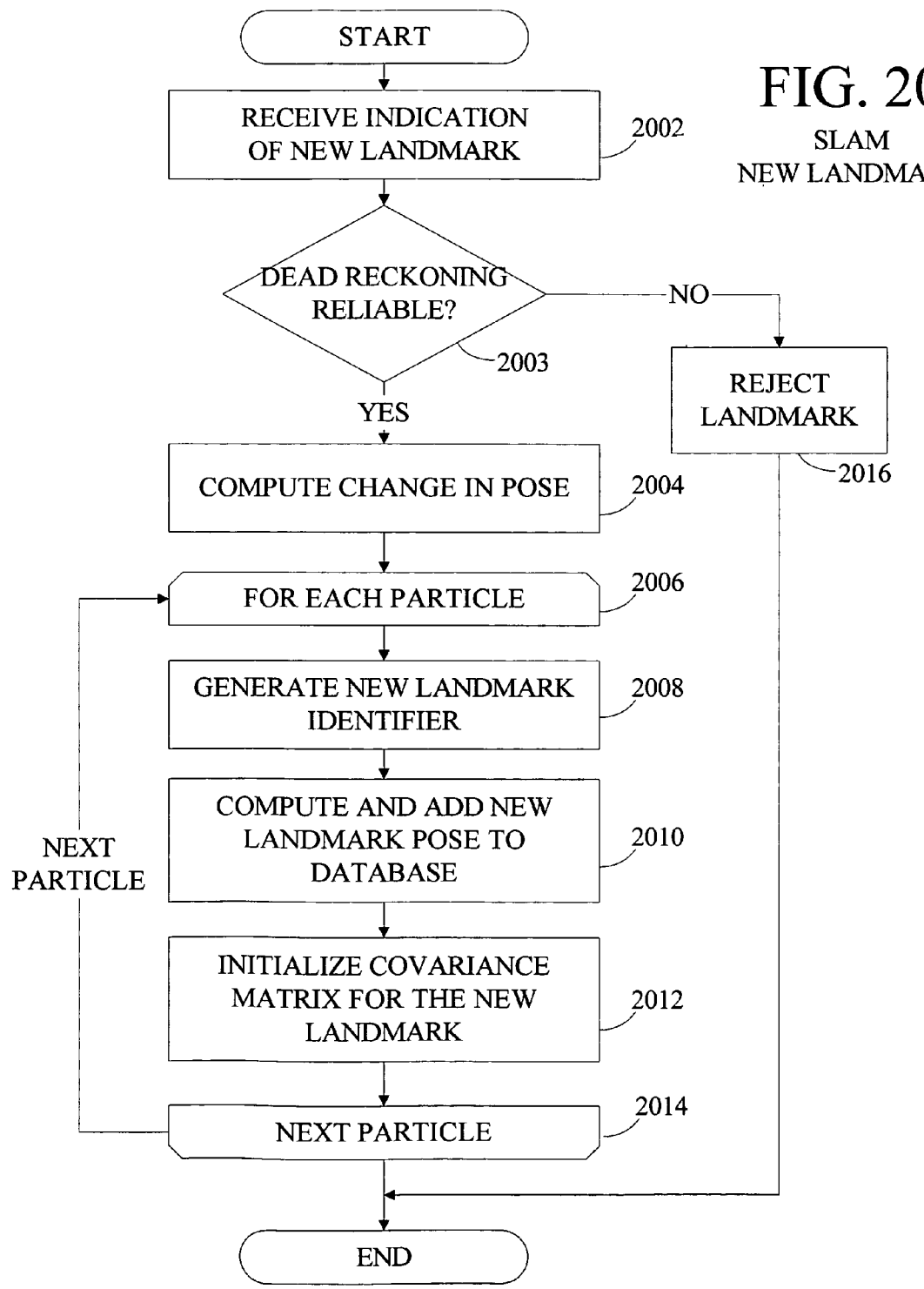

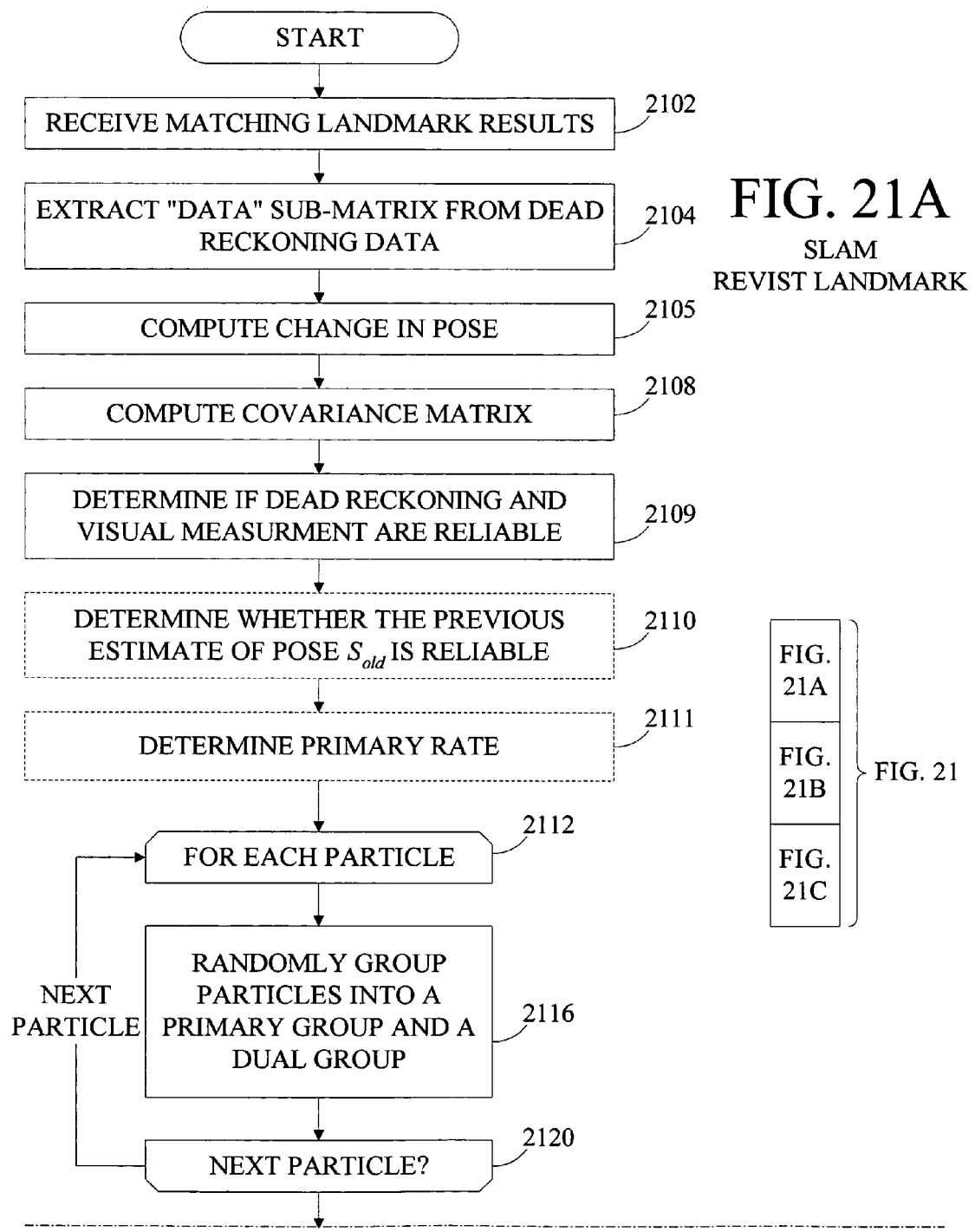

ROBUST SENSOR FUSION FOR MAPPING AND LOCALIZATION IN A SIMULTANEOUS LOCALIZATION AND MAPPING (SLAM) SYSTEM

RELATED APPLICATION

This application claims the benefit under 35 U.S.C. §119 (e) of U.S. Provisional Application No. 60/544,486, entitled "METHODS FOR ROBUST SENSOR FUSION," filed Feb. 13, 2004, the entirety of which is hereby incorporated by reference.

APPENDIX A

Appendix A, which forms a part of this disclosure, is a list of commonly owned copending U.S. patent applications. Each one of the applications listed in Appendix A is hereby incorporated herein in its entirety by reference thereto.

BACKGROUND

1. Field of the Invention

The invention generally relates to combining or fusing data from sensors. In particular, the invention relates to robust techniques for a robot of combining data that may include potentially unreliable data.

2. Description of Related Art

The problem of estimating a characteristic that cannot be known with certainty is common. For example, if sensor measurements with known statistical properties and correlated with the characteristic are available, i.e., the measurements are noisy or incomplete, and the measurements are acquired over time, then the optimal and consistent way to solve the above problem is known as probabilistic inference or sequential probabilistic inference.

In a Bayesian framework, one can express an optimal filtering method that accounts for any nonlinearity and any statistical distribution. Although such a method provides an optimal recursive solution, it can generally be reduced to a closed form only for linear Gaussian systems, whereas for most real-world systems (nonlinear and/or non-Gaussian), approximate solutions will typically be used.

A flexible approximation of the solution is obtained by implementing the filtering method using a sequential Monte-Carlo method, such as, for example, a particle filter. The idea behind the Monte-Carlo methods, and, in particular, the particle filter, is to approximate the relevant statistical distributions by a finite number of samples, also called particles, and to update the distributions as observations are received by appropriately generating new random samples. By using a particle filter, complex nonlinear computations can often be avoided.

However, a disadvantage of the standard particle filter is that it often fails to update the estimate of characteristic correctly, and, often, if the error in the initial estimate is large, the estimate converges relatively slowly, or not at all. This weakness is due to the limited number of samples used to approximate the relevant probability distributions; namely, the samples tend to cluster more than is appropriate in regions where the density function is relatively large. Hence, the probability of an unknown characteristic to be a value in an unlikely region is usually too small to be represented by a discrete sample and is often estimated to be zero. A conventional technique to reduce this limitation is to use a relatively large number of samples (particles), which disadvantageously results in a large computational requirement on the filtering process. In addition, the statistical properties of the measurements are typically not known with accuracy, which can cause the performance of particle filter to break down.

One example in which the above scenario exists is in the autonomous localization of mobile robots. In particular, if a robot is lifted and moved to a new location without receiving an indication that such motion has occurred, it has been exposed to what is called "kidnapping." The unknown characteristic (the characteristic to be estimated) is the pose (location and orientation) of the robot, while the observations on which the estimation is based, include dead reckoning measurements, such as wheel odometry, and observations from one or more sensors that give global measurements rather than incremental measurements, such as images from a camera, scans from a laser range finder, measurements from SONAR, IR, and LIDAR sensors, and the like. If relatively many observations have been made and processed before kidnapping occurs and an appropriate algorithm for the sensor fusion is used, then the estimate of the unknown characteristic (the robot pose) will typically have converged, and the confidence of the estimate will typically be relatively high. However, immediately after the kidnapping, this estimate is very likely to be wrong because that most conventional methods of data fusion are not able to recover the pose in a short amount of time.

The above scenario demonstrates that a more robust treatment of observations and estimated distributions is valuable for a successful implementation of Monte-Carlo methods, such as the particle filter, to allow for faster and more reliable recovery from kidnapping.

Monte Carlo techniques are sometimes used for implementing various probabilistic methods in robotics.

Dieter Fox, Sebastian Thrun, Wolfram Burgard, and Frank Dellaert, *Particle filters for mobile robot localization*, Sequential Monte Carlo Methods in Practice, (Doucet, A., de Freitas, N., and Gordon, N., eds.) Springer Verlag, pp. 401-428, 2001, and Sebastian Thrun, *Mapping: A Survey*, Technical Report, CMU-CS-02-111, Carnegie Mellon University, Pittsburgh, Pa., February 2002 describe uses of particle filtering in the field of mobile robot navigation. These references show that the use of particle filters enables a solution to certain previously unsolved problems. One example of such a problem is known as global localization. Another example of such a problem is known as the kidnapped robot problem, in which the robot is lifted and moved to a new location without receiving an indication that such motion has occurred. One important difference between global localization and recovery from kidnapping is that in a kidnapping scenario, the robot "thinks" it knows where it is (i.e., it has some pre-existing estimate of its pose) at the same time as it is lost, while in the global localization scenario, the robot knows that it is completely lost (i.e., it has no pre-existing estimate of its pose).

Methods have been proposed to solve the problem of simultaneous localization and mapping (SLAM) (see Michael Montemerlo, Sebastian Thrun, Daphne Keller, and Ben Wegbreig, *FastSLAM: A factored solution to the simultaneous localization and mapping problem*, in *Proceedings of the AAAI National Conference on Artificial Intelligence*, Edmonton, Canada, 2002). An important weakness of the methods described in Montemerlo, et al., id. is that if the robot is kidnapped a relatively short time before the map is expanded (i.e., a new feature, such as a new landmark, is added to the map), then it will be relatively difficult for the robot to recover and fully correct the map. A second disadvantage of the methods described in reference 4 lies in the so-called "landmarks" that form the basis for its map. These landmarks are based on laser range scans, and it becomes crucial to associate the data acquired during a new laser scan with the data acquired during a previously acquired laser scan correctly. "vSLAM", however, addresses these two weaknesses by introducing two kind of particles, termed "primary" and "dual" particles (see also Fox, Thrun, Burgard, and Dellaert, id., and A. C. Davison and D. V. Hinkley, *Bootstrap Methods and Their Application*, Cambridge Series in Statistical and Probabilistic Methods, Cambridge, United Kingdom, pp. 450-466, 1997). Additionally, the data association problem is resolved by using relatively more robust visual landmarks, wherein false association of an acquired image with a previously acquired image is relatively rare.

SUMMARY

The VSLAM technologies disclosed herein can advantageously be applied to autonomous robots and to non-autonomous robots. For example, the VSLAM technologies can be used with a manually-driven vehicle, such as a remotely-controlled vehicle for bomb detection. By way of example, the VSLAM technologies can be advantageously used in a remote-control application to assist an operator to navigate around an environment. In one embodiment, a vehicle can include various operational modes, such as a mode for manual control of the vehicle and another mode for an autonomous control of the vehicle. For example, the vehicle can be manually-driven during an initial mapping stage, and then later, the vehicle can be configured for autonomous control. In another embodiment, the VSLAM technnologies can be used by a scout to create a map of the region. The scout can correspond to, for example, a person or another animal, such as a dog or a rat. The VSLAM used by the scout can be coupled to a video camera carried by the scout to observe the environment and to a dead reckoning device, such as an odometer, a pedometer, a GPS sensor, an inertial sensor, and the like, to measure displacement. The map generated by the scout can be stored and later used again by the scout or by another entity, such as by an autonomous robot. It will be understood that between the generation of the map by the scout and the use of the map by another entity, there can be additional processing to accommodate differences in visual sensors, differences in the installed height of the visual sensor, and the like.

Robots can be specified in a variety of configurations. In one example, a robot configuration includes at least one dead reckoning sensor and at least one video sensor. Another name for dead reckoning is "ded" reckoning or deduced reckoning. An example of a dead reckoning sensor is a wheel odometer, where a sensor, such as an optical wheel encoder, measures the rotation of a wheel. The rotation of wheels can indicate distance traveled, and a difference in the rotation of wheels (such as a left side wheel and a right side wheel) can indicate changes in heading. With dead reckoning, the robot can compute course and distance traveled from a previous position and orientation (pose) and use this information to estimate a current position and orientation (pose). While relatively accurate over relatively short distances, dead reckoning sensing is prone to drift over time. It will be understood that the information provided by a dead reckoning sensor can correspond to either distance, to velocity, or to acceleration and can be converted as applicable. Other forms of dead reckoning can include a pedometer (for walking robots), measurements from an inertial measurement unit, optical sensors such as those used in optical mouse devices, and the like. Disadvantageously, drift errors can accumulate in dead reckoning measurements. With respect to a wheel odometer, examples of sources of drift include calibration errors, wheel slippage, and the like. These sources of drift can affect both the distance computations and the heading computations.

BRIEF DESCRIPTION OF THE DRAWINGS

These drawings (not to scale) and the associated description are provided to illustrate embodiments and are not intended to limiting.

FIG. 5A illustrates a robot reference frame in the context of creating a record in a landmark database.

FIG. 5B illustrates a landmark reference frame and a robot reference frame in the context of revisiting a landmark.

FIG. 5C illustrates the convention used to describe a $\Delta x$ and a $\Delta y$ calculation.

FIG. 5D illustrates the convention used to describe a $\Delta \theta$ calculation.

FIG. 20 is a flowchart that generally illustrates a process useful in a SLAM module for creating a new landmark.

Figure 1:
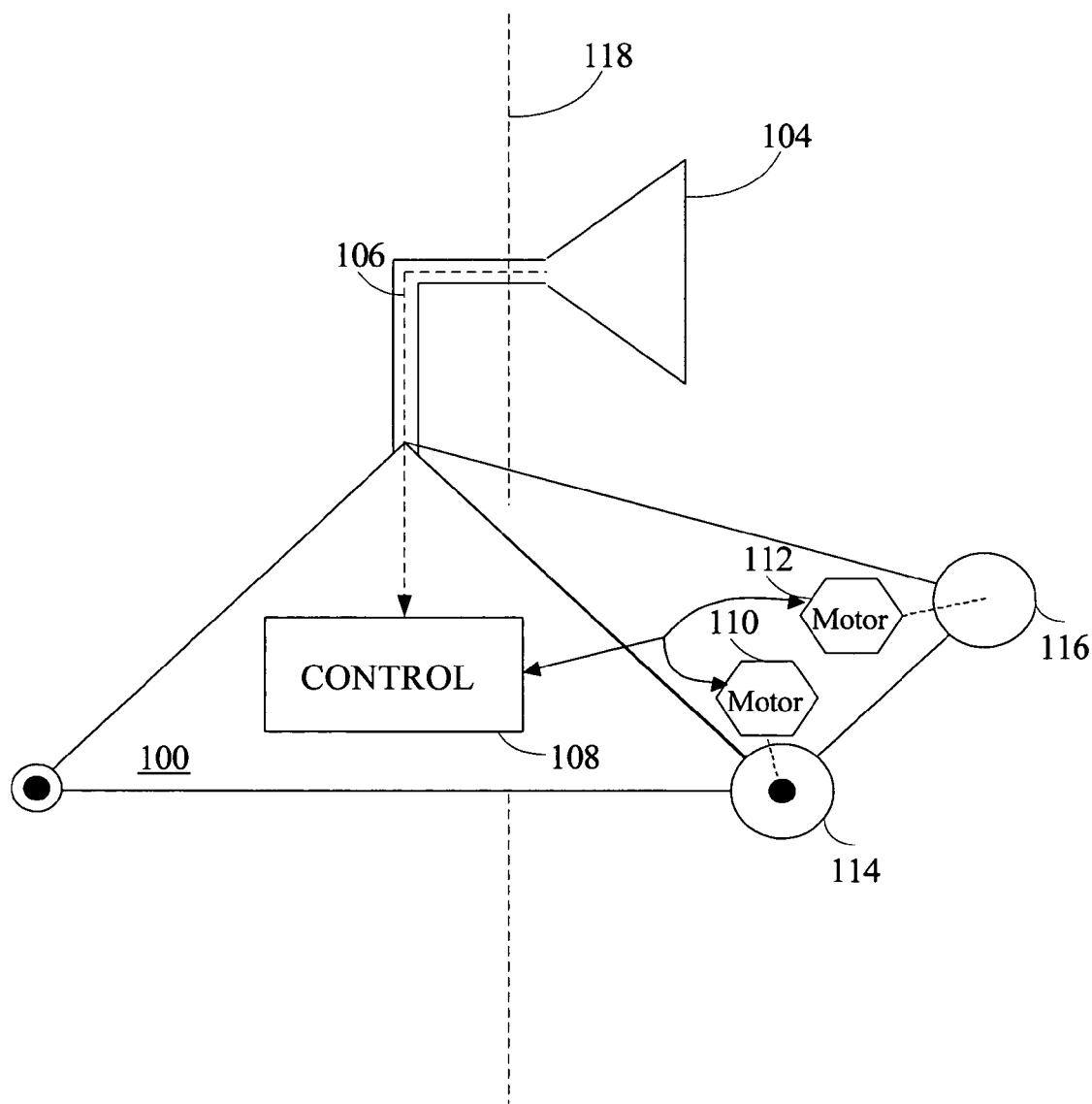
FIG. 1 illustrates an example of a robot.

GLOSSARY OF TERMS pose: the position and orientation, such as the position and orientation of a robot, in some reference frame.

robot pose (also known as global robot pose): the position and orientation of a robot in a global reference frame. In a configuration where a robot travels in two dimensions, such as along the surface of a floor, the robot pose can be specified by a two-dimensional position (x,y) and a heading (θ).

relative robot pose: the position and orientation of a robot with respect to another reference frame, such as a landmark reference frame.

global reference frame: a reference frame that is fixed to the environment.

landmark reference frame: the reference frame in which a landmark's 3-D structure is defined.

3-D structure: the 3-D coordinates of a set of 3-D features.

landmark: a landmark comprises a collection of 3-dimensional (3-D) features and a unique identifier.

3-D feature: an observable location, such as, for example, a portion of an object, with an associated 3-D coordinate in a reference frame and one or more associated 2-D features observable when viewing the location. It will be understood that a 3-D feature can be observed from one or more perspectives with varying 2-D features.

2-D feature: a position in an image and a descriptor that relates to the pixel at the position or the pixels in some neighborhood around that position.

physical landmark: a collection of visually-identifiable 3-D features in the environment.

landmark pose: the pose of the landmark reference frame in the global reference frame.

camera pose: a relative pose in the landmark reference frame based on the location of the visual sensor, which can be, for example, a camera.

DETAILED DESCRIPTION OF EMBODIMENTS

Although particular embodiments are described herein, other embodiments, including embodiments that do not provide all of the benefits and features set forth herein, will also be apparent to those of ordinary skill in the art.

An example of an embodiment of the method advantageously uses one or more visual sensors and one or more dead reckoning sensors to process Simultaneous Localization and Mapping (SLAM). The combination of SLAM with visual sensors will hereafter be referred to as VSLAM. Advantageously, such visual techniques can be used by a vehicle, such as a mobile robot, to autonomously generate and update a map. In one embodiment, VSLAM is advantageously used by a portion of a vehicle, such as by an arm, leg, hand, or other appendage of a vehicle. In contrast to localization and mapping techniques that use laser rangefinders or other range-based devices or sensors, the visual techniques are economically practical in a wide range of applications and can be used in relatively dynamic environments, such as environments in which people move. One embodiment further advantageously uses multiple particles to maintain multiple hypotheses with respect to localization and mapping. Further advantageously, one embodiment maintains the particles in a relatively computationally-efficient manner, thereby permitting the SLAM processes to be performed in software using relatively inexpensive microprocessor-based computer systems.

It will be understood by one of ordinary skill in the art that mobile robots can be embodied in a variety of forms. In these varieties of forms, a robot may be referred to by a different name, such as by a function that is performed by the robot. For example, a robot may be referred to as an automated sweeper or as an automated vacuum cleaner. In one embodiment, a mobile robot corresponds to a self-propelled object that can navigate in an autonomous or semi-autonomous manner. Examples of autonomous or semi-autonomous mobile robots include, but are not limited to, mobile robots for use in automated floor cleaners, humanoid robots, robots for experimentation and lab use, robots for delivering supplies, robots for exploring confined or inaccessible spaces, robots for entertainment or play, and the like.

An example of a visual sensor is a digital camera. Certain embodiments of the methods and systems described herein advantageously use a visual sensor to recognize landmarks on a visual basis. These observations of visual landmarks can advantageously provide a global indication of position and can be used to correct for drift in the dead reckoning sensors. In contrast to simultaneous localization and mapping (SLAM) techniques that use a laser rangefinder, embodiments of the method can use data from visual sensors and from dead reckoning sensors to provide simultaneous localization and mapping (SLAM) with advantageously little or no additional cost.

Exemplary Robot with VSLAM

FIG. 1 illustrates an example of a mobile robot 100 in which a VSLAM system can be incorporated. The illustrated robot 100 includes a visual sensor 104, which is used to visually recognize landmarks such that a SLAM module can determine global position.

A broad variety of visual sensors can be used for the visual sensor 104. For example, the visual sensor 104 can correspond to a digital camera with a CCD imager, a CMOS imager, an infrared imager, and the like. The visual sensor 104 can include normal lenses or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. In another example, the visual sensor 104 can correspond to a single camera or to multiple cameras. In one embodiment, the VSLAM system is advantageously configured to operate with a single camera, which advantageously reduces cost when compared to multiple cameras.

The motors 110, 112 of the illustrated robot 100 are coupled to wheels 114, 116 to provide locomotion for the robot 100. It will be understood by one of ordinary skill in the art that instead of or in addition to wheels, other embodiments of the robot can use legs, tracks, rollers, propellers, and the like, to move. In the illustrated embodiment, information regarding the rotation of the wheels, also known as odometry, is provided as an input to a control 108. Image data 106 from the visual sensor 104 is also provided as an input to the control 108 for the robot 100. In one embodiment, the VSLAM system is embodied within the control 108. In the illustrated embodiment, the control 108 is coupled to motors 110, 112 to control the movement of the robot 100. For clarity, a power source for the robot 100, such as a battery, is not shown in FIG. 1.

In response to the image data 106, the control 108 can provide control signals to the motors 110, 112 that control the movement of the robot 100. For example, the control 108 can provide control signals to instruct the robot to move forward, to stop, to move backward, to turn, to rotate about a vertical axis, and the like. When the robot rotates around a vertical axis, such as the exemplary vertical axis 118 shown in FIG. 1, this rotation is referred to as "yaw." Convention used herein to describe the pose, that is, the orientation and the position of the robot, will be described in greater detail later in connection with FIG. 4.

The control 108 can include hardware, such as microprocessors, memory, etc., can include firmware, can include software, can include network communication equipment, and the like. In one embodiment, the control 108 uses dedicated hardware, such as single-board computers, application specific integrated circuits (ASICs), field programmable gate arrays (FPGAs), and the like. Examples of system architectures for a VSLAM system will be described in greater detail later in connection with FIGS. 6, 14, and 15.

In one embodiment, the control 108 is implemented by interfacing to a general-purpose computer, such as to a laptop computer, and by software executing in the computer. In one example, a laptop computer with an Intel® Pentium® 4 processor with a 2.4 GHz clock speed can process landmark generation processes in about 1 second and can process visual measurements in about half a second. It will be understood that the processing time can depend on parameters such as image resolution, frame rates, bus speeds, and the like. The software can include instructions that are embodied in a tangible medium, such as a hard disk or an optical disk. Data processing for the robot 100 can be performed entirely within the robot 100 such that the robot 100 is autonomous, or the data processing can be performed partially outside the robot 100. For example, the control 108 can be configured to relay data to another computer, via a network such as a wireless network, where a portion of the data processing takes place. An example of a data structure for a relational database for use in a VSLAM system will be described later in connection with FIG. 8. Examples of data processing will be described in greater detail later in connection with FIGS. 9-13.

An Example of Experimental Results

Figure 2:
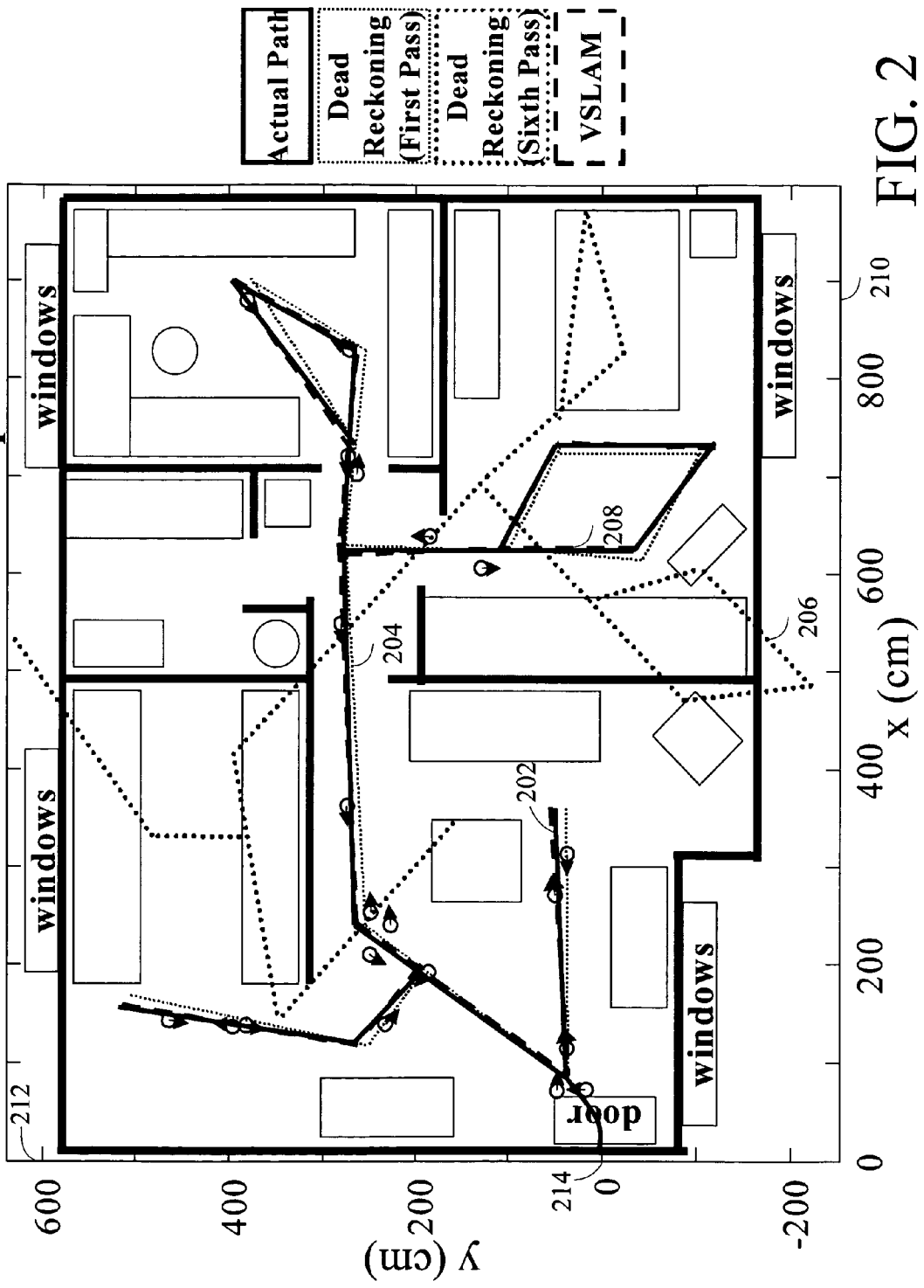
FIG. 2 is a top view of a room with obstacles illustrating an actual path taken by a robot, a first path estimated through dead reckoning measurements alone, a second path estimated through dead reckoning measurements alone, and a path estimated through visual simultaneous localization and mapping (VSLAM).

FIG. 2 is a top view of an apartment with objects, such as walls furniture, and the like. FIG. 2 illustrates an actual path 202 taken by a robot, a first path 204 estimated through dead reckoning measurements alone, a second path 206 estimated through dead reckoning measurements alone, and a path estimated through VSLAM 208.

In one embodiment, the global position of the robot is represented by Cartesian (x-y) coordinates as shown in FIG. 2. It will be understood that other coordinate systems, such as polar coordinates, can also be used. With respect to FIG. 2, a horizontal axis 210 corresponds to the x-axis. A vertical axis 212 corresponds to the y-axis. The coordinate system used herein will be described in greater detail later in connection with FIG. 4.

In one embodiment, the N-dimensional zero vector (0, 0, 0) for (x, y, θ) for the system is set when the robot is initialized or is reset. Unless the zero vector is reset by, for example, a deliberate reset, a system reset, re-initialization process, and the like, the zero vector stays fixed for the global reference frame. By contrast, a relative reference frame with a moving zero vector relative to the global reference frame will be described later in connection with FIGS. 5A and 5B. In addition, it will be understood that the N-dimensional zero vector can further include other dimensions, such as height z, roll, and pitch, as applicable. Returning now to the example shown in FIG. 2, a zero vector 214 is located at approximately the entrance to the apartment, but it will be understood that the location of the zero vector 214 can be located elsewhere. In addition, it should be noted that the system can be configured to set the zero vector to locations other than where the robot is initialized or is reset, such as, for example, a location where a landmark is first observed.

As a robot with VSLAM travels in its environment, such as the apartment shown, the robot can observe physical landmarks. As will be explained in greater detail later, these physical landmarks can be related to landmarks created and stored in a database. Advantageously, the VSLAM technologies do not require artificial navigational beacons to be placed in the environment. Rather, VSLAM technologies can conveniently be used in unaltered and unmodified environments. However, it will be understood that should artificial navigational beacons be present in an environment, the VSLAM technologies can utilize features from the beacons and/or the surrounding environment as landmarks. For example, in a landmarks database, where a landmark can correspond to a collection of 3-D features and the corresponding 2-D features from which the 3-D features are computed. It should also be noted that a physical landmark can correspond to one or more physical objects, such as, for example, an object mounted to a wall and a portion of the wall. These physical landmarks are used to estimate global position such that drift in dead reckoning measurements can later be corrected or compensated. It should be noted that a physical landmark will typically be arranged in a particular location and orientation in the global reference frame, and that the observing robot will be at a different location and orientation. In the illustrated embodiment, the locations of the features of the physical landmark are referenced relative to the landmark reference frame. Then, the pose of the landmark itself is referenced to the global reference frame.

The estimated poses of selected landmarks are illustrated in FIG. 2. In FIG. 2, examples of global position (x,y) for the robot pose when the robot perceives a physical landmark are indicated by circles. It will be understood that while the VSLAM system is generally described in the context of a robot, the VLAM system can also be used in a variety of devices such that the robot pose can also correspond to a device pose. The orientation (θ) of the robot as it observes the physical landmark and creates the landmark in the database is indicated with an arrow. In one embodiment, the initial estimate of the pose of the "landmark" that is referenced in the global reference frame corresponds to the pose of the robot when creating the landmark. When a new physical landmark is observed and a landmark is created, the set of 3-D features and their corresponding 2-D features that visually identify the landmark are stored. In one example, the 2-D features correspond to SIFT features. The concept of SIFT has been extensively described in the literature. See David G. Lowe, *Local Feature View Clustering for 3D Object Recognition*, Proceedings of the IEEE Conference on Computer Vision and Pattern Recognition, Kauai, Hi. (December 2001).

As illustrated in FIG. 2, the path estimated through VSLAM 208 is advantageously much more accurate than the second path 206 estimated through dead reckoning measurements alone. Over relatively short distances, dead reckoning measurements, such as those obtained from odometry readings, can be quite accurate. For example, the first path 204 taken after a single pass estimated through dead reckoning measurements alone is relatively close to the actual path 202. However, due to calibration errors, wheel slippage, and the like, these dead reckoning measurements can drift or accumulate errors over distance and/or time such that a position calculated after a relatively long period of time can vary significantly from a position that was initially calculated even when the errors in the dead reckoning measurements are relatively small. For example, over an extended period of time, the robot can make relatively many traversals over an environment, thereby accumulating errors in drift. In the example illustrated in FIG. 2, the second path 206 estimated through dead reckoning measurements alone was calculated after about 6 passes around the apartment. As illustrated by FIG. 2, the disparity between the actual path 202 and the second path 206 estimated through dead reckoning measurements alone can be pronounced.

Advantageously, the VSLAM technologies can wholly or partially compensate for the drift in the dead reckoning measurements such that even after a robot has traveled over relatively large distances, the global position of the robot can be maintained with relatively high accuracy. In one embodiment, the VSLAM techniques maintain the accuracy of the global robot pose estimate to exceed the accuracy of the visual measurements even after the robot has traversed relatively long distances. In the illustrated example, the visual sensor used was a relatively simple and inexpensive color camera with a resolution of 640×480, and the accuracy of the visual measurements was maintained to about 10 centimeters (cm). It will be understood that other visual sensors, such as grayscale cameras and infrared cameras, can also be used. In FIG. 2, the path estimated through VSLAM 208 was computed under the same conditions as the second path 206 estimated through dead reckoning measurements alone. As illustrated by FIG. 2, the path estimated through VSLAM 208 is relatively close to the actual path 202 and is advantageously relatively more accurate than the second path 206 estimated through dead reckoning measurements alone.

Examples of Different Perspectives for Visual Localization

Figure 3A:
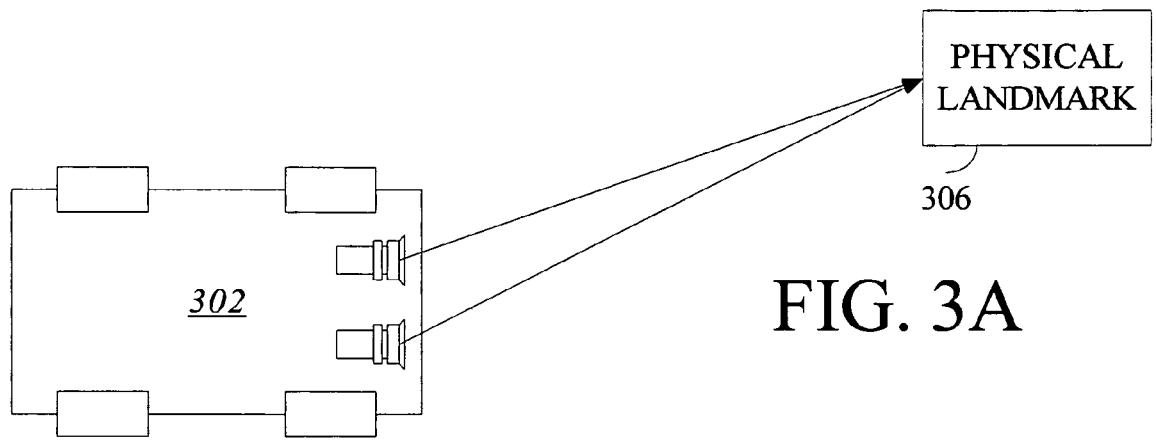
FIG. 3A illustrates the use of multiple cameras to determine a 3-D position of a visual landmark.

FIG. 3A illustrates the use of multiple cameras or multiple visual sensors to determine a 3-D position of a physical landmark for VSLAM. In one embodiment, a robot 302 is equipped with multiple visual sensors that are spaced a known distance apart to provide a stereoscopic view, such as a binocular view or a trinoculor view, of a physical landmark 306. An example of a trinoculor camera is the Digiclops™ camera available from Point Grey Research Inc., of Vancouver, British Columbia, Canada.

Advantageously, camera systems that provide a stereoscopic view, such as binocular or trinocular camera systems, can be used to identify 3-D features of a landmark and to estimate displacements to the 3-D features in a relatively fast and efficient manner. Disadvantageously, such cameras are produced in relatively low volumes and can be relatively expensive relative to single visual sensor cameras due to the extra components and to the relative lack of economies of scale.

Figure 3B:
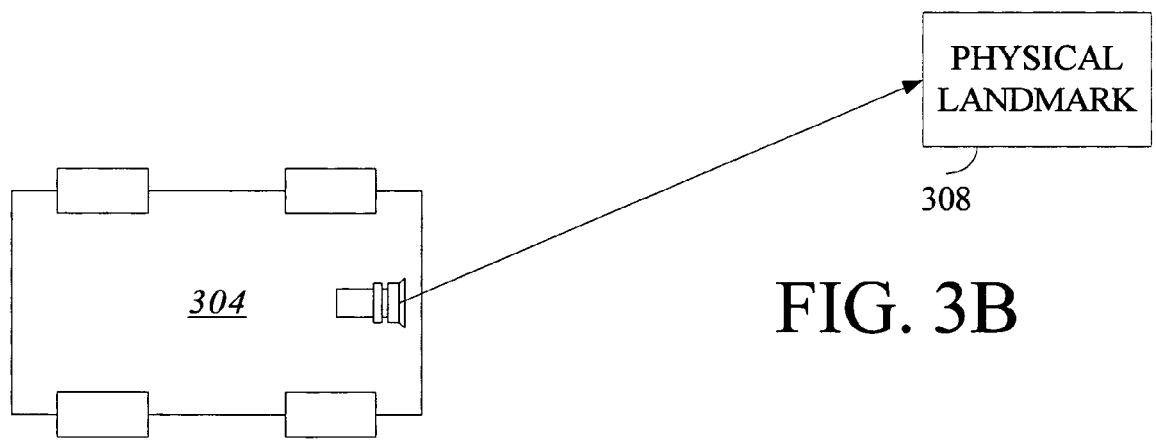
FIGS. 3B and 3C illustrate the use of a single camera to determine a 3-D position of a visual landmark.
Figure 3C:
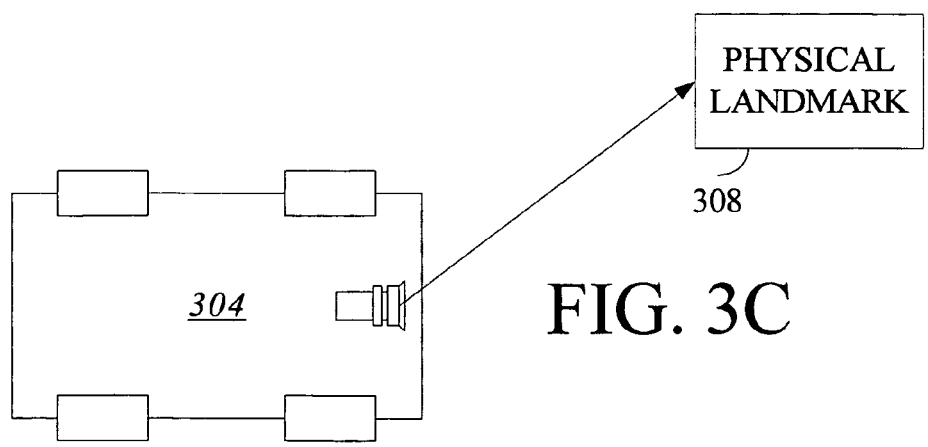

FIGS. 3B and 3C illustrate the use of a single camera to estimate the 3-D structure of a landmark 308. The use of a single camera in the processing of VSLAM advantageously permits relatively common and inexpensive visual sensors to be used for VSLAM visual processing. Moreover, many configurations of robots are already configured with a single camera, which can be used with the VSLAM processing such that no additional camera is needed.

To obtain multiple perspective views from images taken from a single camera, the images are taken from different locations, such as, for example, from 3 different positions. For example, FIGS. 3B and 3C illustrate how a robot 304 moves from a first position as shown in FIG. 3B to a second position as shown in FIG. 3C. In both FIGS. 3B and 3C, the robot 304 observes the same physical landmark 308. In one embodiment, the robot 304 monitors the distance traveled by odometry or another dead reckoning source, and selects at least 2 images, such as, for example, 2 or 3 images, taken at about 10 centimeters (cm) apart for the perspective views. It will be understood that an appropriate amount of distance traveled between selected images can vary in a broad range and can vary depending on the environment in which the robot 304 operates. In one embodiment, the robot 304 travels a minimum predetermined distance between images used for the perspective views. This minimum predetermined distance can be adaptively determined at least partly in response to the operating environment of the robot 304. For example, the minimum predetermined distance can correspond to a fixed percentage, such as 5%, of an average displacement to observed features. Other applicable percentages will be readily determined by one of ordinary skill in the art. These perspective views can be used to determine the positions of 3-D features of new landmarks. As will be explained in greater detail later, in one embodiment, such perspective views are not used when a landmark is revisited.

Illustrations of Robot Pose and Global Reference Frame

Figure 4:
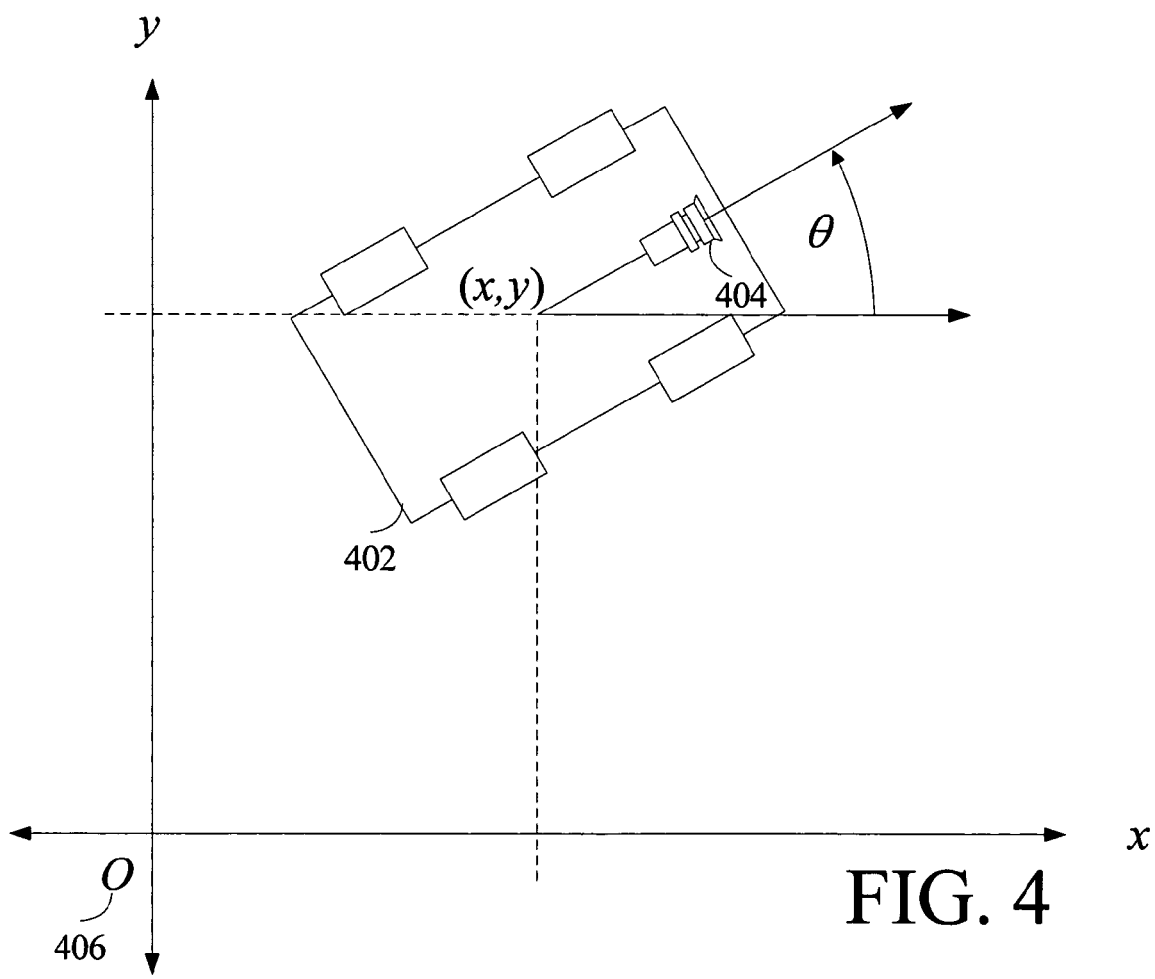
FIG. 4 illustrates a pose of a robot in a global reference frame.

The "pose" of a robot includes the position of the robot and the orientation or heading of the robot within the global reference frame. FIG. 4 illustrates a position (x,y) of the pose of a robot 402 in a global reference frame. It will be understood that the position does not have to correspond precisely to the center of the robot 402, as the robot 402 occupies an area of space larger than a point. A zero vector 406 for the global reference frame can correspond to one of a variety of locations within an environment. In the illustrated examples, the zero vector 406 for the global reference frame is set at the location where the robot 402 was initialized. In one embodiment, the x-direction for this global reference frame corresponds to an axis directly in front of the robot when the robot is initialized. For example, in the illustrated embodiment, the x-axis corresponds to the path traveled by the robot when the robot travels directly in the forward direction upon initialization at the zero vector 406. In the illustrated embodiment, the y-direction corresponds to an axis orthogonal to the x-axis, with the positive y-axis increasing to the left of the x-axis when viewed from above. It will be understood that the zero vector for reference frame and the alignment of the x-axis and the y-axis with respect to the zero vector can depend on where the robot is located and the orientation of the robot at the time the zero vector is set, such as, for example, at the time of initialization.

In addition to displacement along the x-axis direction or the y-axis direction, a typical mobile robot can also rotate or "yaw" about a vertical axis. It will be understood that robots do not have to directly rotate or yaw to change orientation. For example, the act of turning around a corner also changes the orientation or heading of the robot.

FIG. 4 also illustrates an orientation of the pose of a robot in a global reference frame. In the illustrated embodiment, the orientation θ for the robot is referenced to the initial heading that the robot had when the zero vector was set. Advantageously, the location of the robot and the initial orientation for the robot is arbitrary, thereby simplifying setup of the robot for the user.

In one embodiment, the global reference frame described in FIG. 4 is used by the SLAM portion of the VSLAM, such as a SLAM module 604 which will be described in greater detail later in connection with FIG. 6. By contrast, a relative reference frame is used for the visual front-end portion of VSLAM, such as by a Visual Front End 602 of FIG. 6. The relative reference frame will also be described in further detail later in connection with FIGS. 5A and 5B.

Illustrations of Visual Measurements

FIGS. 5A and 5B (not to scale) illustrate a robot 502 and a corresponding robot reference frame 520. In the illustrated embodiment, the robot reference frame 520 is used by the visual localization portion of a VSLAM system, such as the Visual Front End 602 of FIG. 6. The zero vector for the robot reference frame 520 moves with the robot 502. As such, the robot reference frame 520 is a relative reference frame, as opposed to a global reference frame that has a globally-fixed zero vector. For example, the zero vector for the robot reference frame 520 can be located approximately at the camera of the robot 502 and is illustrated in FIG. 5A by a pose "A" 522 and in FIG. 5B by a pose "B" 524.

As the robot 502 travels in its environment, the robot 502 detects new physical landmarks and revisits previously detected or "old" physical landmarks. FIG. 5A illustrates the robot reference frame 520 in the context of "creating" or recognizing a new landmark, i.e., creating an entry in a database for a freshly observed landmark. A process in a visual front end or visual localization process for recognizing a new landmark will be described in greater detail later in connection with FIG. 10. FIG. 5B illustrates the robot reference frame 520 in the context of revisiting a previously observed and recorded landmark. The robot reference frame 520 moves with the robot 502 such that the pose "A" 522 corresponding to the pose of the robot, with respect to the global reference frame, at the time when the landmark was created, and the pose "B" 524 corresponding to the pose of the robot, with respect to the global reference frame, at the time when the landmark was revisited can be different as illustrated in FIG. 5B.

Returning now to FIG. 5A, in the illustrated embodiment, a physical landmark 504 is identified by its 3-D features. In one embodiment, 3-D features are extracted by triangulating 2-dimensional (2-D) features by solving the structure and motion problem using the trifocal tensor method. In one embodiment, the 2-D features are SIFT features. A discussion of SIFT features can be found in Lowe, id. See Olivier Faugeras and Quang-Tuan Luong, *The Geometry of Multiple Images*, MIT Press (2001) for a discussion of the trifocal tensor method. It will be understood that the physical landmark 504 can be characterized by relatively many 3-D features and that the physical landmark 504 can correspond to one or more physical objects or to a portion of physical object. For clarity, the physical landmark 504 illustrated in FIG. 5A is drawn with 3 3-D features: a first feature 506, a second feature 508, and a third feature 510. When the robot 502 observes a new physical landmark, the visual front end determines the displacements or positions from the robot 502 to the respective features. When a landmark is created, the robot 502 can reference displacements to visual features using the current position of the robot reference frame 520 as an initial estimate of a landmark reference frame. For example, in the example illustrated in FIG. 5A, arrows $r_1$, $r_2$, and $r_3$ represent 3-dimensional displacements, such as displacements in x, y, and z dimensions between the robot 502 and the first feature 506, the second feature 508, and the third feature 510, respectively. It should be noted that these x, y, and z displacements are relative to the robot reference frame of the robot 502 and not to the global reference frame. In one embodiment, the x, y, and z displacements correspond to relative displacements in the fore-aft dimension, in the left-right dimension, and in the up-down dimension, respectively. In addition, the 2-D image coordinates or locations for the 3-D features are also stored. For example, where the visual sensor corresponds to a 640×480 color camera, the 2-D image coordinates correspond to one or more pixel locations that correspond to the 3-D features. It will be understood that 3-D features will typically occupy more than merely a single point in space.

In one embodiment, where the robot 502 moves as the images are taken for the perspective views for the computation of the displacements $r_1$, $r_2$, and $r_3$, the displacements from the robot 502 to the features are referenced to the first image in a three-image set. However, it will be appreciated that any identifiable reference frame can be used as the reference. For example, the other images in the image set can also be used as the reference, so long as the image used as the reference is consistently selected. It should also be noted that an identifiable reference frame that does not correspond to any particular image can also be used. For example, in the illustrated embodiment, the pose of the robot corresponding to the first image in the three-image set is used as the local reference frame for the particular landmark, i.e., the landmark reference frame.

Figure 6:
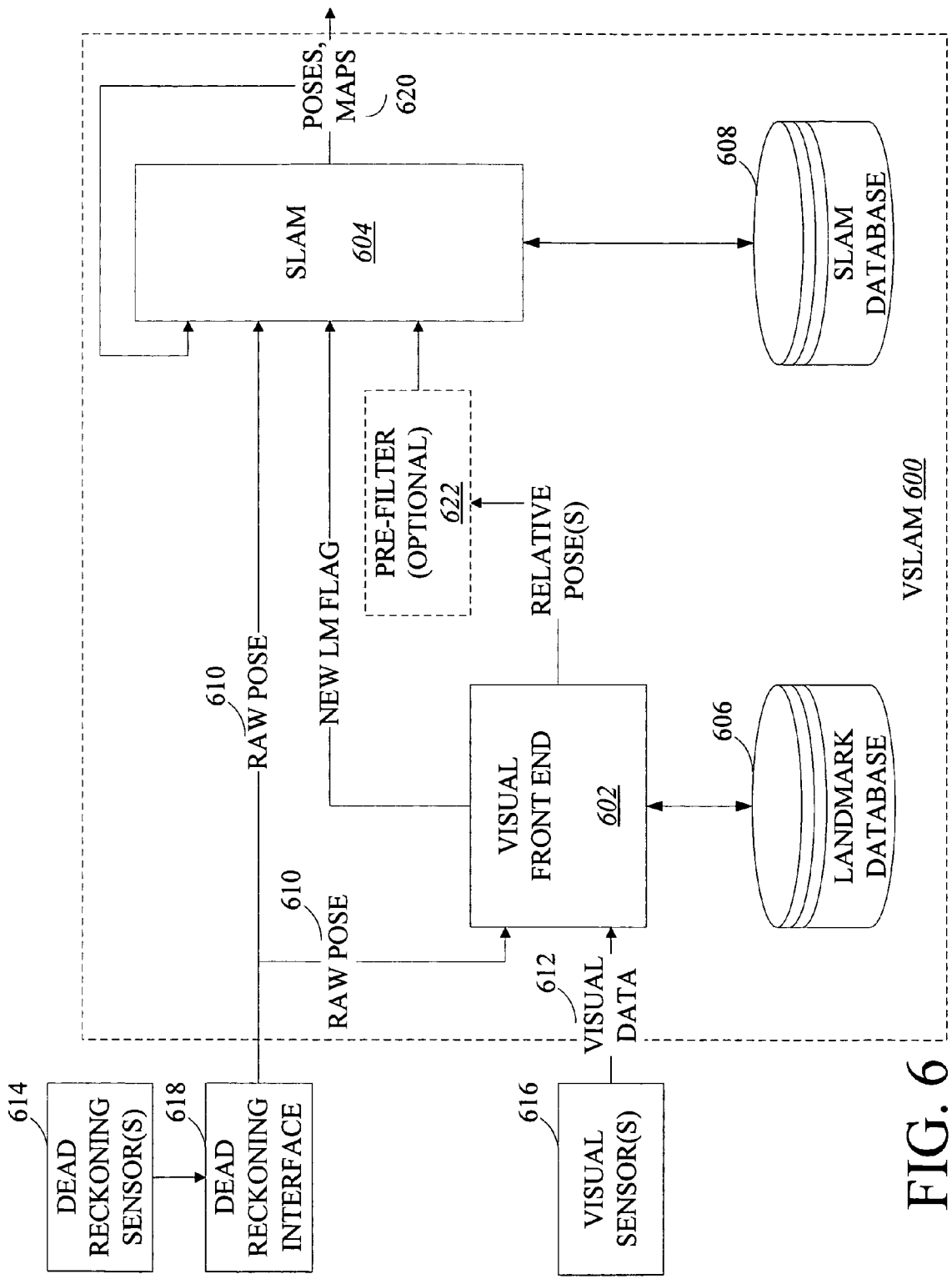
FIG. 6 illustrates one embodiment of a system architecture for a VSLAM system.

In one embodiment, when a new physical landmark is encountered, the Visual Front End 602 stores (i) the 3-D coordinates of the 3-D features in the local reference frame for the landmark in a database, such as a landmark database 606 of FIG. 6 and (ii) the 2-D features for a selected image, such as the 2 D features of the first image, corresponding to the 3-D features. An example of a data structure for the landmark database 606 will be described later in connection with FIG. 8. In one embodiment, when the new physical landmark is encountered and processed by the Visual Front End 602, the SLAM module 604 correspondingly "creates" a landmark by storing an initial estimate of the landmark pose, such as the global robot pose when the landmark was created, computed from the change in pose as provided by the dead reckoning data for each particle from the last pose of the robot for the corresponding particle. An example of a process that can be performed by the SLAM module 604 when creating a new landmark will be described in greater detail later in connection with FIG. 11. Another example of a process for creating a new landmark will be described in greater detail later in connection with FIG. 20.

FIG. 5B illustrates an example of the robot 502 revisiting the physical landmark 504 earlier observed, termed "new view." In FIG. 5B, the robot 502 is displaced from the original pose "A," which corresponds to the "landmark reference frame," to a new pose "B." Correspondingly, the robot reference frame also moves with the robot 502. The robot 502 again observes the first feature 506, the second feature 508, and the third feature 510. It will be understood that as the robot 502 moves about, some of the features of a physical landmark may not be observable in all locations. The Visual Front End 602 of the robot 502 computes the relative pose, i.e., the difference between new pose "B" and pose "A," as illustrated in FIGS. 5C and 5D and provides one or more relative poses to one or more identified landmarks as an input to the SLAM module 604 or to the Pre-Filter module 622. In one embodiment, the Visual Front End 602 computes the relative pose of the robot with respect to the stored landmark reference frame illustrated as "A" by finding the relative pose of the robot that minimizes the projection error from the 3-D features onto the 2-D coordinates of the first feature 506, the second feature 508, and the third feature 510.

Dashed lines between the robot 502 and the features 506, 508, 510 represent the projection of the features 506, 508, 510 onto an image plane, which is illustrated by a line 530 in the top view of FIG. 5B. It will be understood that the image plane for a visual sensor, such as a camera, will typically be approximately perpendicular to the focal axis of the camera. It will also be understood that the line 530 approximately represents the field of view of the camera for the projection of the points and does not indicate any particular distance from the camera.

Given the correspondence between the 2-D features in the new view and the 3-D features of the landmark, the Visual Front End 602 can estimate the relative pose by, for example, minimizing projection error. The relative pose reveals a change in pose from (i) the pose when the landmark was created and stored in the database to (ii) the pose when the physical landmark was re-observed. It will be understood that such a relative pose can be represented in a variety of coordinate forms. For example, the translational component of the relative pose along the floor can be represented by Cartesian coordinates (x,y). However, it will also be understood that polar coordinates ($\rho,\phi$) can also be used. FIG. 5C and FIG. 5D graphically illustrate the relative pose also known as "camera pose" components of $\Delta x$, $\Delta y$, and $\Delta \theta$. While the term "camera pose" includes the word "camera," it will be understood that visual sensors other than cameras can also be used. The relative pose can also include a change in vertical dimension, roll, and pitch, which can be the result of uneven floor surfaces, robot and/or camera movement in these dimensions, misidentified landmarks, changes in the physical landmarks in the environment, and the like. In one embodiment, these additional dimensions are advantageously used to test the validity of the identified landmark, as will be described later in greater detail in connection with the Pre-Filtering process of FIG. 12. In one embodiment, the Cartesian-coordinate relative pose is used between a visual front-end and a SLAM module when re-encountering landmarks, and a polar-coordinate "delta pose" is used in the SLAM module when computing change in pose between points measured by dead reckoning data.

In one embodiment, the pose of the robot according to dead reckoning sensor data as the robot travels in its environment is stored with a corresponding timestamp in a matrix, such as in a Dead Reckoning Data Matrix 812, which will be described later in connection with FIG. 8. Retrieval of poses according to two points in time permits change in heading, direction traveled, and distance traveled to be computed between the two points in time.

Example of a System Architecture for VSLAM

FIG. 6 illustrates one embodiment of a system architecture for a VSLAM system 600. It will be understood that the VSLAM system 600 can be implemented in a variety of ways, such as by dedicated hardware, by software executed by a microprocessor, or by a combination of both dedicated hardware and software.

Inputs to the VSLAM system 600 include raw pose data 610 from one or more dead reckoning sensors 614 and also include visual data 612' from one or more cameras or other visual sensors 616. It will be understood that a dead reckoning sensor 614, such as an optical wheel encoder, can communicate with the VSLAM system 600 via a dead reckoning interface 618, such as via a driver or via a hardware abstraction layer. The raw pose data 610 can correspond to distance traveled, to velocity, to acceleration, and the like, and can depend on the type of dead reckoning sensor used. Outputs from the VSLAM system 600 can include one or more poses and maps 620.

The raw pose data 610 and the visual data 612 are provided as inputs to the Visual Front End 602. The Visual Front End 602 can perform a variety of functions, such as identify landmarks, identify 3-D features for landmarks, calculate delta pose, and the like. Examples of processes that can be performed by the Visual Front End 602 will be described in greater detail later in connection with FIGS. 9 and 10. A system architecture for the Visual Front End 602 will be described in greater detail later in connection with FIG. 14.

The Visual Front End 602 can use the raw pose data 610 to determine the approximate distance traveled between the images in the visual data 612, which are then used in computations to measure the displacements to the features. When new physical landmarks are recognized, corresponding records or entries can be added to the landmark database 606. A sample data structure for the landmark database 606 will be described later in connection with FIG. 8. Newly recognized landmarks can also be indicated to the SLAM module 604. For example, a "new landmark" flag can be activated, and a "new landmark" identifier or tag can be provided to the SLAM module such that the appropriate records in a SLAM database 608 and the landmark database 606 can be matched. When previously recognized landmarks are encountered, the Visual Front End 602 can provide the SLAM module 604 or an optional Pre-Filter module 622 with one or more identifiers or tags to indicate the one or more landmarks encountered, relative pose information, such as relative pose information ($\Delta x$, $\Delta y$, and $\Delta \theta$), and data reliability measures as applicable.

The optional Pre-Filter module 622 analyzes the data reliability measures provided by the Visual Front End 602. The data reliability measures can be used as an indication of the reliability of the identification of the physical landmark by the Visual Front End 602. For example, the Pre-Filter module 622 can advantageously be used to identify a landmark measurement identified by the Visual Front End 602, which may have been inaccurately identified and can correspond to an outlier with respect to other landmarks in a map. In one embodiment, when the Pre-Filter module 622 identifies a potentially inaccurate visual measurement, the Pre-Filter module 622 does not pass the identified visual landmark data onto the SLAM module 604 such that the VSLAM system 600 effectively ignores the potentially inaccurate landmark measurement. Pre-filtering of data to the SLAM module 604 can advantageously enhance the robustness and accuracy of one or more poses (position and orientation) and maps 620 estimated by the SLAM module 604.

A process that can be performed by the Pre-Filter module 622 will be described in greater detail later in connection with FIG. 12. A system architecture of the Pre-Filter module 622 will be described in greater detail later in connection with FIG. 15.

Figure 7A:
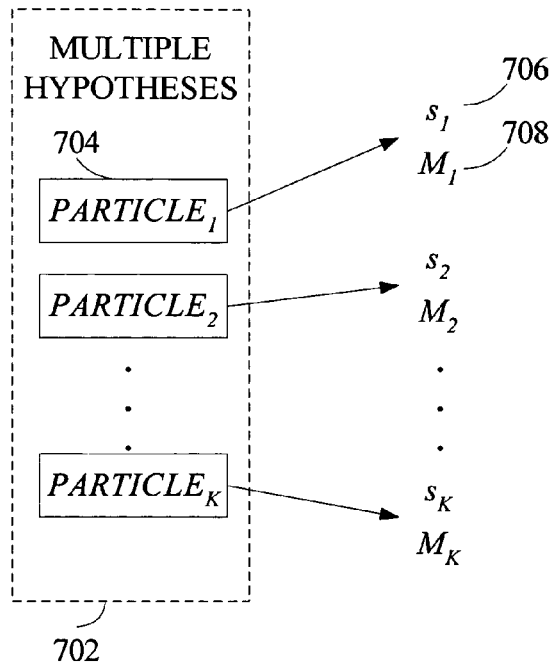
FIG. 7A illustrates multiple particles in a multiple-hypothesis VSLAM system.
Figure 7B:
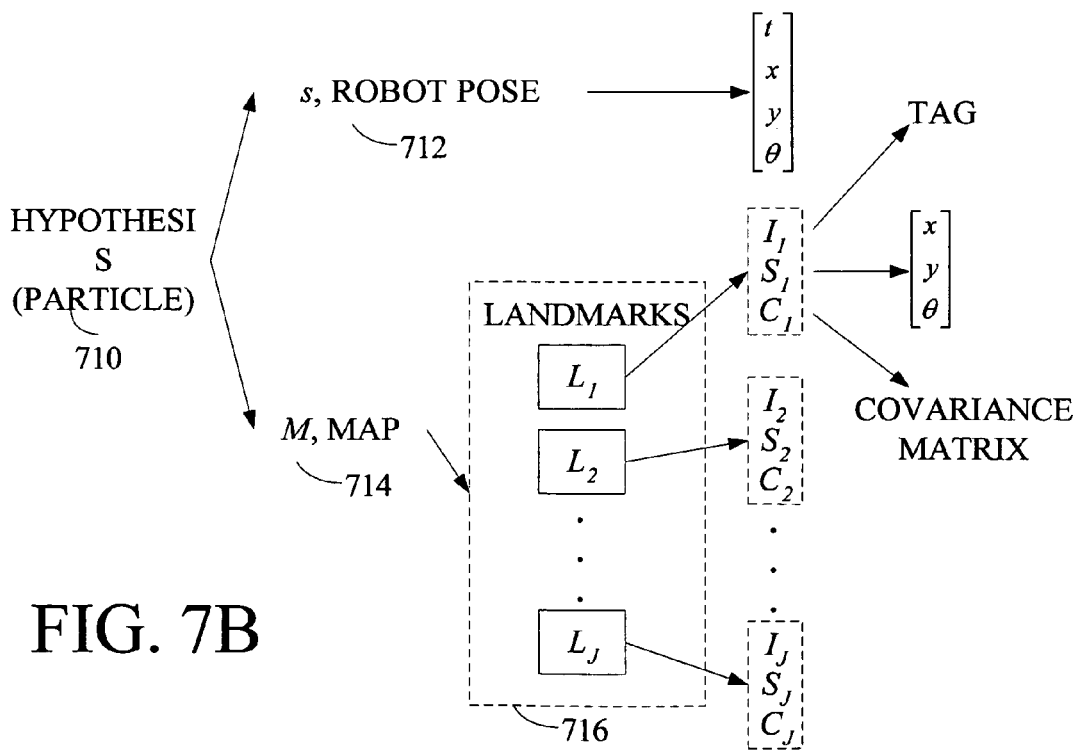
FIG. 7B illustrates one example of data associated with a hypothesis or particle.

The SLAM module 604 maintains one or more poses and maps 620. In one embodiment, the SLAM module 604 maintains multiple particles or hypotheses, and each particle is associated with a pose and a map. FIGS. 7A and 7B illustrate an example of relationships between particles, poses, and maps.

The SLAM module 604 receives the raw pose data 610 from the dead reckoning interface 618. It will be understood that the nature of the raw pose data 610 can vary according to the type of dead reckoning sensor 614 and the type of output specified by the dead reckoning interface 618. Examples of the raw pose data 610 can include distance measurements, velocity measurements, and acceleration measurements. The dead reckoning data is used by the SLAM module 604 to estimate course and distance traveled from a prior pose. It will be understood that where multiple hypotheses are used by the SLAM module 604, that the dead reckoning data is used to estimate course and distance traveled from relatively many prior poses.

Other inputs to the SLAM module 604 include visual localization data from the Visual Front End 602 and/or the optional Pre-Filter module 622. As a robot with VSLAM travels in an environment, the robot observes visual landmarks. When a new visual landmark is encountered, the SLAM module 604 can store the robot's global reference frame location for the particles in the SLAM database 608. For example, the robot's pose can be estimated from a previous location and the course and distance traveled from a last known pose.

When a previously created landmark is observed, the SLAM module 604 is provided with a new estimate of relative pose information, such as $\Delta x$, $\Delta y$, and $\Delta \theta$ to the observed landmark, from the Visual Front End 602 or the optional Pre-Filter module 622. The SLAM module 604 uses the change in pose information to update the one or more poses and maps 620 maintained. Accordingly, the visually observed landmarks can advantageously compensate for drift in dead reckoning measurements.

An example of a process for performing SLAM will be described in greater detail later in connection with FIG. 13.

Multiple-Hypothesis VSLAM

FIG. 7A illustrates multiple particles in a multiple-hypothesis VSLAM system 600. Multiple particles can advantageously be maintained by the SLAM module 604 such that multiple possible locations and maps can be maintained in a probabilistic manner. In the illustrated VSLAM system 600, a multi-particle approach is not used in the Visual Front End 602.

A collection of K particles 702 form the multiple hypotheses. The number of particles K in a collection can vary in a very broad range and can depend on a variety of parameters including environmental conditions, hardware configurations, available CPU resources, and the like. In one example, the number of particles K is about 200. Other usable values for the number of particles K will be readily determined by one of ordinary skill in the art. In one embodiment, the number of particles K varies adaptively according to at least one of the following: available CPU resources; a density of particles; the number of landmarks encountered; and the like.

In the illustrated architecture, each particle or hypothesis is associated with a pose and a map. In this manner, multiple hypothetical poses and multiple hypothetical maps are maintained. For example, a first particle 704 is associated with a first pose $s_1$ 706 and a first map $M_1$ 708. In one embodiment, particles that are associated with a relatively low probability of being correct are discarded, and new particles are introduced into the collection of K particles 702 by copying other particles. Perturbations, such as random perturbations, to the particle poses, which will be described later in connection with FIG. 13, permit copied particles to deviate from the original particles.

FIG. 7B illustrates one example of data associated with a hypothesis or particle 710. The hypothesis or particle 710 can be associated with a robot pose s 712 and a map M 714. The robot pose s 712 corresponds to the pose (location and orientation) of the robot as described earlier in connection with FIG. 4. In the illustrated format, the data for the robot pose s 712 is represented by a 4×1 column vector including a last update time t, an x-position x, a y-position y, and a heading $\theta$. The last update time t can be used by the SLAM module 604 to reference appropriate data from the dead reckoning data to compute the distance and course traveled when updating the robot pose s 712. It will be understood that the robot pose s 712 can be stored in a variety of forms, such as in polar coordinates and in other vector or non-vector representations.

The map M 714 includes a collection of landmarks 716. In this context, it will be understood that "landmark" refers to data in the collection that is associated with a physical landmark in the environment. It should be noted that a physical landmark can correspond to one or more objects in the environment. The number of landmarks J in the collection 716 can vary in a very broad range. Initially upon startup, the number of landmarks J can correspond to zero and can grow as landmarks are observed by the robot in the environment. Of course, the number of landmarks J in the collection 716 can vary according to the density or clutter of identifiable landmarks in the environment and the size of the environment. For example, in a test using a fairly typical apartment as a test environment, the number of landmarks J in the collection 716 has been observed in the range of about 10 to about 100. In addition, the criteria applied to determine whether visual features can be reliably detected by the Visual Front End 602 can also affect the number of landmarks J stored in the collection 716.

In the illustrated structure, a landmark is associated with a landmark tag or identifier I, a landmark pose estimate S, and an uncertainty measure, such as, for example, a covariance matrix C. Information describing the visual characteristics or image of the landmark, such as 3-D features, can be stored in a collection of data associated with the Visual Front End 602, such as in the landmark database 606. In a collection of data for the SLAM module 604, such as the SLAM database 608, a cross reference or database record identifier can be used to identify the landmark tag I. An example of a data structure for the SLAM database 608 and methods for efficiently managing VSLAM databases will be described later in connection with FIG. 8.

It should be noted that the landmark pose S corresponds to the pose of the robot itself when the robot "creates" the landmark and adds the landmark to the map. In one embodiment, the landmark pose S can also be updated when the robot re-observes the landmark. In the illustrated structure, the landmark pose S corresponds to a 3×1 column vector with the contents of an x-dimension x for global reference, a y-dimension y for global reference, and a robot heading $\theta$ relative to the global reference frame. As noted earlier, the hypothetical pose and the corresponding map can advantageously vary among the particles of a multi-particle or multiple hypothesis SLAM system.

A covariance matrix C represents the uncertainty of the landmark pose S. The symbol $C_m^k$ will be used herein to denote the covariance matrix associated with landmark k for particle m. In one embodiment, the covariance matrix $C_m^k$ is updated with a Kalman filter as will be described in greater detail later in connection with FIG. 13.

Example of a Data Structure

Figure 8:
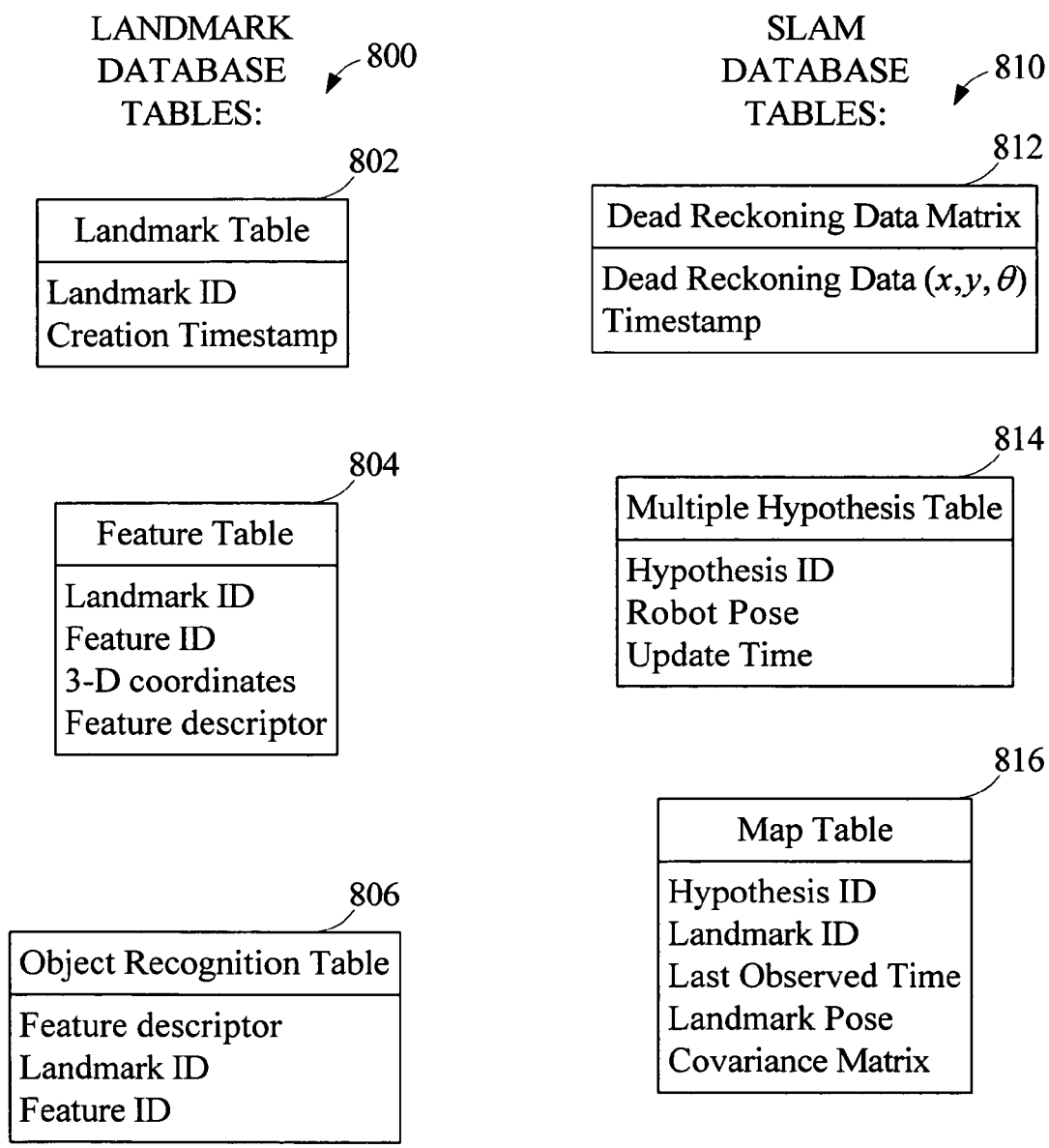
FIG. 8 illustrates one example of a data structure for a relational database that can be used with an embodiment of the method to maintain data for a visual front end and for SLAM.

FIG. 8 illustrates one example of a data structure for a relational database that can be used with an embodiment of the method to maintain data for visual localization and for SLAM.

It will be understood by one of ordinary skill in the art that a database can be implemented on an addressable storage medium and can be implemented using a variety of different types of addressable storage mediums. For example, the landmark database 606 and/or the SLAM database 608 can be entirely contained in a single device or can be spread over several devices, computers, or servers in a network. The landmark database 606 and/or SLAM database 608 can be implemented in such devices as memory chips, hard drives, optical drives, and the like. Though the data structure shown has the form of a relational database, one of ordinary skill in the art will recognize that the database may also be, by way of example, an object-oriented database, a hierarchical database, a lightweight directory access protocol (LDAP) directory, an object-oriented-relational database, and the like. The databases may conform to any database standard, or may even conform to a non-standard, private specification. The database can also be implemented utilizing any number of commercially available database products such as, by way of example, Oracle® from Oracle Corporation, SQL Server and Access from Microsoft Corporation, Sybase® from Sybase, Incorporated and the like.

The data structures shown utilize a relational database management system (RDBMS). In a RDBMS, the data is stored in the form of tables. Conceptually, data within the table is stored within fields, which are arranged into columns and rows. Each field contains one item of information. Each column within a table is identified by its column name and contains one type of information, such as a value for a SIFT feature. For clarity, column names are illustrated in the tables of FIG. 8.

A record, also known as a tuple, contains a collection of fields constituting a complete set of information. In one embodiment, the ordering of rows does not matter as the desired row can be identified by examination of the contents of the fields in at least one of the columns or by a combination of fields. Typically, a field with a unique identifier, such as an integer, is used to conveniently identify a related collection of fields.

By way of example, three tables are shown for a landmark database data structure 800, and three tables are shown for a SLAM database data structure 810. The exemplary data structures illustrate a convenient way to maintain data such that an embodiment using the data structures can efficiently store and retrieve the data therein. The tables for the landmark database data structure 800 include a Landmark Table 802, a Feature Table 804, and an optional Object Recognition Table 806.

The Landmark Table 802 stores data related to when a landmark was "created," that is, when a visual landmark was recognized as a "new" landmark and added to the landmark database 606. A Landmark ID field can be used to identify the appropriate field for a particular landmark. A Creation Timestamp field can be used to store an indication of when the landmark was observed by the robot and then added to the database. The Creation Timestamp field can be filled with a timestamp from, for example, a computer's operating system time. In one embodiment, the Landmark Table 802 is optional.

The Feature Table 804 stores data relating to the identification of a landmark and data useful for calculating a relative pose. For example, a landmark can be characterized by a plurality of 3-D features. The Feature Table 804 includes fields for a Landmark ID, a Feature ID for each 3-D feature stored, a Feature descriptor associated with each 3-D feature stored, the 3-D coordinates of each 3-D feature in the landmark reference frame, and optionally, the 2-D coordinates of the 2-D feature associated with each 3-D feature. The Landmark ID field can be used to identify the records that correspond to a particular landmark. A visual landmark is typically characterized by a number of 3-D features. Accordingly, the Feature ID field can be used to identify records that correspond to a particular feature of a landmark. The Landmark ID field for a record can be used to identify the particular landmark corresponding to the feature and be used to identify related records for other features of the landmark. The Feature descriptor field can be used to store visual information about the feature such that the feature can be readily identified upon a revisit of the landmark by the robot. The 3-D coordinate of feature field can be used to store the 3-D coordinates of the corresponding 3-D feature in the landmark reference frame. This provides a reference for projection calculations which are later used when calculating the relative pose when the landmark is re-encountered. For example, where a camera is used as the visual sensor, the 2-D image coordinates can include one or more pixel locations that correspond to the 3-D features.

The optional Object Recognition Table 806 includes the Feature descriptor field, the Landmark ID field, and the Feature ID field. The optional Object Recognition Table 806 can advantageously be indexed by the Feature descriptor, which can facilitate the matching of observed images to landmarks.

The tables for the SLAM database data structure 810 include the Dead Reckoning Data Matrix 812, a Multiple Hypothesis Table 814, and a Map Table 816. The Dead Reckoning Data Matrix 812 can include a field for dead reckoning data (x, y, θ) and a field for a timestamp. The information stored in the Dead Reckoning Data Matrix 812 can be used to estimate course and distance traveled from a previous point. In one embodiment, the Dead Reckoning Data Matrix 812 accumulates dead reckoning data on an ongoing basis. Although dead reckoning is typically relatively accurate over short distances, calibration errors, slippage, and the like can eventually accumulate in the dead reckoning data as illustrated by the second path 206 described earlier in connection with FIG. 2.

The Multiple Hypothesis Table 814 includes a Hypothesis ID field, which serves as an identifier for a hypothesis or particle in a multi-hypothesis SLAM system. A robot pose field stores the robot pose (x, y, θ), and an update time field stores a time corresponding to the last update time (t) for the particle. In one vector representation, which will be described later, the pose S includes both the pose (x, y, θ) and the last update time (t).

The Map Table 816 includes a Hypothesis ID field that identifies the hypothesis to which a particular map belongs. As described earlier in connection with FIG. 7B, a map includes one or more landmarks. A Landmark ID field identifies which records in the map table correspond to a particular landmark. In one embodiment, the same value for the Landmark ID field is used in the Landmark Table 802, in the Feature Table 804, and in the Map Table 816 for a particular landmark, but it will be understood by one of ordinary skill in the art that such identifying values can be also translated or cross referenced across disparate identifiers. A Last Observed Time field can store a timestamp that indicates the last time that the corresponding landmark information was updated. A Landmark Pose field stores a globally-referenced robot pose corresponding to when the Landmark was "created" or added, or updated to the database. It should be noted that the Landmark Pose for the "creation" pose can also be updated or refined as further measurements are made by the robot. A covariance field stores data for a covariance matrix associated with the landmark. In one embodiment, the covariance matrix is updated by a Kalman filter as will be described later in connection with FIG. 13.

The following initialization parameters can be used for the VSLAM system when the robot is started or reset or when the VSLAM system is reset. For example, when the robot is first powered up, the following initialization parameters can be used. With respect to the landmark database 606, the Landmark Table 802 and the Feature Table 804 can be initialized to be empty or cleared. With respect to the SLAM database 608, the Dead Reckoning Data Matrix 812 can be initialized such that x=0, y=0, θ=0, and such that the timestamp field corresponds to the current time for the robot. Where implemented in a personal computer, such as a laptop computer, the current time can typically be retrieved from the operating system.

Each hypothesis in the Multiple Hypothesis Table 814 can be initialized by setting a particle's pose to x=0, y=0, θ=0, and by setting the update time field for each particle to the current time. For initialization, the Map Table 816 can be cleared.

Management of Databases

It will be understood by the skilled practitioner that the size of the databases holding the various maps for the particles can grow over time as landmarks are accumulated in the maps. One embodiment of the method also include techniques for managing the databases.

The landmark database 606 and the SLAM database 608 can be managed to provide efficient performance of VSLAM processing in a diverse variety of settings and to manage the amount of memory used in VSLAM processing. One way to efficiently manage the databases is to remove landmarks from the databases that are perceived to be no longer present in the environment or can otherwise be considered unreliable, bad, or in any other way undesired.

For example, the assessment that a physical landmark has disappeared from the environment such that the corresponding landmark should be removed from the databases can be based on repeatedly not observing the physical landmark at or near poses where it is expected to be observed.

In another example, measurements that repetitively correspond to outliers, i.e., relatively extreme measurements, can also be considered to be unreliable and can be removed from the databases. For example, a landmark can be considered to be unreliable or bad if measurements of the landmark over time have been repeatedly inconsistent or otherwise indicated as unreliable. An example of a range for repeatedly inconsistent measurements is about 5 to 10 inconsistent measurements. Other appropriate values will be readily determined by one of ordinary skill in the art. In one embodiment, a measurement for a landmark is inconsistent if the measurement indicates that the robot is located relatively far away from where a relatively large proportion of the particles, such as about 90%, the SLAM subsystem predicts the robot to be. In one embodiment, the robot is determined to be located relatively far away when the SLAM prediction prior to incorporation of the new visual measurement into an estimate falls outside a 95% confidence ellipse. In one embodiment, the 95% confidence ellipse has (i) the visual measurement estimate of robot pose as its mean, and (ii) $C_{sensor}$ as its covariance matrix. In another embodiment, the robot can be determined to be located relatively far away when the difference between the pose estimated by SLAM and the pose estimated by the visual measurement exceed a predetermined threshold. An example of an appropriate value for a predetermined threshold in an indoor environment is about 2 meters. Other values will be readily determined by one of ordinary skill in the art. It should be noted that while "repeatedly inconsistent" measurements for a landmark can indicate that the landmark is unreliable, an occasionally inconsistent measurement may or may not indicate that the landmark is unreliable, but rather, such occasionally inconsistent measurements may be the result of collisions of the robot with another object, a "kidnapping" of the robot, such as by lifting and moving the robot from one spot to another, and the like. In one embodiment, such occasionally inconsistent measurements do not result in a deletion of the landmark from the databases.

In another example, landmarks can be considered undesirable when, for example, it is determined that the density of landmarks in some parts of the map is relatively high, such as about 5-10 landmarks per square meter for an indoor environment. It will be understood that the density of landmarks can vary considerably from one environment to another and that correspondingly, appropriate thresholds for "high" density will also vary and will be readily determined by the skilled practitioner. By selectively removing some of the landmarks in a too dense portion of the map, memory can be freed for other tasks.

In one embodiment, a memory management technique can be used when the landmark database has grown to a relatively large size. Typically, a mass storage device such as a hard disk is relatively slow compared to a solid-state memory device, such as random access memory (RAM). Conversely, a mass-storage device typically has much more storage capacity than a solid-state memory device. Alternatively, a solid-state memory device, such as, for example, a flash memory or an EEPROM device, can be used to store a landmark database in a non-volatile manner. Memory usage can be efficiently managed by maintaining only a relatively small fraction of the total landmark database in the relatively fast memory, such as the RAM, at a time. For example, a few initial landmark measurements and comparisons with the landmark database can typically reveal approximately where the robot is likely to be operating in a mapped environment. For example, an entire house, office, or hospital floor can be mapped as the environment; and after a few initial measurements, the VSLAM system 600 can determine that the robot is in a particular room in a house, on the first floor of an office, in a particular wing of a hospital, and the like.

To reduce the consumption of memory resources, at least partly in response to the determination of the approximate location of the robot, the VSLAM system 600 can then maintain a relatively small subset of the database in RAM that contains the relevant portion of the database, and other previously used memory resources can be released back to the system. Should, for example, a relatively long period of time transpire without successful matches with the loaded subset of the database, the entire map can again be loaded temporarily to determine if the robot has been moved or has moved to another part of the environment. For example, the robot may have traveled autonomously or may have been picked up and moved to a new location.

In one embodiment, the subset of the map that is maintained in relatively fast memory such as RAM can at least temporarily correspond to a randomly selected subset of the plurality of landmarks from the map. In another embodiment, the subset of the map that is maintained in relatively fast memory can at least temporarily correspond to a subset that is selected such that the density of landmarks remaining in the subset is relatively uniformly distributed throughout the map. These techniques can advantageously be used, for example, to assist a mobile robot with relatively limited memory resources and/or computational resources to localize itself within one or more maps.

In one embodiment, the VSLAM system advantageously discontinues adding new landmarks to the database. In one example, the VSLAM system discontinues landmark creation in a portion of an environment or in the entire environment at least partly in response to a determination that the landmark density has exceeded a predetermined threshold, such as 5-10 landmarks per square meter. For example, when a database for an environment exhibits relatively high landmark density in one portion of the environment and a relatively low landmark density in another portion of the environment, the addition of new landmarks to the database can be disabled for the portion of the environment corresponding to the relatively high landmark density in the database, and the addition of new landmarks can be enabled for portions of the environment corresponding to the relatively low landmark density.

In one embodiment, the VSLAM system discontinues adding new landmarks to the database at least partly in response to a landmark creation decay rate, i.e., a determination that over a period of time, fewer and fewer new landmarks are being identified. The measurement of the landmark creation decay rate can be applied to parts of an environment or to the entire environment. For example, in a relatively static environment under relatively constant lighting conditions, the rate at which landmarks are created will typically be highest in the beginning, before many landmarks have been created. After the area has been partially mapped by the creation of landmarks, i.e., the addition of landmarks to the database, the visual front end less frequently attempts to create landmarks. In one embodiment, a creation rate corresponds to the number of landmarks created per meter of travel. When the creation rate in a given part of the environment has dropped below a threshold, which can correspond to for example, (i) a predetermined value such as 1 landmark every 10 meters, or can correspond to (ii) a percentage of the initial creation rate such as 5% of the rate (per unit of distance traveled) obtained during the first passage through the relevant part of the environment, then landmark creation can be temporarily discontinued in that part of the environment.

In another embodiment, the VSLAM system discontinues adding new landmarks to the database for all or part of the environment at least partly in response to a ratio of visual measurements to landmarks created. In another embodiment, the discontinuing of adding landmarks can also be triggered at least partly in response to elapsed time, such as after 30 minutes of mapping, or at least partly in response to memory usage, such as when 75% of the memory has been used for the landmark database.

Visual Processing in a Visual Front End

Various processes will now be described. Processes used when revisiting previously detected landmarks will first be described. Processes used when adding newly detected landmarks to the database will then be described. These processes can be used to build a map autonomously. These processes can be used to refine existing maps and to localize the robot within one or more maps.

Figure 9:
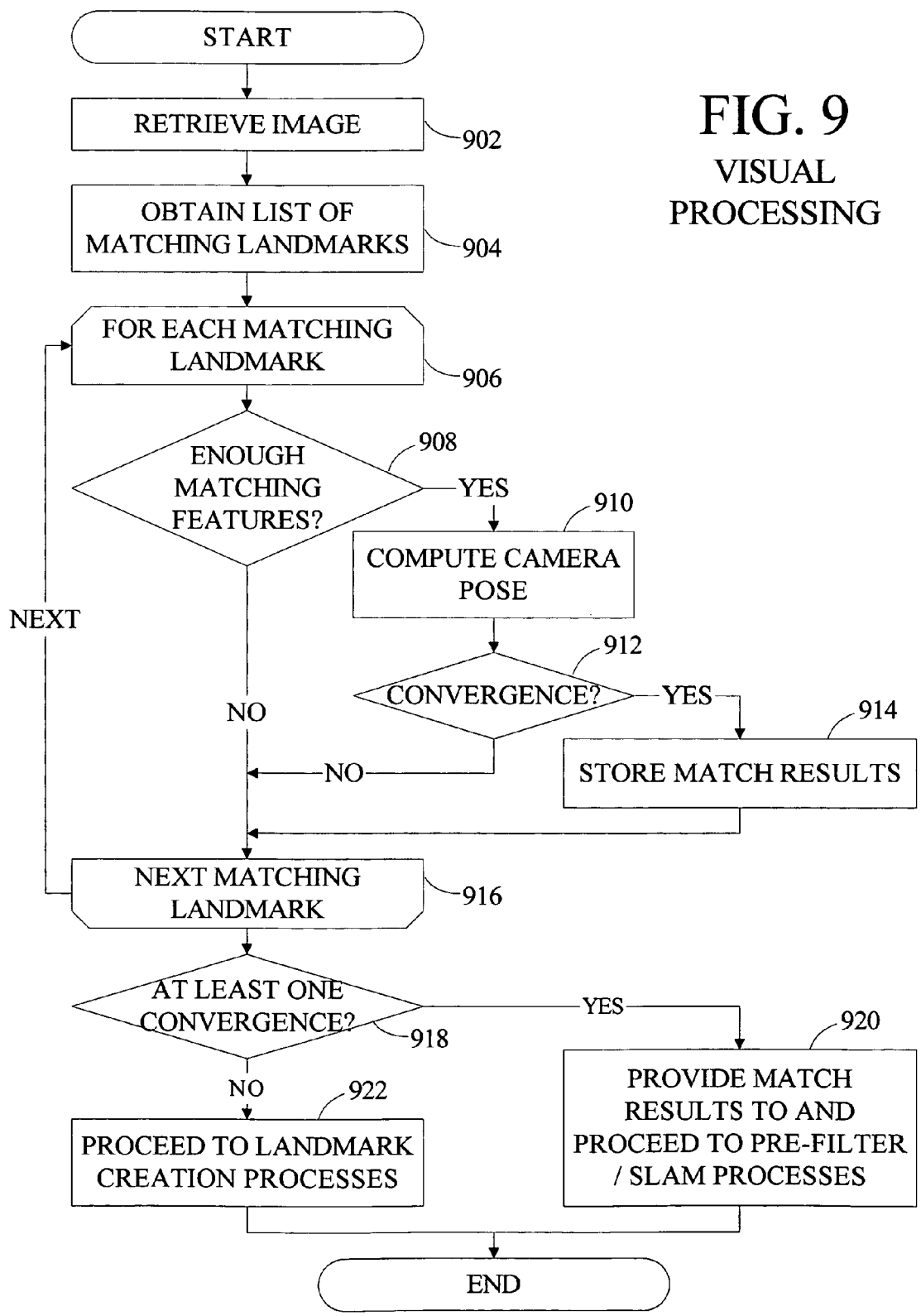
FIG. 9 is a flowchart that generally illustrates a process useful in a visual front end for visual processing.

FIG. 9 is a flowchart that generally illustrates a process that can be used in a visual front end for visual processing. As a robot with VSLAM moves in an environment, the robot analyzes the physical landmarks that it observes. Recognized landmarks can be used to localize the robot within one or more maps. Newly-created landmarks can be added to one or more maps. The act of creating a new landmark may also be referred to as "generating" a landmark. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 902, where the process retrieves an image from the visual sensor or applicable data buffer. At this point in the process, multiple viewpoints are not used. For example, where the visual sensor for the robot corresponds to multiple cameras, one image from the camera can be selected for analysis. It will be understood that the image can also be related to a timestamp, which can permit other processes to reference appropriate data from the dead reckoning sensors to the image. The process advances from the state 902 to a state 904.

In the state 904, the process generates a list of matching landmarks. For example, the process can extract feature descriptors from the image, such as SIFT feature vectors, and compare the extracted features to features for landmarks that had previously been observed and stored. For example, features for landmarks can be stored in the landmark database 606. In one embodiment, the optional Object Recognition Table 806 is used for relatively fast searching of feature descriptors. In one embodiment, the landmarks with one or more matching landmarks are identified by a list, such as a list of landmark identifiers, for further analysis. The process advances from the state 904 to the beginning of a loop 906.

The loop further compares the features of the matching landmarks identified by the list to features of the observed image. It will be understood that where no matching landmarks are identified in the state 904, the process can skip the execution of the loop and proceed to the end of the loop 916.

For each matching landmark, the loop begins at a decision block 908. In the decision block 908, the process compares the number of features that match between the image and the matching landmark. The process uses the detected features to estimate a relative pose to the landmark. In one embodiment, the number of features detected is compared to a predetermined number corresponding to the minimum number of features needed to solve the structure and motion problem. It will be understood that the minimum number of features can depend on the technique used to solve the structure and motion problem. For example, where the structure and motion problem is resolved using the trifocal tensor method, the minimum number of features for, convergence of a solution is about 5. The process proceeds from the decision block 908 to a state 910 when there are enough matching features for the landmark. Otherwise, the process proceeds to the end of the loop 916 to return to process further landmarks or to exit out of the loop.

In the state 910, the process computes the camera pose of the robot with respect to the landmark reference frame. The camera pose corresponds to the relative pose, such as $\Delta x$, $\Delta y$, and $\Delta \theta$, between the pose corresponding to the image retrieved in the state 902 and the landmark pose for the matched landmark. It will be understood that the relative pose computation can include further dimensions, such as a change in vertical component ($\Delta z$), roll, and pitch, and that the relative pose can also be represented in other coordinate system forms.

An example of the relative pose was described earlier in connection with FIGS. 5B, 5C, and 5D. The skilled practitioner will appreciate that many techniques can be used to compute the relative pose. One computationally-efficient technique to compute the relative pose is to calculate the relative pose that results in a relatively small projection error, such as the minimum projection error.

In one embodiment, the process retrieves the 3-D coordinates for the features of the landmark from a data store, such as from the Feature Table 804 of the landmark database 606. From the 3-D coordinates, the process shifts a hypothetical pose (relative to the landmark pose) and calculates new 2-D image coordinates by projection from the 3-D coordinates and the change in pose. In one embodiment, the relative pose is determined by searching in a six-dimensional 3-D pose space, such as, for example, x, y, z, roll, pitch, and yaw ($\theta$) for a point with a relatively small root mean square (RMS) projection error between the presently-measured feature coordinates and the projected coordinates from the 3-D feature to the image. The process advances from the state 910 to a decision block 912.

Iterative computations for finding numerical solutions can be used to compute the relative pose. It should be noted that such techniques do not always converge to a result. When convergence is achieved, that is, the landmark match is relatively good, the process proceeds from the decision block 912 to a state 914 to store information relating to the matched landmark. Otherwise, the process proceeds from the decision block 912 to the end of the loop 916. Of course, it will be understood that other techniques, such as relatively computationally inefficient brute force techniques, can also be used to calculate a relative pose with a relatively small projection error.

In the state 914, the process stores results relating to the matched landmark such that the results can be provided to a pre-filtering process and/or directly to SLAM processes. In one embodiment, the match results for a landmark include the landmark identifier for the evaluated landmark, the calculated camera pose, a root mean square (RMS) value of the projection error for the calculated camera pose, the number of matching features, and a computation of slope. In one embodiment, the storing of one or more of the computation of the RMS value of the projection error, the number of matching features, and the computation of slope is optional and is provided when one or more of these metrics are used by pre-filtering processes, which will be described in greater detail later in connection with FIG. 12. The process can store these metrics such that later re-computation of one or more of the results can advantageously be avoided. The process advances from the state 914 to the end of the loop 916, where the process returns to the beginning of the loop 906 to process further matching landmarks or proceeds to a decision block 918 when done with processing matching landmarks.

In the decision block 918, the process determines whether there has been at least one converging solution to solving for the relative pose or camera pose, e.g., $\Delta x$, $\Delta y$, and $\Delta\theta$. For example, in one embodiment, the process determines whether there has been at least one converging solution when the process had proceeded from the decision block 912 to the state 914 for at least one of the landmarks that were identified to be matching.

When there has been at least one convergence, this indicates that there has been at least one relatively "good" match between what was observed by the robot and at least one of the landmarks in the database, and the process proceeds from the decision block 918 to a state 920. Otherwise, the process proceeds from the decision block 918 to a state 922.

In the state 920, the process provides the match results previously stored in the state 914 to Pre-Filtering processes and/or to SLAM processes such that the matched landmarks can be used to localize the robot within the global reference frame. Advantageously, this information can be used by a SLAM process to correct for drift in the dead reckoning information. The match results can include match results for one or more landmarks. When a plurality of landmarks are identified in a single image, one embodiment of the SLAM process can process all of the plurality as will be described later in connection with FIG. 13.

Returning now to the state 922, at this point in the process, the process has determined that there are no relatively "good" matches between what was observed by the robot and the landmarks in the database, and the process proceeds to landmark creation processes, such as the process that will be described in greater detail later in connection with FIG. 10.

Visual Front End Processing for Landmark Creation (New Landmarks)

Figure 10:
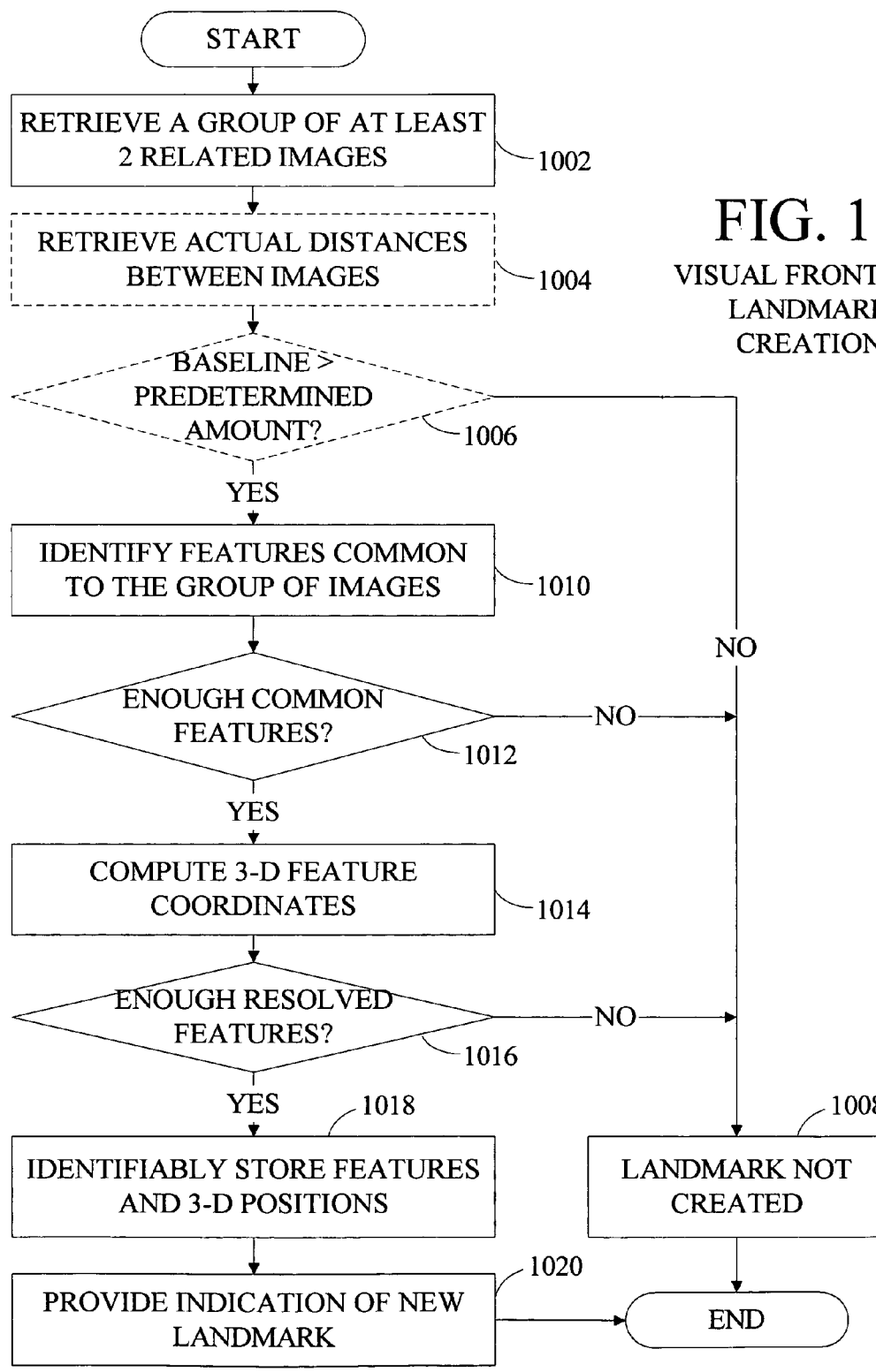
FIG. 10 is a flowchart that generally illustrates a process useful in a visual front end for creating a new landmark.

FIG. 10 is a flowchart that generally illustrates a process that can be used in a visual front end when recognizing a new physical landmark in the environment and creating a corresponding landmark in one or more maps in a database. The act of creating a new landmark may also be referred to as "generating" a landmark. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1002, where the process retrieves a group of at least 2 images for analysis. For example, the images can be provided by an visual sensor with multiple images, such as a binocular or trinocular camera, or by a visual sensor with a single imager, such as from a single camera. When images from a single camera are used, the process can select images that are appropriately spaced apart. In the illustrated embodiment, the robot is equipped with a single forward-looking camera and travels forward to take related images. Other configurations for the visual sensor are also possible. In other examples, the visual sensor can correspond to a generally upward-pointing camera, to a sideways-looking camera, or to positions between forward looking, upward, and/or sideways. Returning now to the illustrated embodiment with a single forward-looking camera, in one example, three images are selected at a separation distance of at least about 10 centimeters (cm) apart. It will be understood that an appropriate distance for the separation distance can vary in a broad range depending on the environment. For example, where the operating environment corresponds to a relatively expansive environment, such as to an outdoor environment, the appropriate distance for separation between images can be higher in order to gain perspective on the features. In one embodiment, the separation distance can be adaptively varied in response to an estimate of the proximity of obstacles that can obstruct the motion of the robot. In one embodiment, where the robot is equipped with a single forward-looking camera, the robot moves in an approximately straight line in the forward direction while taking the images. Although some turning can be tolerated while the robot is taking images, the turning should not be so excessive such that the features of the landmarks are no longer in the view of the camera. The process advances from the state 1002 to an optional state 1004.

The state 1004 and a decision block 1006 can be optional depending on the configuration of the robot. Where the robot is equipped with a visual sensor with multiple imagers, such as a trinocular camera, the state 1004 and the decision block 1006 can be skipped, and the spacing between the visual sensors can be retrieved from a stored parameter in memory. When skipped, the process advances from the state 1002 to a state 1010.

When a single camera is used as the visual sensor, and the robot moves to take different images from different perspectives, the process retrieves the actual distances between images in the state 1004 and checks the amount of movement in the decision block 1006. In one embodiment, these distances are determined by monitoring the dead reckoning data corresponding to the times at which the images were taken. The process advances from the state 1004 to the decision block 1006.

In the decision block 1006, the process tests the distance traveled between images, termed "baseline." For example, the amount of baseline between images can be compared to a predetermined value. It will be understood that the predetermined value can vary in a very broad range. In an indoor environment, such as the interior of a home or apartment, an appropriate value can be about 10 centimeters for the predetermined value. Of course, the appropriate value can depend on the environment, and other appropriate values will be readily determined by one of ordinary skill in the art. When the movement of the robot is not sufficient between one or more of the images in the group, the process proceeds to a state 1008, and the process does not create a landmark. Otherwise, the process proceeds from the decision block to the state 1010.

In the state 1010, the process analyzes the selected images to identify 2-D features that are common to the images in the group. The number of features that are observable will vary according to the environment. The extraction of suitable features has been extensively described in the literature. SIFT features are one example of such 2-D features. See, for example, David G. Lowe, *Local Feature View Clustering for 3D Object Recognition* Proceedings of the IEEE Conference on Computer Vision and Pattern Recognition, Kauai, Hi. (December 2001). It should be noted that other information used in the calculation of the features can include intrinsic camera calibration parameters and extrinsic camera parameters. Examples of intrinsic camera calibration parameters include optical center, distortion parameters, and focal length. Examples of extrinsic camera calibration parameters include a camera-rigid transformation between the camera reference frame and the local reference frame. The process advances from the state 1010 to a decision block 1012.

In the decision block 1012, the process determines whether enough features have been identified that are common to the images in the group, e.g., the three images, for reliable identification of the landmark. When, for example, the process determines that fewer than a predetermined number of features are common to the images in the group, the process can determine that there are not enough features detected to reliably identify the landmark in the future. In this case, the process can proceed from the decision block 1012 to the state 1008, and the process does not "create" a landmark. It will be understood that an appropriate value for the predetermined number of features can vary in a very broad range and can depend on the method used to identify visual features. In one embodiment, the predetermined number of features is higher for the decision block 1012 for landmark creation than a predetermined value used to compare an image to an already stored landmark as described earlier in connection with the decision block 908 of FIG. 9.

In one embodiment, where SIFT features are used, an example of a sample value for the predetermined number of features is about 10. Other suitable values will be readily determined by one of ordinary skill in the art. In one embodiment, the VSLAM system 600 can be configured to permit predetermined values to be user configurable. The process proceeds from the decision block 1012 to a state 1014 when enough features common to the images in the group have been identified.

In the state 1014, the process computes 3-D local reference frame positions or displacements to the common features identified in the state 1010. In one embodiment, the 3-D local reference frame positions correspond to the approximate 3-D position (x, y, z) of a feature relative to the visual sensor of the robot. Where multiple images are taken from a single visual sensor as the robot moves, the 3-D local reference frame positions can be relative to the position of the robot when the robot took one of the images in the group, such as the first image in the group. In one example, the computations for the 3-D positions are resolved by solving the structure and motion problem using the trifocal tensor method. It will be understood that the features can occupy a space larger than a point, such that the correspond 3-D positions can be relatively approximate. The process advances from the state 1014 to a decision block 1016.

In the decision block 1016, the process determines whether there have been enough 3-D local reference frame positions for features resolved in the state 1014 for the landmark to be reliably recognized. It will be understood that occasionally, the process may not find a solution to the 3-D local reference frame positions for a particular feature such that the number of 3-D features with corresponding displacement information can be different than the number of such initially-detected features. For example, in the decision block 1016, the process can compare a count of the 3-D local reference frame positions resolved for features of a landmark to a predetermined number. In one embodiment, where SIFT features are used, the process determines that a landmark has a sufficient number of features with 3-D local reference frame positions resolved for relatively reliable recognition when there have been 10 or more such features resolved. Other appropriate values will be readily determined by one of ordinary skill in the art. The process proceeds from the decision block 1016 to a state 1018 when the landmark has been determined to be reliably recognized. Otherwise, the process proceeds from the decision block 1016 to the state 1008, and the process does not "create" a landmark.

In the state 1018, the process identifiably stores the features, the 3-D positions, and, optionally, the approximate 2-D image locations corresponding to the features for the image that is used as the reference. For example, the 3-D position and the 2-D image location for a feature can be stored in a record in the Feature Table 804 described earlier in connection with FIG. 8. It will be understood that each landmark that is created should have a unique reference, such as a unique numbered identifier, and that each feature of a reference should also be identifiable, such as by a combination of the reference for the landmark, e.g., Landmark ID, and the reference for the feature, e.g., Feature ID. The process advances from the state 1018 to a state 1020.

In the state 1020, the process provides an indication that a new landmark has been created to other processes, such as processes related to the SLAM portion of VSLAM. An example of a SLAM process for creation of a landmark will be described later in connection with FIG. 11. Another example of a process that incorporates robust fusion techniques for creating a new landmark will be described in greater detail later in connection with FIG. 20. For example, the indication can be provided as a parameter or flag in a software call, a hardware or a software interrupt, and the like. The indication can also be accompanied by the landmark identifier for the newly created landmark.

SLAM Processing for New Landmarks

Figure 11:
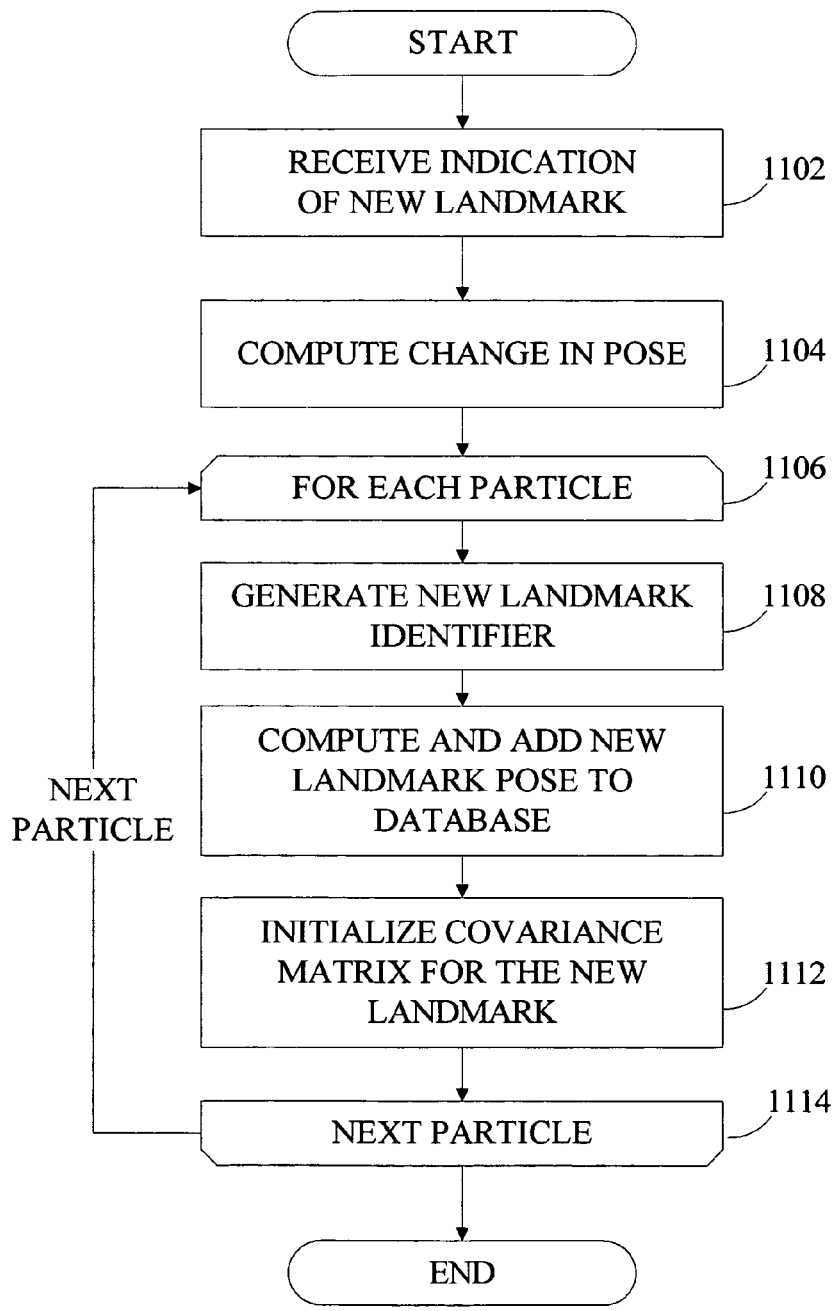
FIG. 11 is a flowchart that generally illustrates a process useful in a SLAM module for creating a new landmark.

FIG. 11 is a flowchart that generally illustrates a process that can be used in a SLAM module when creating a new visual landmark. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like. A process that can be used in a SLAM module when returning to an existing landmark will be described later in connection with FIG. 13. In a SLAM module, a landmark is represented by the pose of the landmark reference frame in the global reference frame, i.e., the transformation (rotation and translation) that relates the landmark reference frame to the global reference frame.

Returning to the process illustrated in FIG. 11, the process begins at a state 1102, where the process receives an indication that a new landmark has been observed. For example, the process can receive the indication of the new landmark and a corresponding identifier for the new landmark from the state 1020 of the process described earlier in connection with FIG. 10. The process advances from the state 1102 to a state 1104.

In the state 1104, the process computes the change in pose from a last update time for the SLAM system. In one embodiment, all the particles of a SLAM system are updated at the same time such that the last update time for a particular particle is the same as the last update time for the other particles.

The change in pose is computed by retrieving data provided by the dead reckoning sensors and/or interface. In one embodiment, the process retrieves the appropriate data from a data store, such as from a database including the Dead Reckoning Data Matrix 812 described earlier in connection with FIG. 8. For example, a timestamp associated with the last update time for the particles and a timestamp associated with the recognition of the observed landmark can be used to identify the appropriate data to be retrieved from the Dead Reckoning Data Matrix 812. In one embodiment, the process computes a change in pose $[\Delta_1, \Delta_2, \Delta_3]^T$ from the dead reckoning data, the results of which will be used later to estimate or predict the pose of a robot in the global reference frame and/or update the landmark pose.

$$\Delta^{odom} = \begin{bmatrix} \Delta_1^{odom} \\ \Delta_2^{odom} \\ \Delta_3^{odom} \end{bmatrix} \quad \text{Equation 1}$$

$$= \begin{bmatrix} \sqrt{(y_l - y_k)^2 + (x_l - x_k)^2} \\ \left[\left(\arctan\left(\frac{y_l - y_k}{x_l - x_k}\right) - \theta_k + \pi\right) \mod 2\pi\right] - \pi \\ [(\theta_l - \theta_k + \pi) \mod 2\pi] - \pi \end{bmatrix}$$

In Equation 1, the change in pose from a first dead, reckoning pose at time k $(x_k, y_k, \theta_k)$ to a second dead reckoning pose at time l $(x_l, y_l, \theta_l)$ is computed. In one embodiment, the change in pose is computed by a function call, such as a call to a "DeltaPose" subroutine. A variable $\Delta_1^{odom}$ corresponds to the Euclidean distance between $(x_k, y_k)$ and $(x_l, y_l)$. A variable $\Delta_2^{odom}$ corresponds to the bearing from the robot at time k to the robot at time l. A variable $\Delta_3^{odom}$ represents the change in heading from the robot at time k to the robot at time l. The "mod" denotes the arithmetic modulus operator. The process advances from the state 1104 to the beginning of a loop 1106.

Where multiple particles are used to track multiple hypothesis, the loop updates each particle that is maintained. The loop starts at a state 1108. In the state 1108, the process retrieves the landmark identifier for the newly defined landmark. In one embodiment, the same landmark identifier is used to identify a landmark in a SLAM process as the identifier for the landmark in a visual localization process. Of course, a different landmark identifier can also be generated and cross-referenced. It should also be noted that the SLAM process does not need to store graphical information, such as 3-D features, of the landmark. Rather, the SLAM process can operate by identification of which landmark was encountered, such as the Landmark ID, such that a database record identifier can be used to identify the landmarks within SLAM. The process advances from the state 1108 to a state 1110.

In the state 1110, the process adds the new landmark pose to the database. It should be noted that in the illustrated embodiment, the initial estimate of the new landmark pose is the estimated pose of the robot corresponding to when the landmark was observed that is stored in the database and not the estimated position in space of the physical landmark itself. To add the new landmark pose to the database, the process estimates the current pose of the robot for the particle corresponding to the particular iteration of the loop. In one embodiment, the current pose is estimated by combining the change in pose from the dead reckoning data as calculated in the state 1104 with the previous pose of the robot for the particle as retrieved from the last time that the particle was updated. Equation 2 expresses one way to combine the change in pose $[\Delta_1^{odom}, \Delta_2^{odom}, \Delta_3^{odom}]^T$ with a previous pose $(x_k, y_k, \theta_k)$ to generate a new pose $(x_l, y_l, \theta_l)$, which is used as the new landmark pose. It will be understood that the subscripts of k and l as used in the state 1110 represent different variables than the same subscripts of k and l as used in the state 1104.

$$\begin{bmatrix} x_l \\ y_l \\ \theta_l \end{bmatrix} = \begin{bmatrix} x_k + \Delta_1^{odom} \cos(\theta_k + \Delta_2^{odom}) \\ y_k + \Delta_1^{odom} \sin(\theta_k + \Delta_2^{odom}) \\ [(\theta_k + \Delta_3^{odom} + \pi) \mod 2\pi] - \pi \end{bmatrix} \quad \text{Equation 2}$$

In one embodiment, the new robot pose $(x_l, y_l, \theta_l)$ is computed by a function call, such as a call to a "PredictPose" subroutine. The process advances from the state 1110 to a state 1112.

In the state 1112, the process initializes the landmark covariance matrix $C_m^k$ associated with the particle corresponding to the iteration of the loop, where m is a particle loop variable and where k is a landmark loop variable. In one embodiment, the landmark covariance matrix $C_m^k$ is initialized to a diagonal matrix 3×3 matrix. In one embodiment, the landmark covariance matrix $C_m^k$, is initialized to a diagonal matrix of diag (81 cm², 81 cm², 0.076 rad²). Other suitable initialization values for the landmark covariance matrix $C_m^k$ will be readily determined by one of ordinary skill in the art. The values for the landmark covariance matrix $C_m^k$ can be stored in a record in the Map Table 816. It will be understood that appropriate initialization values can vary in a very broad range and can depend on a variety of factors, including camera specification, dead reckoning equipment precision, and the like. The process proceeds from the state 1112 to the end of the loop 1114. The process returns to the beginning of the loop 1106 when there are remaining particles to be updated. Otherwise, the process ends.

Pre-Filtering Process

Figure 12:
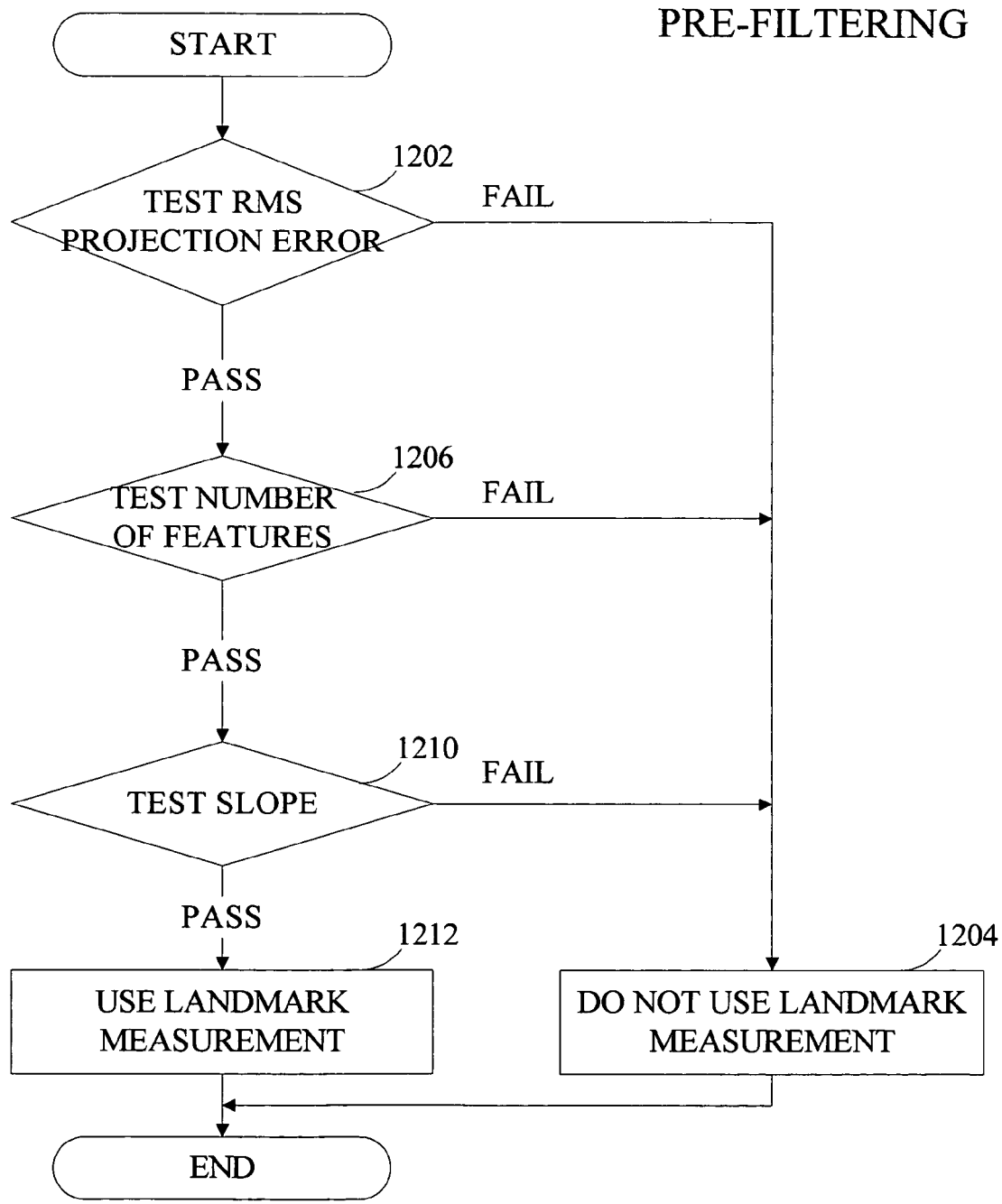
FIG. 12 is a flowchart that generally illustrates a process useful in a pre-filter for removing outliers.

FIG. 12 is a flowchart that generally illustrates a process that can be used in a pre-filter of a VSLAM system to remove outliers. In one embodiment, the Pre-Filtering process is optional. The Pre-Filtering process can advantageously be configured to prevent a SLAM module from receiving unreliable measurements of landmarks that may or may not have been unreliably identified. This can advantageously enhance the stability and robustness of VSLAM. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

In the illustrated process, three tests are used to establish the reliability of an observed landmark. It will be understood that in another embodiment, fewer tests can be used or other tests can be added. In one embodiment, the tests are based on data or metrics computed by the Visual Front End 602, and the processing for the pre-filter is performed in the Pre-Filter module 622. This data can be provided in a list of matching landmarks as described earlier in connection with the state 920 of the process of FIG. 9. When more than one visual measurement is provided in a list, the Pre-Filtering process can be repeated to process each visual measurement in the list. The change in pose is relative to the pose that the robot had when the landmark was created.

The process starts at a decision block 1202, where the process evaluates the level of the RMS projection error encountered when computing the landmark pose, e.g., $\Delta x$, $\Delta y$, and $\Delta \theta$, relative to the robot. In one embodiment, the relative pose is estimated by searching in a six-dimensional 3-D pose space for a pose with a relatively small RMS projection error as described earlier in connection with the state 910 of FIG. 9. Advantageously, the RMS projection error does not have to be recomputed by the pre-filter process. In one embodiment using a camera as the visual sensor, when the RMS projection error is less than about 3 pixels, the test for RMS projection error is considered passed. The process proceeds from the decision block 1202 to a decision block 1206 when the test is passed. Otherwise, when the test has not passed, the process proceeds from the decision block 1202 to a state 1204.

In the state 1204, the measurement of the observed landmark is considered to be unreliable, and the process does not use the computed landmark measurement for updating the robot pose and the map in SLAM. In one embodiment, this is accomplished by not executing a SLAM process for relative measurements computed in the visual front end or by not informing the SLAM module that a previously defined landmark has been re-encountered. In one embodiment, the Pre-Filtering process effectively ignores measurements that did not pass one or more tests from the list of landmark measurements provided by the state 920 of FIG. 9. The process then proceeds from the state 1204 to end and can be repeated as desired for other landmark measurements that have been computed.

Returning now to the decision block 1206, at this point in the process, the landmark measurement has passed the RMS projection error test (where used). In the decision block 1206, the process analyzes the number of features for the image that favorably compared with the features of the landmark. In one embodiment, the process compares the number to a predetermined threshold. Appropriate values for the predetermined threshold can vary in a very broad range. In one example, when the number of matching features is at least 10, the landmark measurement has passed the test for the number of features. The process proceeds from the decision block 1206 to a decision block 1210 when the landmark measurement passes the test. The process proceeds from the decision block 1206 to the state 1204 and does not use the potentially unreliable landmark measurement when the landmark does not pass the test.

In the decision block 1210, the process compares the calculated slope for the floor to a predetermined value as a test for reliability. The change in pose that is calculated for the robot can include multiple dimensions, such as the six-dimensions of x, y, z, roll, pitch, and yaw. It should be noted that robots come in a variety of shapes and forms. Many land-based robots can travel horizontally along a floor, but are not configured to raise up or down in the vertical dimension z. In addition, many environments are relatively flat, such that the presence or absence of a sloping floor can be used as an indicator of the reliability of the detection of a landmark. The slope can be computed by, for example, dividing the value calculated for the vertical dimension ($\Delta z$) by a change in horizontal dimension, such as Euclidean distance traversed along the floor. An example of such a calculation is expressed in Equation 3.

$$\text{slope} = \left| \frac{\Delta z}{\sqrt{(\Delta x)^2 + (\Delta y)^2}} \right| \quad \text{Equation 3}$$

In one embodiment, when the magnitude of the calculated slope is less than about 0.1, the test is a pass. Other appropriate values will be readily determined by one of ordinary skill in the art. In one embodiment, the testing of the slope can be enabled or disabled via configuration by a user such that a robot that operates in a not relatively flat environment, or a robot that can move in the vertical dimension, can bypass the slope tests. The process proceeds from the decision block 1210 to a state 1212 when the result of the test is a pass or is bypassed. Otherwise, when the result of the test is a fail, the process proceeds from the decision block 1210 to the state 1204, so that the potentially unreliable landmark measurement is not used.

In the state 1212, at this point in the process, the landmark measurement has passed the reliability tests, and the process permits the use of the landmark measurement. This can be accomplished by providing the SLAM module with an indication that one or more landmarks has been observed. In one embodiment, the process permits the observed landmark data, such as the delta pose information, landmark identifier, and an associated timestamp, to pass from the Visual Front End 602, through the Pre-Filter module 622, and onto the SLAM module 604. It will be understood that the process can be repeated when more than one landmark has been detected such that an entire list of landmark measurements can be processed, and that the measurements not rejected by the Pre-Filtering process can be processed by the SLAM module. The process then ends and can be repeated again as the robot moves about and re-encounters landmarks.

SLAM Processing for Revisiting Landmarks

Figure 13A:
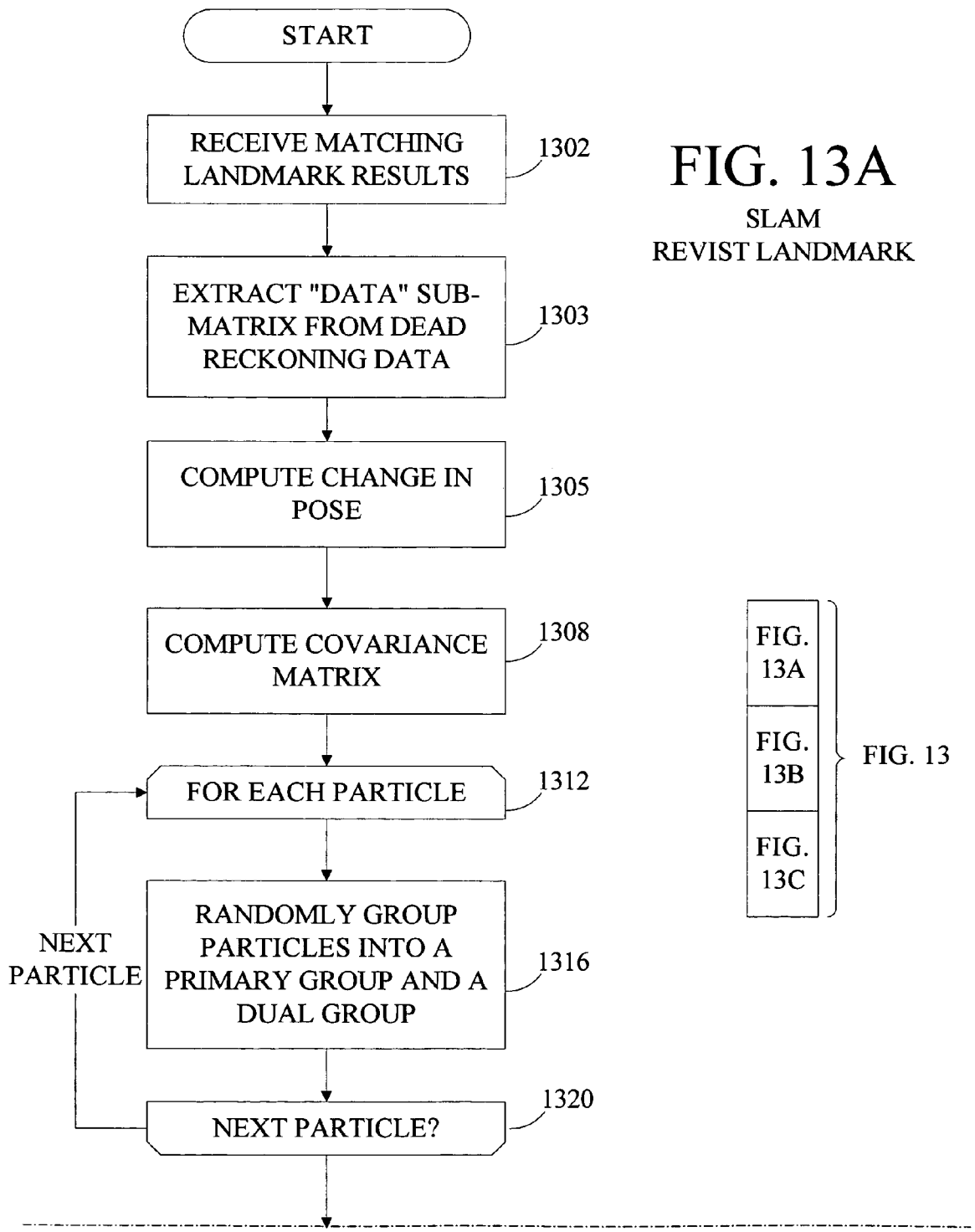
FIG. 13 consists of FIGS. 13A, 13B, and 13C and is a flowchart that generally illustrates a process useful in a SLAM module when re-encountering a landmark.
Figure 13B:
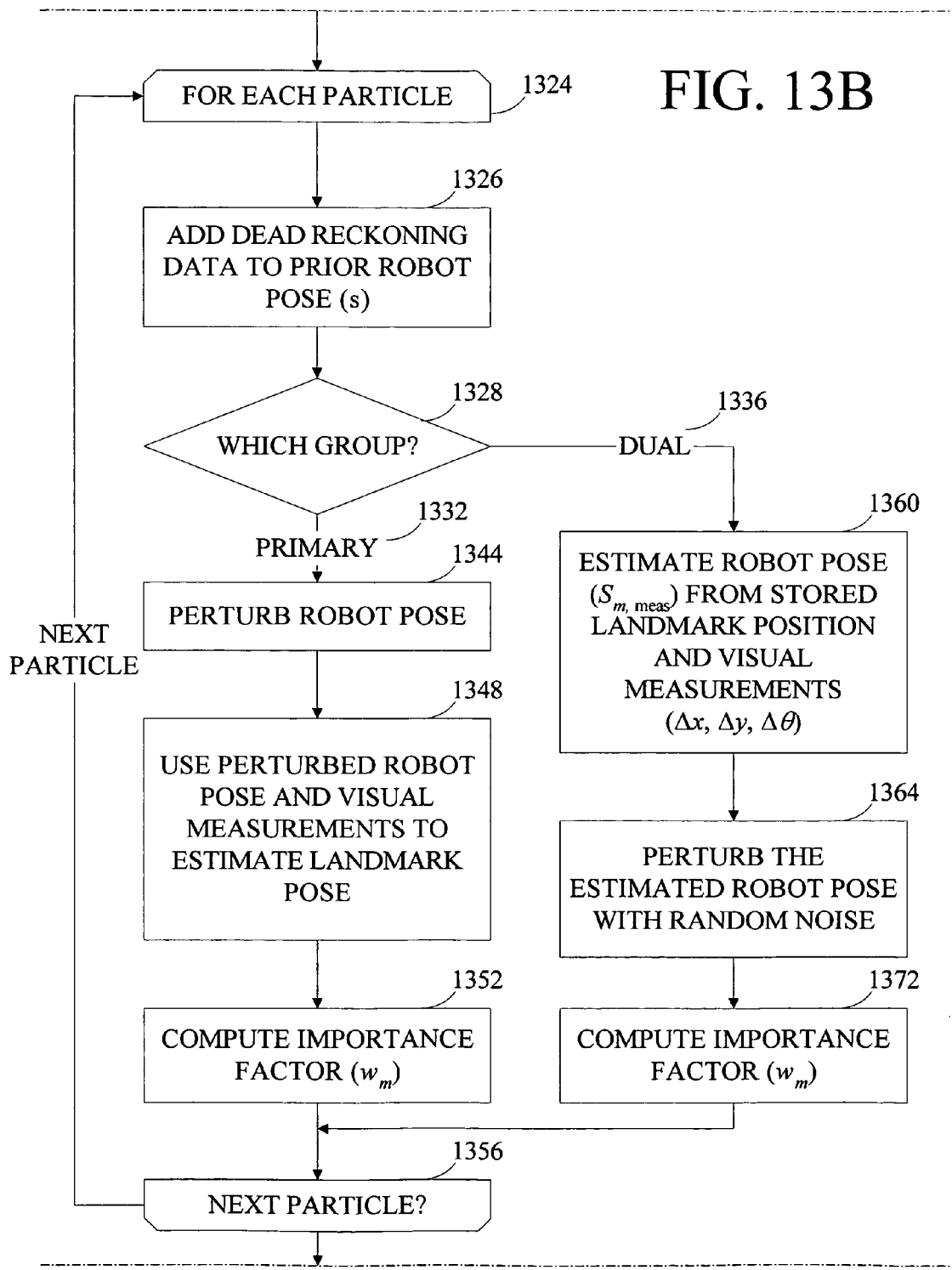
Figure 13C:
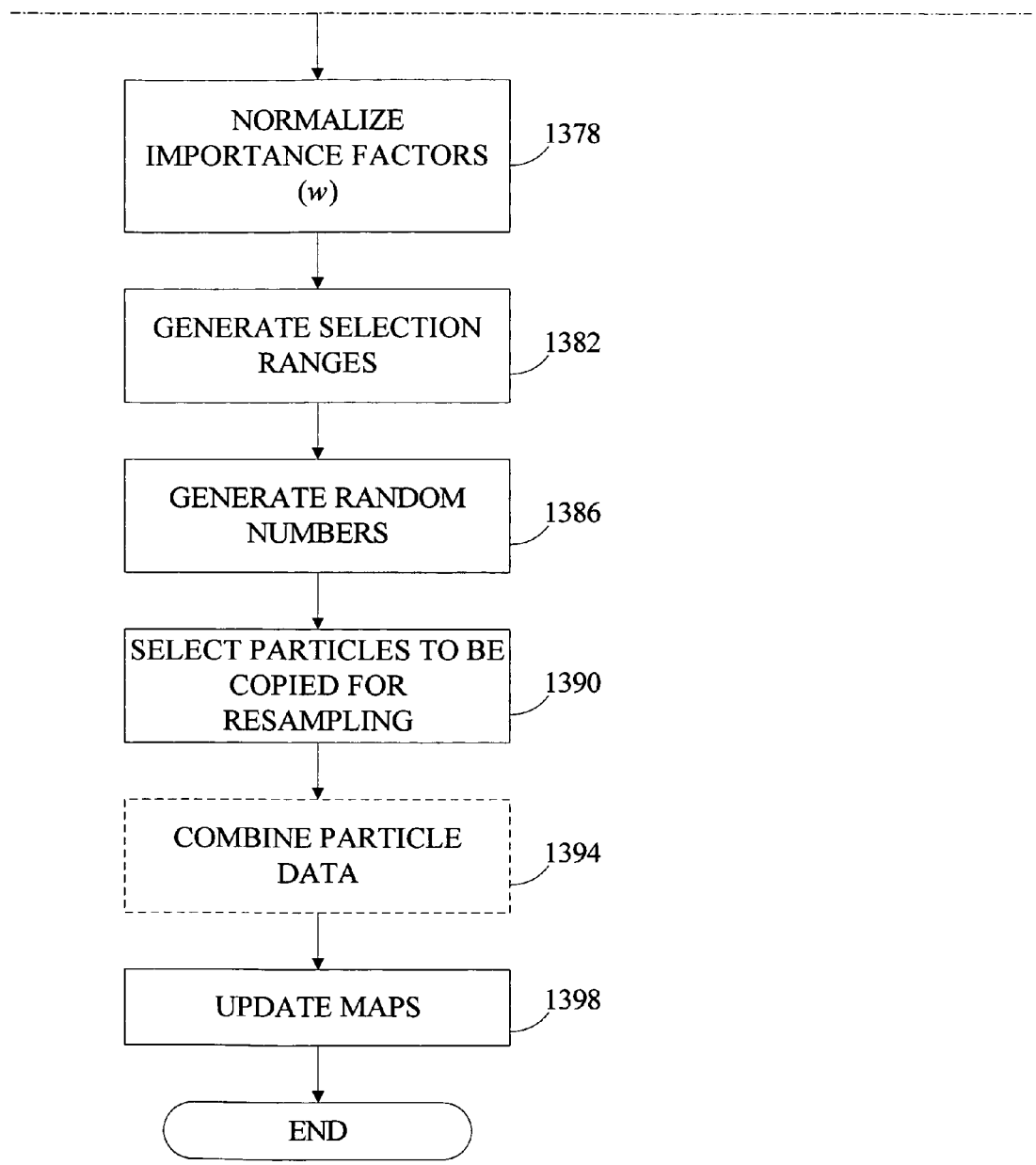

FIG. 13 is a flowchart that generally illustrates a process that can be used in a SLAM module when a landmark is re-encountered. The illustrated SLAM process advantageously updates one or more particles with information obtained from a combination of one or more visual sensors and one or more dead reckoning sensors. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1302, where the process receives matching landmark data. The process can be used with or without a Pre-Filtering process, such as the process described earlier in connection with FIG. 12. For example, the SLAM process of FIG. 13 can receive unfiltered landmark measurement data from the state 920 of FIG. 9 or can receive filtered data from the state 1212 of FIG. 12. The process advances from the state 1302 to a state 1303.

In the state 1303, a sub-matrix is extracted from dead reckoning data, such as from the Dead Reckoning Data Matrix 812. In one embodiment, the sub-matrix, denoted D, corresponds to a 3×M matrix as illustrated in Equation 4.

$$D = \begin{pmatrix} x_{old} & x_1 & \cdots & x_{M-2} & x_{new} \\ y_{old} & y_1 & \cdots & y_{M-2} & y_{new} \\ \theta_{old} & \theta_1 & \cdots & \theta_{M-2} & \theta_{new} \end{pmatrix} \quad \text{Equation 4}$$

In Equation 4, variables $x_{old}$, $y_{old}$, and $\theta_{old}$ correspond to a pose according to dead reckoning data from about the time of the last update for the particles $t_{old}$. Variables $x_{new}$, $y_{new}$, and $\theta_{new}$ correspond to a pose according to dead reckoning data at about the time $t_{new}$ that the landmark was re-encountered. Variables in columns 2 through M−1, i.e., $x_1$, $y_1$, and $\theta_1$ and $x_{M-2}$, $y_{M-2}$, and $\theta_{M-2}$ (and values in-between as applicable), correspond to data retrieved from the Dead Reckoning Data Matrix 812 at times between $t_{old}$ and $t_{new}$. In one embodiment, if no data point for the dead reckoning data is available at about times $t_{old}$ and/or $t_{new}$, the variables $x_{old}$, $y_{old}$, and $\theta_{old}$ and $x_{new}$, $y_{new}$, and $\theta_{new}$ can be interpolated from surrounding data. The process advances from the state 1303 to a state 1305.

In the state 1305, the process computes the change in pose traveled from a last update time for the SLAM system. In one embodiment, all the particles of a SLAM system are updated at the same time such that the last update time for a particular particle is the same as the last update time for the other particles. An example of change in pose computations were described earlier in connection with the state 1104 of FIG. 11. The process advances from the state 1305 to a state 1308.

In the state 1308, the covariance for dead reckoning data is computed. The dead reckoning covariance estimates errors in the dead reckoning data. It will be understood that the dead reckoning covariance can be computed by a variety of techniques, and that the computation can vary depending on the type of dead reckoning sensor used. In one embodiment, where the dead reckoning sensor is an odometer, the covariance is computed as follows and will be denoted "odometer covariance," and denoted $C_{odom}(D)$ and corresponds to a 3×3 matrix. While illustrated generally in the context of odometry, it will be understood by the skilled practitioner that the principles and advantages described herein will be applicable to other forms of dead reckoning sensors such that in another embodiment, the odometry covariance $C_{odom}(D)$ can correspond to a dead reckoning covariance $C_{dr}$.

The error noise modeled with the odometer covariance $C_{odom}(D)$ models the additional incremental noise in the dead reckoning from a pose A to another pose B for the values in the data sub-matrix D. In one embodiment, the odometer covariance $C_{odom}(D)$ corresponds to the final value of a matrix $C_{temp}$, that is, starts from an initial condition and is iteratively calculated between columns of the data sub-matrix D, for example, iteratively computed M−1 times. The value of the matrix $C_{temp}$ is initialized to a random noise covariance matrix $C_{RN}$ as expressed in Equation 5.

$$C_{temp} = C_{RN} \quad \text{Equation 5}$$

In one embodiment, the random noise covariance matrix $C_{RN}$ corresponds to a diagonal matrix diag (2.8 cm², 2.8 cm², 0.0001 rad²). It will be understood that appropriate values for the random noise covariance matrix $C_{RN}$ can vary according to the characteristics of the dead reckoning sensor used. Other appropriate values for the random noise covariance matrix $C_{RN}$ will be readily apparent to one of ordinary skill of the art.

The process then enters a loop that executes M−1 times. In the illustrated example, a loop variable i starts from 2 and ends at M, and corresponds to a column in the data sub-matrix D. For each pass through the loop, the process computes Equation 6 to Equation 11. In one embodiment, the loop variable i increments after a pass through the loop, that is, after computing Equation 11 and before returning to Equation 6.

$$d_{AB} = \sqrt{(D_{1,i} - D_{1,i-1})^2 + (D_{2,i} - D_{2,i-1})^2} \quad \text{Equation 6}$$

$$\phi_h = D_{3,i-1} - D_{3,1} \quad \text{Equation 7}$$

$$\phi_r = [(D_{3,i} - D_{3,i-1} + \pi) \bmod 2\pi] - \pi \quad \text{Equation 8}$$

$$\varphi = \phi_h + \frac{\phi_r}{2} \quad \text{Equation 9}$$

$$G = \begin{bmatrix} \cos\varphi & -(d_{AB}\sin\varphi)/2 \\ \sin\varphi & (d_{AB}\cos\varphi)/2 \\ 0 & 1 \end{bmatrix} \quad \text{Equation 10}$$

$$C_{temp} = C_{temp} + d_{AB}^2 G \begin{bmatrix} d_s^2 & 0 \\ 0 & r_s^2 \end{bmatrix} G^T \quad \text{Equation 11}$$

It will also be understood that the subscripts for data sub-matrix D indicate a value taken from the row and column specified by the subscript, with the row appearing first in the subscript. Equation 6 computes the Euclidean distance $d_{AB}$ traveled from a point A to a point B as obtained from the data sub-matrix D. Equation 7 computes a relative heading $\phi_h$ from a point A to a point B. Equation 8 computes a change in orientation $\phi_r$. Equation 9 computes an average heading $\varphi$ from a point A to a point B. Equation 10 computes a matrix G, which is used to transform a column vector with error information in translational error and rotational error into another column vector with error information in x error, y error, and orientation ($\theta$) error. Equation 11 represents an update formula for the dead reckoning covariance from a point A to a point B, in which a previous value of the matrix $C_{temp}$ is used. It will be understood that the superscript "T" for the matrix $G^T$ indicates the transpose of the matrix G. In Equation 11, $d_s$ corresponds to the standard deviation of translation error per unit of traveled translational distance, and $r_s$ corresponds to the standard deviation of rotation error per unit of traveled translational distance. In one embodiment, $d_s$ and $r_s$ correspond to parameters with values of 0.05 and 0.0001, respectively. Other appropriate values will be readily determined by one of ordinary skill in the art. In addition, it will be understood by the skilled practitioner that the mathematical formulae expressed in Equation 6 to Equation 11 can be expressed in many alternative expressions such as by combining equations and changing variable names. The process then increments the value for the loop variable and returns to Equation 6. When the processing of the columns of the data sub-matrix D is complete, the final value of a matrix $C_{temp}$ is used as the odometer covariance $C_{odom}(D)$ and applied to one or more particles.

In the loop that includes the beginning of the loop 1312, a state 1316, and the end of the loop 1320, the process associates a particle with either a first group or a second group. A particle belonging to the first group is termed "primary particle" herein. A particle belonging to the second group is termed a "dual particle" herein. The rate of probability at which particles are allocated to the first group is termed "primary rate" herein. It will be understood that the primary rate can vary in a very broad range. An appropriate value for the primary rate can depend on the relative reliability of dead reckoning measurements over relatively short distances. For example, where dead reckoning measurements are relatively unreliable, relatively lower values for the primary rate are used. In one embodiment, the primary rate is about 0.9 such that about 90% of the particles are grouped as primary particles and about 10% of the particles are grouped as dual particles. In one embodiment, two different particles in the multiple hypotheses have about the same probability of being associated with the first group (e.g., a probability of 0.9) or with the second group (e.g., a probability of 0.1), and such association is performed in an approximately random manner. Upon completion of the loop, the process proceeds to the beginning of a loop 1324.

The beginning of the loop 1324 starts at a state 1326. In the state 1326, the process predicts or estimates a new robot pose for the m-th particle $S_{m,pred}$ from the previous robot pose for the m-th particle $s_m$ $(x_{m,old}, y_{m,old}, \theta_{m,old})^T$ by retrieving the change in pose $[\Delta_1^{odom}, \Delta_2^{odom}, \Delta_3^{odom}]^T$ obtained via dead reckoning data as described earlier in connection with the state 1305 of FIG. 13 and Equation 1, and combining the change in pose $[\Delta_1^{odom}, \Delta_2^{odom}, \Delta_3^{odom}]^T$ with the previous pose $s_m$ $(x_{m,old}, y_{m,old}, \theta_{m,old})^T$ using the process described in the state 1110 of FIG. 11 and in Equation 2, where $(x_k, y_k, \theta_k) = (x_{m,old}, y_{m,old}, \theta_{m,old})$, and the new robot pose $S_{m,pred}$ corresponds to $(x_l, y_l, \theta_l)^T = (x_{m,pred}, y_{m,pred}, \theta_{m,pred})^T$. The process advances from the state 1326 to a decision block 1328.

In the decision block 1328, the process selects a primary processing path 1332 or a dual processing path 1336. The primary processing path 1332 includes a state 1344, a state 1348, and a state 1352. The dual processing path 1336 includes a state 1360, a state 1364, and a state 1372.

In the state 1344, the process retrieves the predicted pose calculated in the state 1326 and perturbs the predicted pose. In one embodiment, the process adds simulated Gaussian random noise $(\epsilon_{x,m}, \epsilon_{y,m}, \epsilon_{\theta,m})^T$ to the predicted pose $S_{m,pred} = (x_{m,pred}, y_{m,pred}, \theta_{m,pred})^T = (S_{m,pred}(1), S_{m,pred}(2), S_{m,pred}(3))^T$ to produce the perturbed predicted pose $\tilde{S}_{m,pred}$. In one embodiment, the simulated Gaussian random noise $(\epsilon_{x,m}, \epsilon_{y,m}, \epsilon_{\theta,m})^T$ is sampled from a Gaussian distribution with mean $(0, 0, 0)^T$ and covariance $C_{odom}$.

$$\tilde{S}_{m,pred} = \begin{pmatrix} S_{m,pred}(1) + \varepsilon_{x,m} \\ S_{m,pred}(2) + \varepsilon_{y,m} \\ [(S_{m,pred}(3) + \varepsilon_{\theta,m} + \pi) \bmod 2\pi] - \pi \end{pmatrix} \quad \text{Equation 12}$$

Equation 12 expresses a calculation for the perturbed predicted pose. The process advances from the state 1344 to the state 1348.

In the state 1348, the process predicts or estimates the landmark pose $L_{m,meas}^k$ from the perturbed predicted pose $\tilde{S}_{m,pred}$ and from the visual measurements obtained from the visual localization module and/or the Pre-Filter module. Later, this predicted or estimated landmark pose $L_{m,meas}^k$ will be compared to a current landmark pose estimate $L_m^k$ from the current map of the landmark associated with the particle. Equation 14 expresses one formula that can be used to predict the predicted landmark pose $L_{m,meas}^k$. The process advances from the state 1348 to the state 1352.

$$\Delta^{vis} = \begin{bmatrix} \Delta_1^{vis} \\ \Delta_2^{vis} \\ \Delta_3^{vis} \end{bmatrix} = \begin{bmatrix} \sqrt{(\Delta x)^2 + (\Delta y)^2} \\ \arctan(\Delta y / \Delta x) \\ \Delta\theta \end{bmatrix} \quad \text{Equation 13}$$

$$L_{m,meas}^k = \begin{bmatrix} \tilde{S}_{m,pred}(1) + \Delta_1^{vis} \cos(\tilde{S}_{m,pred}(3) + \Delta_2^{vis}) \\ \tilde{S}_{m,pred}(2) + \Delta_1^{vis} \sin(\tilde{S}_{m,pred}(3) + \Delta_2^{vis}) \\ [(\tilde{S}_{m,pred}(3) + \Delta_3^{vis} + \pi) \bmod 2\pi] - \pi \end{bmatrix} \quad \text{Equation 14}$$

In the state 1352, the process computes an importance factor $w_m$ for the primary processing path 1332. The importance factor $w_m$ can be computed by application of Equation 15 to Equation 18.

$$C = C_{sensor} + C_m^k \quad \text{Equation 15}$$

$$\Delta = \begin{pmatrix} \Delta_1 \\ \Delta_2 \\ \Delta_3 \end{pmatrix} = L_{m,meas}^k - L_m^k \quad \text{Equation 16}$$

$$\Delta_3 = [(\Delta_3 + \pi) \bmod 2\pi] - \pi \quad \text{Equation 17}$$

$$w_m = \frac{1}{2\pi\sqrt{\det C}} \exp\left(-\frac{1}{2}\Delta^T C^{-1} \Delta\right) \quad \text{Equation 18}$$

In Equation 15, the sensor covariance matrix $C_{sensor}$ corresponds to a 3×3 matrix. In one embodiment, the sensor covariance matrix $C_{sensor}$ corresponds to a diagonal matrix diag (81 cm$^2$, 81 cm$^2$, 0.019 rad$^2$). Other representative values for the elements of the covariance matrix will be readily determined by one of ordinary skill in the art. For example, these appropriate values for the elements of the sensor covariance matrix $C_{sensor}$ can vary with camera resolution, average distance to 3-D features, and the like. In Equation 18, the "exp" indicates exponentiation with a base of "e"; i.e., the base of natural logarithms. In one embodiment, the importance factor $w_m$ is identifiably stored for the particle and is later used to estimate the probability for the particle. The process proceeds from the state 1352 to the end of the loop 1356. The process repeats the loop by returning from the end of the loop 1356 to the beginning of the loop 1324 to process other particles. Otherwise, the process proceeds to a state 1378.

Returning now to the decision block 1328, processing of particles that are "dual" will now be described. The dual processing path 1336 starts at the state 1360.

In the state 1360, a hypothetical robot pose based on the current (last updated) pose estimate of the landmark, denoted $L_m^k$, and the acquired measurement of the landmark from the visual localization module and/or the Pre-Filter module, denoted $\Delta x$, $\Delta y$, and $\Delta \theta$ is computed. This produces a visually-estimated robot pose termed a "measured pose" $S_{m,meas}$, as illustrated in Equation 19.

$$S_{m,meas} = \begin{bmatrix} L_m^k(1) - \Delta_1^{vis} \cos(L_m^k(3) - \Delta_2^{vis}) \\ L_m^k(2) - \Delta_1^{vis} \sin(L_m^k(3) - \Delta_2^{vis}) \\ [(L_m^k(3) - \Delta_3^{vis} + \pi) \bmod 2\pi] - \pi \end{bmatrix} \quad \text{Equation 19}$$

In the state 1364, the measured pose $S_{m,meas}$ is perturbed with random noise $(\epsilon_{x,m}, \epsilon_{y,m}, \epsilon_{\theta,m})^T$ to generate a perturbed measured pose $\tilde{S}_{m,meas}$. In one embodiment, the random noise $(\epsilon_{x,m}, \epsilon_{y,m}, \epsilon_{\theta,m})^T$ is sampled from a Gaussian distribution with mean $(0, 0, 0)^T$ and sensor covariance $C_{sensor}$. Equation 20 expresses a formula which can be used to calculate the perturbed measured pose $\tilde{S}_{m,meas}$.

$$\tilde{S}_{m,meas} = \begin{pmatrix} S_{m,meas}(1) + \varepsilon_{x,m} \\ S_{m,meas}(2) + \varepsilon_{y,m} \\ [(S_{m,meas}(3) + \varepsilon_{\theta,m} + \pi) \bmod 2\pi] - \pi \end{pmatrix} \quad \text{Equation 20}$$

The process advances from the state 1364 to the state 1372. In the state 1372, the process computes an importance factor $w_m$ for the dual processing path 1336 by computing Equation 21, Equation 22, Equation 23, and Equation 24. Equation 24 corresponds to an expression for the computation of the importance factor $w_m$ for a dual particle. A scale factor of $1/f$, such as $\frac{1}{5}$, is applied in the computation of Equation 24 to account for real-life visual measurements, which may exhibit actual noise characteristics that differ from than that of Gaussian noise.

$$C = C_k^m + C_{odom} \quad \text{Equation 21}$$

$$\Delta = \begin{pmatrix} \Delta_1 \\ \Delta_2 \\ \Delta_3 \end{pmatrix} = \tilde{S}_{m,meas} - S_{m,pred} \quad \text{Equation 22}$$

$$\Delta_3 = [(\Delta_3 + \pi) \bmod 2\pi] - \pi \quad \text{Equation 23}$$

$$w_m = \left(\frac{1}{f}\right) \frac{1}{2\pi\sqrt{\det C}} \exp\left(-\frac{1}{2}\Delta^T C^{-1} \Delta\right) \quad \text{Equation 24}$$

The process then advances from the state 1372 to the end of the loop 1356. The loop repeats until the processing of the particles is complete. When processing of the particles is complete, the process advances to the state 1378. In the illustrated process, the state 1378, a state 1382, a state 1386, and a state 1390 correspond to a sub-process for resampling particles in a probabilistic manner. Table 1 and Table 2 illustrate an example of resampling particles. In the illustrated sub-process, particles that have a relatively high importance factor are more likely to be retained than particles that have a relatively low importance factor.

TABLE 1

| "Old" Particle Number (i) | Importance Factor (w) (ii) | Normalized w (iii) | Range (iv) |
| --- | --- | --- | --- |
| 1 | 0.99 | 0.430 | 0–0.430 |
| 2 | 0.29 | 0.126 | 0.430–0.556 |

TABLE 1-continued

| "Old" Particle Number (i) | Importance Factor (w) (ii) | Normalized w (iii) | Range (iv) |
| --- | --- | --- | --- |
| 3 | 0.48 | 0.209 | 0.556–0.765 |
| 4 | 0.31 | 0.135 | 0.765–0.900 |
| 5 | 0.23 | 0.100 | 0.900–1 |

In the state 1378, at this point in the process, the robot poses for the particles have been updated. In the state 1378, the process normalizes the importance factors (w) associated with the particles. For example, the importance factors (w) for K particles can be summed, and then each of the importance factors can be divided by the sum to normalize the importance factors. By way of example, Table 1 illustrates normalizing for a 5-particle multiple hypothesis system. The "old" particle numbers are listed in column (i) of Table 1. Sample values for the importance factor (w) for each particle are listed in column (ii). The sum of the sample values in column (ii) is 2.30, which is applied as a divisor to the importance factor values in column (ii) to generate the normalized importance factor values illustrated in column (iii). The process advances from the state 1378 to the state 1382.

In the state 1382, the process generates selection ranges for the particles. Returning to the example of Table 1, the process allocates a range within 0 to 1 according to the value of the normalized importance factor. An example of a selection range for a particle based on the normalized importance factor values is illustrated in column (iv) of Table 1. Accordingly, particles associated with relatively large values of normalized importance factors have a correspondingly relatively large selection range. The process advances from the state 1382 to the state 1386.

In the state 1386, the process generates random numbers. These random numbers are used to select which of the old particles are copied and which of the old particles are rejected. Column (v) in Table 2 represents "new" particle numbers. Column (vi) illustrates randomly generated numbers in the range of 0 to 1. It will be understood that the range for the randomly generated numbers illustrated in Column (vi) of Table 2 should correspond to the same range as the selection range for the particles, an example of which was described earlier in connection with column (iv) of Table 1. The process advances from the state 1386 to the state 1390.

TABLE 2

| "New" Particle Number (v) | Randomly Generated Number (vi) | "Old" Particle Copied (vii) |
| --- | --- | --- |
| 1 | 0.01 | 1 |
| 2 | 0.08 | 1 |
| 3 | 0.54 | 2 |
| 4 | 0.64 | 3 |
| 5 | 0.84 | 4 |

In the state 1390, the process uses the randomly selected numbers for the "new" particles illustrated in column (vi) of Table 2 and the selection ranges for the "old" particles illustrated in column (iv) of Table 1 to select which particles are to be retained from the "old" collection of particles. The result of the resampling is illustrated in column (vii) of Table 2. In the example illustrated by Table 1 and by Table 2, the "old" particle 1 is copied twice to the new collection, "old" particles 2, 3, and 4 are each copied once to the collection, and "old" particle 5 is dropped from the collection.

In one embodiment, when an existing particle is copied, the history of the particle is also copied. For example, the records of a first particle with a first Hypothesis ID can be copied to the records of a second particle with a second Hypothesis ID. Examples of fields for these records were described in greater detail earlier in connection with the Multiple Hypothesis Table 814 and the Map Table 816 of FIG. 8.

The robot pose for the m-th particle can updated by using the time that the landmark was re-observed as a timestamp for the "last observed time" or $t_{new}$ and using the predicted particle pose $S_{m,pred}$ as the new pose data. This can be expressed in Equation 25.

$$s_m = [t_{new}, S_{m,meas}^T]^T \qquad \text{Equation 25}$$

The process can proceed from the state 1390 to an optional state 1394. In the optional state 1394, the process combines the multiple particle data for applications in which a single pose estimate is desired. It will be understood that the pose from the particles can be combined in many ways. In one embodiment, the location and heading are computed according to an average of the poses, as expressed in Equation 26, Equation 27, and Equation 28, where $s_m = (t, x_m, y_m, \theta_m)$.

$$\bar{x} = \frac{1}{K} \sum_{m=1}^{K} s_m(2) \qquad \text{Equation 26}$$

$$\bar{y} = \frac{1}{K} \sum_{m=1}^{K} s_m(3) \qquad \text{Equation 27}$$

$$\bar{\theta} = \arctan\left(\frac{\sum_{m=1}^{K} \sin(s_m(4))}{\sum_{m=1}^{K} \cos(s_m(4))}\right) \qquad \text{Equation 28}$$

A composite pose $\bar{S}$ can be provided by the SLAM process and can be expressed by $\bar{S} = (\bar{x}, \bar{y}, \bar{\theta})^T$ This composite pose $\bar{S}$ can be provided as an input to, for example, a robot behavior control program such as a behavioral program for vacuum cleaning. In alternative examples of computing a composite pose $\bar{S}$, the composite pose can be weighted using probabilities and/or importance factors, can be averaged by selecting data only from high probability particles, and the like. The process advances from the optional state 1394 to a state 1398.

At this point in the illustrated process, the robot poses for the particles have been updated and processed. In the state 1398, the process updates the maps for the particles by updating the landmark pose estimate $L_m^k$ for the observed landmark of a particle with a statistical filter. It will be understood that the state 1398 can include a loop to update the maps of each of the particles.

In one embodiment, a Kalman filter is used to update the landmark pose estimate $L_m^k$. The Kalman filter is an example of an efficient implementation of a least-squares filter. The use of a Kalman filter advantageously permits updates to the map to be made in real time without repeated iterations between measurements. A landmark pose and the relative visual localization data $(\Delta_1^{vis}, \Delta_2^{vis}, \Delta_3^{vis})^T$ are used to generate the measured landmark pose $\hat{L}_m^k$ in the Kalman filter as illustrated in Equation 29.

$$\hat{L}_m^k = \begin{bmatrix} s_m(2) + \Delta_1^{vis} \cos(s_m(4) + \Delta_2^{vis}) \\ s_m(3) + \Delta_1^{vis} \sin(s_m(4) + \Delta_2^{vis}) \\ [(s_m(4) + \Delta_3^{vis} + \pi) \bmod 2\pi] - \pi \end{bmatrix} \qquad \text{Equation 29}$$

The measured landmark pose $\hat{L}_m^k$ is used in the Kalman filter to efficiently update or correct the landmark pose estimate $L_m^k$. The covariance matrix of the process noise is denoted by Q, and the covariance matrix of the measurement noise is denoted by R. In one embodiment, an appropriate value for the covariance matrix of the process noise Q is the constant matrix diag (2.8 cm$^2$, 2.8 cm$^2$, 0.0001 rad$^2$). Other appropriate values for the covariance matrix of the process noise Q will be readily determined by one of ordinary skill in the art. In one embodiment, an appropriate value for the covariance matrix of the measurement noise R is the constant matrix diag (81 cm$^2$, 81 cm$^2$, 0.0019 rad$^2$). Other appropriate values for the measurement noise R will be readily apparent to one of ordinary skill in the art. It should be noted that an appropriate value for the measurement noise R can vary depending on factors such as the resolution of the visual sensor, the average distance to features, and the like. The covariance matrix of the state vector estimate $C_m^k$ is also updated in the Kalman filter. The process then ends and can be repeated on an ongoing basis as new landmarks are re-encountered.

Example of System Architecture for the Visual Front End 602

Figure 14:
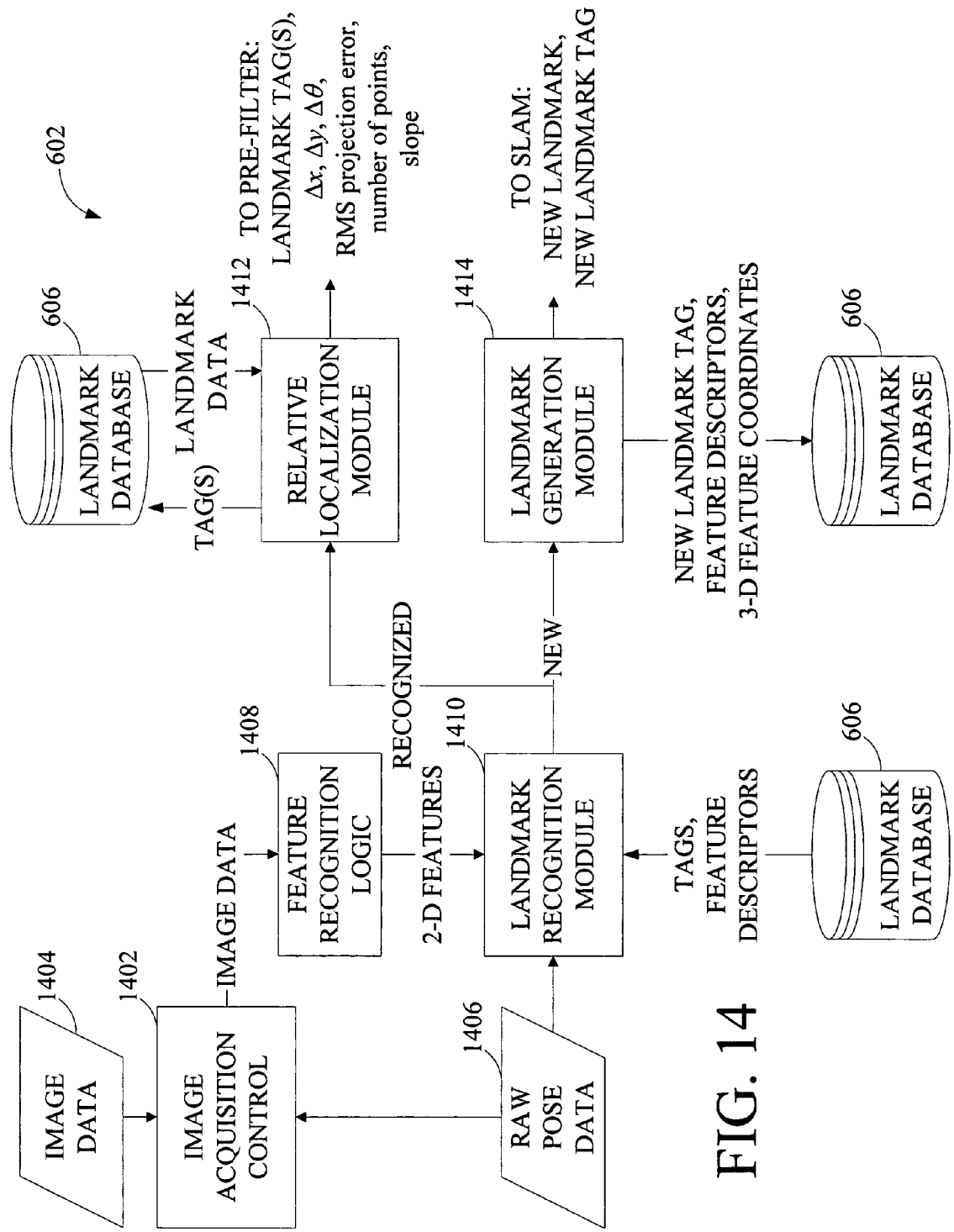
FIG. 14 illustrates one embodiment of a system architecture for visual localization.

FIG. 14 illustrates one embodiment of a system architecture for the Visual Front End 602. The illustrated system architecture for the Visual Front End 602 can advantageously be implemented with dedicated hardware, with firmware, with software, and with various combinations of the same. For clarity, relatively minor details such as timestamps, calibration data, and selected database identifiers are not drawn in FIG. 14.

The illustrated Visual Front End 602 includes an image acquisition control module 1402. The image acquisition control module 1402 receives image data 1404 as an input. The image data 1404 can be provided by a visual sensor, such as a camera. The visual sensor can correspond to a single-camera device or to a multiple-camera device. The images acquired can be used to locate the robot within a global reference frame or can be used to add landmarks to the landmark database 606. Where a single camera is used, and the robot moves to obtain images with varying perspectives for landmark creation, the image acquisition control module 1402 can also receive raw pose data 1406 from a dead reckoning device, such as from odometry. For example, the image acquisition control module 1402 can select images for landmark creation that are taken at appropriately-spaced baseline intervals. In one embodiment, the image acquisition control module 1402 advantageously receives the image data 1404 and/or the raw pose data 1406 via interaction with a hardware abstraction layer (HAL). See commonly-owned U.S. patent application entitled "SENSOR AND ACTUATOR ABSTRACTION AND AGGREGATION IN A HARDWARE ABSTRACTION LAYER FOR A ROBOT" filed on Nov. 27, 2002, with application Ser. No. 10/307,199, the entirety of which is hereby incorporated by reference herein.

The image acquisition control module 1402 provides image data as an input to feature recognition logic 1408. The feature recognition logic 1408 can identify feature descriptors, such as SIFT feature vectors, that are present in the image. The feature descriptors identified are provided as an input to a landmark recognition module 1410. The landmark recognition module 1410 uses the feature descriptors identified in the image to identify landmarks with similar features that have been previously identified and stored in a database, such as the landmark database 606. In one embodiment, the landmark recognition module 1410 can identify one or more matching landmarks based on the number of features that are common between the image and the stored landmark, and the landmark recognition module 1410 can provide a relative localization module 1412 with a list of matching landmarks and corresponding 2-D features. When no matching landmark is provided by the landmark recognition module 1410, a landmark generation module 1414 can determine whether to add a new landmark to the landmark database 606 based on the features observed in the image. In one embodiment, the relative localization module 1412 and the landmark generation module 1414 operate independently in parallel such that a landmark can be added to the database while another landmark is matched.

In one embodiment, the relative localization module 1412 receives an indication of which features matched in the one or more matching landmarks, and an indication of the approximate 2-D location of the features in the image. For example, the indication of the approximate 2-D location can correspond to a pixel location. The relative localization module 1412 extracts 3-D position information and 2-D image location information for the features of the matching landmark from the landmark database 606, and can use projection to calculate the robot's pose for the image data 1404 relative to the robot's pose when the landmark was created. The relative localization module 1412 provides the relative pose(s) to the one or more identified landmarks as an output of the Visual Front End 602. The relative pose(s) can be provided as an input to, for example, the Pre-Filter module 622 or to the SLAM module 604.

The landmark generation module 1414 receives groups of image data, and determines whether to add a landmark to the landmark database 606. The landmark generation module 1414 uses groups of image data rather than a single image so that the 3-D coordinates of a feature can be determined. When enough features of sufficient reliability have been identified, the landmark generation module 1414 can add the landmark to the landmark database 606. In the illustrated example, the coordinates of the 3-D features and, optionally, the 2-D coordinates of the corresponding 2-D features and their associated feature descriptors are stored in the landmark database 606. An indication that a new landmark has been created can be provided as an output of the Visual Front End 602 and provided as an input to the SLAM module 604. It will be understood that database record identifiers can also be passed between various modules for bookkeeping purposes.

Example of a System Architecture for the Pre-Filter Module 622

Figure 15:
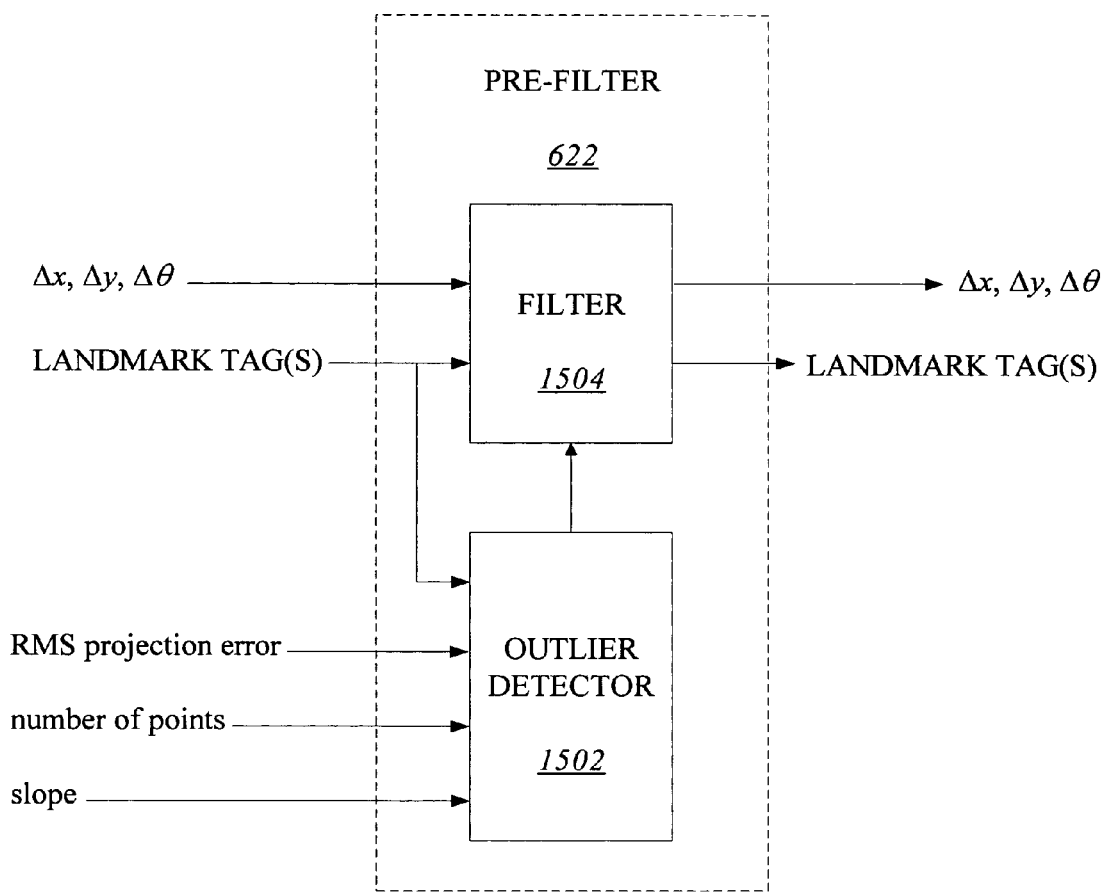
FIG. 15 illustrates an embodiment of a pre-filter for filtering outliers.

FIG. 15 illustrates an embodiment of the Pre-Filter module 622 for filtering outliers. The illustrated system architecture for the Pre-Filter module 622 can advantageously be implemented with dedicated hardware, with firmware, with software, and with various combinations of the same.

The Pre-Filter module 622 receives one or more indications of matching landmarks as an input and filters the matching landmarks such that none, a portion, or all of the matching landmarks are provided as an output. By filtering the measurements of matching landmarks according to predefined criteria such that outliers are not relied upon by the SLAM module 604 for localization, the Pre-Filter module 622 advantageously enhances the robustness and accuracy of the VSLAM system 600.

The illustrated Pre-Filter module 622 includes an outlier detector module 1502 and a filter module 1504. In one embodiment, the data shown in FIG. 15 as provided to the Pre-Filter module 622 is accessed from a shared memory by the pre-filter module. The outlier detector module 1502 evaluates one or more criteria for evaluating the reliability or trustworthiness of an observed landmark measurement. For example, one or more of the RMS projection error, the number of matching features, and the slope can be compared to predetermined thresholds as described earlier in connection with FIG. 12. One or more landmark tags or identifiers can also be provided as an input to the outlier detector module 1502 such that the outlier detector module 1502 can identify which of the identified landmarks have passed the tests for reliability. An indication of the pass or fail status of one or more landmark measurements is provided by the outlier detector module 1502 as an input to the filter module 1504.

At least partly in response to the pass or fail status of the landmark measurements, the filter module 1504 permits the passage of the data from the Visual Front End 602 to the SLAM module 604. In one embodiment, the filtering is implemented by setting status flags that are read by the SLAM module 604 to determine whether or not to use a particular landmark.

Non Sequential and Sequential Robust Sensor Fusion or Integration

The sensor fusion techniques disclosed herein include non-sequential techniques and sequential techniques. With non-sequential sensor fusion, the data from the sensors is combined without regard to a prior estimate of some quantity or characteristic that is ultimately estimated, e.g. a prior pose of a mobile robot. With sequential sensor fusion, the prior estimate of some quantity or characteristic that is ultimately estimated, e.g. a prior pose of a mobile robot, is used in conjunction with sensor data to compute an updated estimate of the unknown quantity or characteristic. Depending on the character of the sensor data and the consistency of the unknown quantity or characteristic that is ultimately estimated, e.g. a prior pose of a mobile robot, either sequential or non-sequential technique is utilized more effectively to fuse the data. For example, if one sensor is incremental by nature, such as dead reckoning, then the sequential sensor fusion technique is typically appropriate. If, however, all sensors are non-incremental, e.g. Global Position System (GPS), or some other reference-point based sensor, such as a sensor using visual landmarks, then it may be possible that non-sequential data fusion is a more effective technique.

Non-Sequential Robust Sensor Fusion: Overview

In many practical applications, such as in navigation and/or localization, it is desirable to estimate a probability density function $f(x)$ using a probability density function $p(x)$ associated with an unknown characteristic x and/or one or moments of x. It will be understood by the skilled practitioner that the term "probability density function" is used generically to describe both continuous probability functions and discrete probability functions, and is used in both ways herein. By way of example, the value of x can be a multi-dimensional numerical value, such as a pose (position and orientation) of a stationary device or a mobile device. If a first probability density $p(x_1)$ associated with a value $x_1$ is larger than a second probability density $p(x_2)$ associated with a value $x_2$, then the characteristic x is more likely to have the value $x_1$ than the value $x_2$; that is, $x=x_1$ is more likely to be true than $x=x_2$. In one embodiment of the method described herein, the effectiveness of the method advantageously does not depend on the family to which the density function p(x) belongs. For example, the probability density function p(x) can correspond to a Gaussian distribution, an exponential distribution, a multi-modal distribution, or to another distribution.

A probability density function fix) can be approximated by a finite number of particles (samples). The total number of particles used to represent a probability density function p(x) is denoted by a $N_{Tot}$. The value of $N_{Tot}$ can be predetermined by a designer of the system, configurable by, for example, an end user of the system, and the like. One example value of $N_{Tot}$ is 200, but other appropriate values will be readily determined by one of ordinary skill in the art. It will be further understood by one of ordinary skill in the art that while the embodiment presently described uses a fixed and constant value for $N_{Tot}$, it can be beneficial in some applications to allow the value of $N_{Tot}$ to vary. In particular, it can be beneficial to vary the value of $N_{Tot}$ adaptively as a function of the estimated value of the probability density function p(x) and as a function of acquired measurements.

A first conditional probability density function $p(x|M_B)$ can represent the inference that can be made about the characteristic x based on a measurement $M_B$ from a first sensor B. It will be understood that a broad variety of sensors can be used, and that a sensor, such as the first sensor B, can provide data in a variety of forms. Some of these forms may permit the measurement to be used directly, and other forms may require further processing before the measurement can be evaluated and/or used. The first conditional density function $p(x|M_B)$ corresponds to the conditional probability density corresponding to the characteristic x without regard for a measurement $M_C$ from a second sensor C. The functional expression of $p(x|M_B)$ can be provided by or generated by, for example, the end user of the system, the designer of the system, a supplier of the sensor, and the like, and can be based on the sensor attributes of the sensor B.

The sensor attributes of the second sensor C can be accounted for in the conditional likelihood function $p(M_C|x)$. While illustrated in the context of fusing an incremental measurement $M_B$, such as data from a dead reckoning sensor, and an absolute measurement $M_C$, such as a measurement of global pose via a visual measurement, the principles and advantages of the fusion techniques disclosed herein are also applicable to other combinations, such as combinations of incremental measurements and combinations of absolute measurements. That is, if the value of the characteristic x is known, then a collection of measurements from sensor C can be expected to follow a distribution corresponding to the conditional likelihood function $p(M_C|x)$. The functional expression of the conditional likelihood function $p(M_C|x)$ can be provided or determined by, for example, an end user of the system, the designer of the system, a supplier of a sensor, and the like, and can be based on the sensor attributes of the second sensor C.

It will be understood by one of ordinary skill in the art that a mobile device or a stationary device with a VSLAM system or other system in which the sensors are integrated can include further sensors for which further conditional probability density functions are computed. While described generally in the context of two sensors, such as a visual sensor and an odometer, the skilled practitioner will appreciate that the principles and advantages described herein are applicable to any system with two or more sensors. For example, in another embodiment, the sensors that are integrated can include an odometer, a GPS receiver, and an inertial navigation unit (INU).

Figure 16:
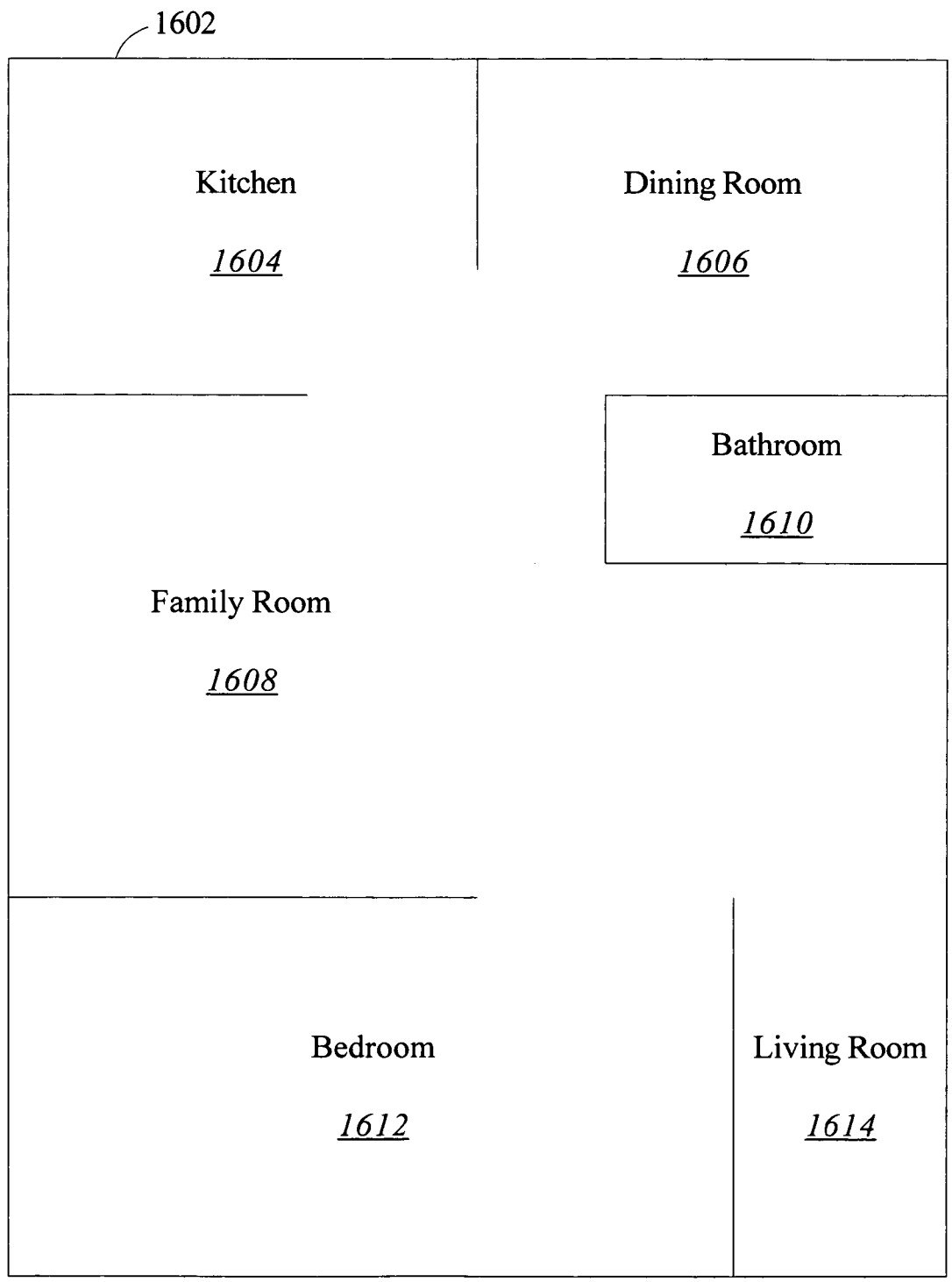
FIG. 16 is a schematic representation of a top view of a layout of an apartment used as an example of an operating environment for a robot.

The robust sensor fusion techniques can advantageously be used with one or more of navigation, localization, and mapping. FIG. 16 is a schematic representation of a top view of a layout of an apartment used as an example of an operating environment for a robot using the robust sensor fusion techniques. FIG. 16 will be described in greater detail following a description of the process described in connection with FIG. 17.

Non-Sequential Robust Sensor Fusion: Process Illustration

Figure 17:
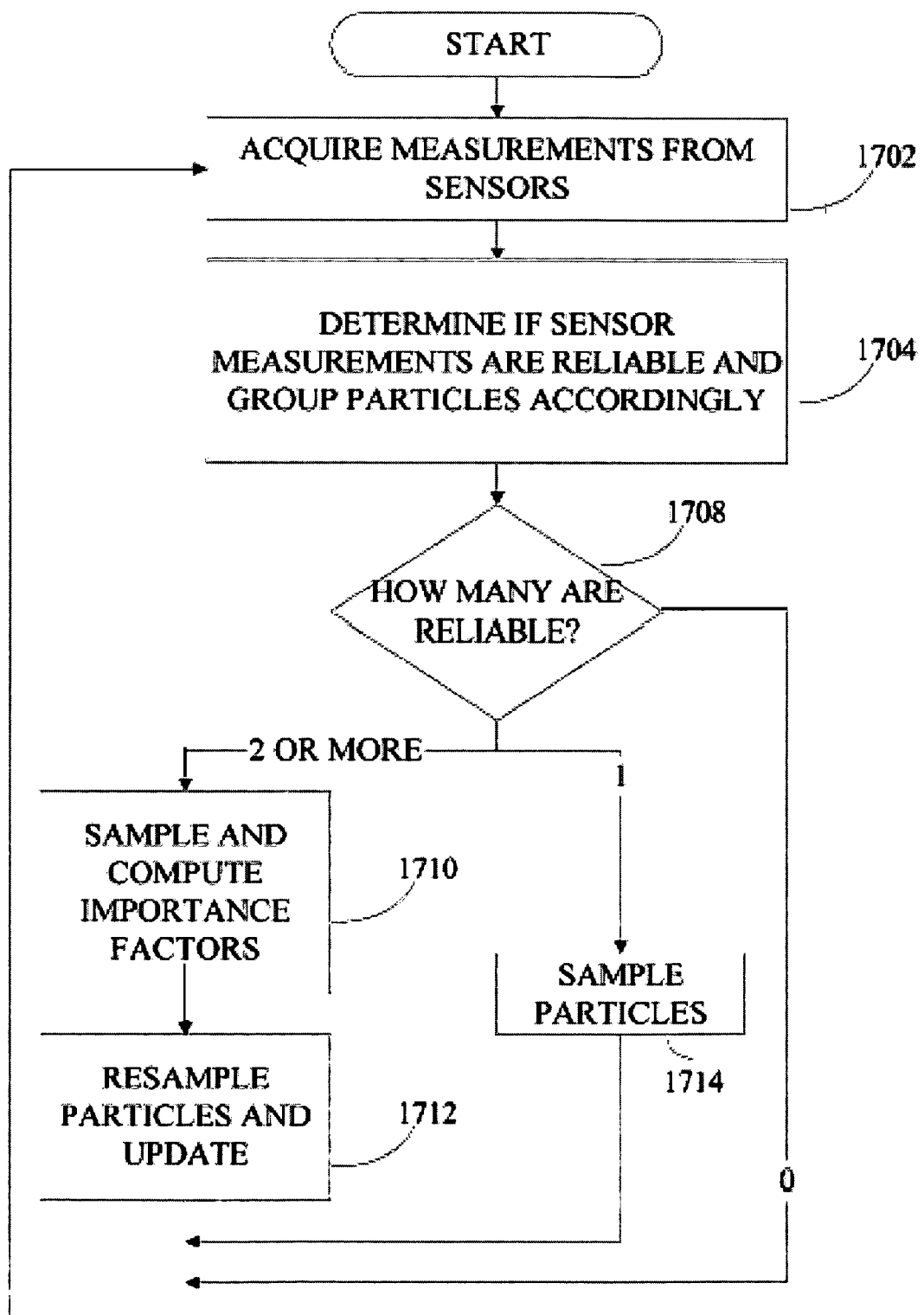
FIG. 17 is a flowchart that generally illustrates a process useful for fusing sensor measurements in a non-sequential manner.

Through a sequence such as the process generally illustrated in FIG. 17, the probability density function p(x) for a multi-dimensional quantity, such as a pose (position and orientation), or a binary quantity such as {hot, cold}, can be estimated by processing sensor measurements from two or more sensors. For clarity, the illustrated process is described using two measurements $M_B$ and $M_C$ from two sensors B and C, respectively, with the resulting probability density function denoted $p(x|M_B, M_C)$. It will be appreciated by the skilled practitioner that the illustrated process can be modified in a variety of ways without departing from the spirit and scope of the method. For example, where a third sensor D is used, a density function of $p(x|M_B, M_C, M_D)$ can be computed. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1702, in which measurements from sensors B and C are acquired or received. It will be understood that measurements from further sensors can also be acquired. The process then advances to a state 1704 and determines whether the measurements acquired at the state 1702 are considered reliable or unreliable, that is, trustworthy or not trustworthy. For example, a measurement can be compared to one or more predetermined criterion to determine whether the measurement is to be considered reliable. For example, a range measurement from an infrared sensor can be considered unreliable if the range measurement corresponds to a distance outside of the sensor's region of reliability. As another example, a visual measurement from a camera can be considered unreliable if another sensor detects that the camera was moving with a relatively high angular velocity at the time an image corresponding to the visual measurement was acquired.

For example, in one embodiment, the determination that the camera was moving with a relatively high angular velocity is made by detecting the angular velocity of the camera and determining that the detected angular velocity exceeds a predetermined threshold. As an additional example, a visual measurement from a camera can be considered unreliable if a pre-filtering process determines that the measurement is an outlier and/or is otherwise unreliable.

Based upon the determination of reliability made in the state 1704, the illustrated process associates or groups the $N_{Tot}$ particles in the following manner. In the state 1704, the $N_{Tot}$ particles are initially unassociated with measurements. If measurements from two or more sensors are regarded as reliable, such as measurements from sensor B and sensor C, then the $N_{Tot}$ particles can be allocated among measurements from the two or more sensors. For example, if the measurements from both sensor B and sensor C are considered reliable, then a fraction of the $N_{Tot}$ particles can be associated with sensor B, and the remaining particles can be associated with sensor C. In one embodiment, $(N_{Tot}/2)$ particles (rounded up or down to the nearest integer) are associated with sensor B, and the remaining particles are associated with sensor C. It will be understood that other than evenly-distributed fractions can be used and that the distribution can also vary with the number of sensors used, such as, where there are 3 sensors instead of the illustrated example of 2, and the distribution can also vary with the number of sensors for which measurements are found to be reliable. Other appropriate fractions will be readily determined by one of ordinary skill in the art.

If a measurement from only one of the sensors is considered reliable, such as a measurement from only one of sensor B and sensor C, then, in one embodiment, approximately all $N_{Tot}$ particles are associated with the sensor for which the measurement is considered reliable, and zero particles are associated with the sensor for which the measurement is considered unreliable.

If none of the measurements from the sensors is considered reliable, such as none of the measurements from sensor B and sensor C in a two-sensor system, then, in one embodiment, approximately no particles, such as zero particles, are associated with sensors, and approximately all particles can be unassociated. In the foregoing cases, the number of particles associated with sensor B is denoted herein by $N_B$, and the number of particles associated with sensor C is denoted herein by $N_C$. The process then advances to a decision block 1708.

At the decision block 1708, the process selects a processing path based on the number of measurements that are considered reliable as determined earlier in connection with the state 1704. If two or more measurements are considered reliable, such as both measurement $M_B$ and measurement $M_C$, the process proceeds along the processing path associated with two or more reliable measurements and proceeds from the decision block 1708 to a state 1710.

In the state 1710, the process samples the characteristic x, such as a robot pose, and computes importance factors for the samples. At the state 1710, the process generates one or more random samples $\tilde{x}$ from the conditional distribution corresponding to $p(x|M_B)$, where the number of random samples is the same as the number of particles $N_B$ associated with sensor B. The random samples can be indexed as $\tilde{x}_k$, where $k=1, 2, \ldots, N_B$. The process also computes an importance factor $w_k$ associated with each sample $\tilde{x}_k$ based at least in part on $\tilde{x}_k$ and based at least in part on measurement $M_C$. In one embodiment, the importance factor $w_k$ is computed according to the formula $w_k=p(M_C|\tilde{x}_k)$. In a system with more than two sensors, the importance factor $w_k$ can be computed using data that is considered reliable from the other sensors. For example, in a system with two additional sensors, the importance factor $w_k$ can be computed according to the formula $w_k=p(M_C, M_D, M_E, \ldots |\tilde{x}_k)$, where $M_D$ and $M_E$ represent measurements from the two additional sensors D and E. It will be understood that when more than 2 sensors are available, the data from more than one sensor can be fused when a subset of at least 2 sensors are providing measurements that are considered reliable. It will also be understood that a subset can include all of the sensors.

The above description applies only for a particle of group B, although this particular embodiment is described herein, other embodiments, such as performing a similar process for a particle of group C, will also be apparent to those of ordinary skill in the art.

The process generates one or more random samples $\tilde{x}$ from the conditional likelihood corresponding to $p(M_C|x)$, where the number of random samples is given by the number of particles $N_C$ associated with sensor C. It will be understood that the random samples for the conditional likelihood corresponding to $p(M_C|x)$ can be generated before or after the random samples for the conditional distribution corresponding to $p(x|M_B)$. The random samples can be indexed as $\tilde{x}_k$, where $k=N_B+1, N_B+2, \ldots, N_B+N_C$. The process also computes an importance factor $w_k$ associated with each sample $\tilde{x}_k$, based at least in part on measurement $M_B$ for sensor B and $\tilde{x}_k$. In one embodiment, the importance factor $w_k$ is computed according to the formula $w_k=p(\tilde{x}_k|M_B)$. It will be understood that where additional sensors are used, additional random samples and additional importance factors can be computed in a similar fashion. The process then advances to a state 1712.

At the state 1712, the process resamples $(N_B+N_C)$ particles, with replacement, from the new set of particles $\tilde{x}_1, \tilde{x}_2, \ldots, \tilde{x}_{N_B+N_C}$, wherein the probability that each particle is resampled relates to the importance factor associated with such particle. For example, one embodiment of resampling particles in a probabilistic manner was described earlier in connection with Table 1 and Table 2. This resampled set of particles is assigned, such as via an assignment statement and the like, to the probability density function $p(x|M_B, M_C)$, which corresponds to the updated distribution of characteristic x. The process then returns from the state 1712 to the state 1702 and waits for additional sensor measurements.

In a system with more than two sensors, the system can resample additional particles corresponding to the additional sensors when the measurements from the more than two sensors are regarded as reliable. For example, in a system with an additional sensor D, the process can resample $(N_B+N_C+N_D)$ particles, with replacement.

Returning now to the decision block 1708, if exactly one of the measurements acquired is considered reliable, such as only one of measurement $M_B$ or $M_C$, the process proceeds along the processing path associated with one reliable measurement and proceeds from the decision block 1708 to a state 1714.

In the state 1714, the process selects the measurement that is considered reliable. In one embodiment, the determination of which measurement is considered reliable, e.g., which of $M_B$ or $M_C$ where only two measurements are available, is reused from the determination made earlier in the state 1704. For example, when the measurement $M_B$ is considered the only reliable measurement, the process generates one or more random samples x from the conditional distribution corresponding to the conditional probability density function $p(x|M_B)$, where the number of random samples is given by the number of particles $N_B$ that are associated with sensor B. In one example, where only one measurement is considered reliable, the number of particles $N_B$ can be equal to the total number of particles $N_{Tot}$. The random samples can be indexed as $\tilde{x}_k$, where $k=1, 2, \ldots, N_B$. In one embodiment, the process also sets an importance factor $w_k$ associated with each sample $\tilde{x}_k$ equal to each other. In one embodiment, the importance factor $w_k$ associated with each sample $\tilde{x}_k$ is assigned to a relatively convenient constant, such as 1. Other values will be readily apparent to one of ordinary skill in the art. In another embodiment, the importance factor $w_k$ is not computed or assigned and is left unchanged from a prior value.

In another example, when the measurement $M_C$ is considered reliable, the process generates one or more random samples $\tilde{x}$ from the conditional likelihood distribution corresponding to $p(M_C|x)$, where the number of random samples is given by the number of particles $N_C$, which can be equal to the total number of particles $N_{Tot}$. The random samples can be indexed as $\tilde{x}_k$, where k=1, 2, ..., $N_C$. In one embodiment, the process also sets an importance factor $w_k$ associated with each sample $\tilde{x}_k$ equal to a constant, such as 1. In another embodiment, the importance factor $w_k$ is not computed or assigned. The process then returns from the state 1714 to the state 1702 and waits for additional sensor measurements.

Returning now to the decision block 1708, if none of the measurements, such as neither measurement $M_B$ nor measurement $M_C$ in a two-sensor system, is considered reliable, the process proceeds along the processing path associated with zero reliable measurements and returns to the state 1702 and waits for additional sensor measurements. This advantageously prevents the system from relying on measurements that are regarded as unreliable.

Non-Sequential Robust Sensor Fusion

Example 1

In Example 1 (Non-Sequential), the system fuses two or more measurements from two or more sensors. It will be understood that the measurements that are fused should be regarded as reliable measurements. In addition, it should be noted that a measurement that is regarded as reliable may be termed as a measurement from a "reliable" sensor, though it will be understood by one of ordinary skill in the art that a properly-functioning sensor can provide both reliable and unreliable measurement depending on environmental conditions, such as lighting, slippery floors, and the like, and also based on environmental incidents, such as bumping, kidnapping, and so forth. In one example in a system with two "reliable" sensors, that is, with two sensors providing measurements that are considered reliable, sensor B corresponds to a visual sensor, such as to a camera coupled to a robot, and the measurements from sensor B are based on visual estimates, such as visual measurements, of robot pose relative to a known map of the robot's environment, such as an example of an apartment 1602 illustrated in FIG. 16. In this example, sensor C can correspond to one or more range sensors, such as to one or more infrared sensors coupled to the robot. The measurements from sensor C can correspond to range data, such as to infrared range measurements to the nearest object, and a given map, such as an occupancy grid map. For the purposes of this example, measurements $M_B$ and $M_C$ from sensors B and C, respectively, are considered reliable.

Referring now to the example of the apartment 1602 as an environment as shown in FIG. 16, suppose that visual sensor B detects a measurement $M_B$ corresponding to an image of a sink, and suppose that the robot's map of its environment, that is, the apartment 1602, indicates that a sink is present in some parts of the apartment 1602, such as a kitchen 1604 and a bathroom 1610, but not in other parts of the apartment 1602, such as a dining room 1606, a family room 1608, a bedroom 1612, and a living room 1614. Then, based on measurement $M_B$ detected by the visual sensor B, the system estimates a conditional probability density function $p(x|M_B)$ such that $p(x|M_B)$ indicates that the robot is relatively likely to be in the kitchen 1604 or in the bathroom 1610, and is relatively unlikely to be in the dining room 1606, in the family room 1608, in the bedroom 1612, or in the living room 1614.

Suppose further that the range sensor C detects a range measurement $M_C$ corresponding to a relatively confined environment, and suppose in addition that the robot's map of the apartment 1602 indicates that the bathroom 1610 and the living room 1614 are relatively confined, and that the kitchen 1604, the dining room 1606, the family room 1608, and the bedroom 1612 are relatively spacious. Then, based on the range measurement $M_C$, the system estimates a conditional likelihood corresponding to $p(M_C|x)$ such that $p(M_C|x)$ indicates that the robot is relatively likely to be in the bathroom 1610 or the living room 1614, and is relatively unlikely to be in the kitchen 1604, the dining room 1606, the family room 1608, or the bedroom 1612.

As described above, both measurements $M_B$ and $M_C$ indicate that the robot is relatively likely to be in the bathroom 1610. Based on the visual measurements $M_B$ and $M_C$, the system advantageously estimates the fused probability density $p(x|M_B, M_C)$ such that $p(x|M_B, M_C)$ indicates that the robot is relatively likely to be in the bathroom 1610 and relatively unlikely to be in any of the other rooms in the apartment 1602.

Non-Sequential Robust Sensor Fusion

Example 2

In Example 2 (Non-Sequential), operation of the system will be described for one reliable sensor. By way of example, suppose that sensor B corresponds to a visual sensor, such as a camera coupled to a robot, and suppose that measurements from sensor B correspond to visual estimates, such as visual measurements, of robot pose relative to a known map of the robot's environment. Suppose further that sensor C corresponds to one or more range sensors, such as one or more infrared sensors, coupled to the robot, and suppose that measurements from sensor C correspond to measurements based on range data, such as infrared range measurements to the nearest object, and a given map, such as an occupancy grid map. For the purposes of this example, measurement $M_B$ is considered reliable, and measurement $M_C$ is considered unreliable.

Referring again to FIG. 16, suppose that visual sensor B detects a measurement $M_B$ corresponding to an image of a sink, and suppose that the robot's map of the apartment 1602 indicates that a sink is present in some parts of the apartment 1602, such as the kitchen 1604 and the bathroom 1610, but not in other parts of the apartment 1602, such as the dining room 1606, the family room 1608, the bedroom 1612, and the living room 1614. Then, based on measurement $M_B$ detected by the visual sensor B, the system estimates a conditional probability density function $p(x|M_B)$ such that $p(x|M_B)$ indicates that the robot is relatively likely to be in the kitchen 1604 or in the bathroom 1610, and is relatively unlikely to be in the dining room 1606, in the family room 1608, in the bedroom 1612, or in the living room 1614.

Suppose further that range sensor C receives a range measurement $M_C$ corresponding to a relatively confined environment, and suppose in addition that the robot's map of the apartment 1602 indicates that the bathroom 1610 and the living room 1614 are relatively confined, and that the kitchen 1604, the dining room 1606, the family room 1608, and the bedroom 1612 are relatively spacious. In one embodiment, range measurements are used to determine whether a room is relatively spacious or whether a room is relatively confined based at least partly on the proximity of the walls of the room. Based on the range measurement $M_C$, the system estimates the conditional probability density function $p(M_C|x)$, where $p(M_C|x_{new})$ is still computed, such that $p(M_C|x)$ indicates that the robot is relatively likely to be in the bathroom 1610 or the living room 1614, and is relatively unlikely to be in the kitchen 1604, the dining room 1606, the family room 1608, or the bedroom 1612. However, because the range measurement $M_C$ is considered unreliable, the estimate $p(M_C|x)$ is advantageously not used in the computation of the system's estimate of $p(x)$ to the same degree as when the range measurement $M_C$ is considered reliable. In one embodiment, the estimate $p(M_C|x)$ is not used at all when the range measurement $M_C$ is considered unreliable, and it will be understood that where it is not used at all, the function $p(M_C|x)$ need not even be computed.

In the illustrated example, the system estimates the probability density $p(x|M_B)$ such that $p(x|M_B)$ indicates that the robot is relatively likely to be in the kitchen 1604 or the bathroom 1610 and is relatively unlikely to be in the dining room 1606, the family room 1608, the bedroom 1612, or the living room 1614.

Sequential Robust Sensor Fusion: Overview

As described earlier in connection with non-sequential robust sensor fusion techniques, it is often desirable to estimate a probability density function $p(x)$ associated with an unknown characteristic x and/or one or moments of x. Also, as described earlier in connection with non-sequential robust sensor fusion techniques, the effectiveness of the method advantageously does not depend on the family to which the density function $p(x)$ belongs.

With sequential sensor data fusion, before a new set of measurements is processed, a prior estimate of the conditional probability density function $p(x)$ is typically provided. This estimate can be represented by $p(x_{old})$, in which $x_{old}$ is the value of the unknown characteristic x at the time of one or more previous measurements. However, if no measurement has been processed, as is the case before the first set of measurements has been processed, then the uniform density can be assigned to $p(x_{old})$. That is, the method can assign or set $p(x_{old})=K$, where K is a constant chosen so that $p(x_{old})$ satisfies the definition of a probability density, i.e., non-negative values for $p(x_{old})$, and the values of $p(x_{old})$ over $x_{old}$ sum to 1.

With the same terminology used earlier in connection with the non-sequential fusion techniques, $N_{Tot}$ denotes the number of particles or samples that are used to approximate a probability density function $p(x)$. While described in the context of a fixed and constant value for $N_{Tot}$, in one embodiment, the value of $N_{Tot}$ varies adaptively. For example, it can be beneficial to vary the value of $N_{Tot}$ adaptively as a function of the estimated value of $p(x)$ and of acquired measurements.

A first conditional probability density $p(x_{new}|x_{old}, M_B)$ can represent the inference that can be made about characteristic x based on a previous estimated value $x_{old}$ for the characteristic and measurement $M_B$ from a first sensor B. Note that $x_{new}$ represents the new estimate of the unknown characteristic x. Measurement $M_B$ can correspond to the estimated control action applied to a system to bring the value of characteristic x from the value $x_{old}$ to the value $x_{new}$. For example, the control action can be a sequence of applied forces and torques to take an object from a first location to a second location. That is, given a previously estimated value $x_{old}$, which may be provided as a prior density function $p(x_{old})$, and a measurement from sensor B, an new estimate $x_{new}$ of the unknown characteristic x is represented by the density function $p(x_{new}|x_{old}, M_B)$. In one embodiment, the estimate is generated without reference to another measurement, such as a measurement $M_C$ from a second sensor C. In one example, the estimate can correspond to the best estimate.

The functional expression of $p(x_{new}|x_{old}, M_B)$ can be provided by or generated by, for example, the end user of the system, the designer of the system, a supplier of the sensor, and the like, and can be based on factors such as the dynamics of characteristic x and the sensor attributes of sensor B.

The sensor attributes of the second sensor C can be accounted for in the conditional likelihood density function $p(M_C|x_{new})$. That is, if the value $x_{new}$ is known, then a collection of measurements from sensor C can be expected to follow the distribution corresponding to the conditional likelihood density function $p(M_C|x_{new})$. The functional expression of the conditional likelihood density function $p(M_C|x_{new})$ can be provided, determined, and/or configured by, for example, the end user of the system, the designer of the system, a supplier sensor C, and the like, and can be based on factors such as the sensor attributes of sensor C.

Sequential Robust Sensor Fusion: Process Illustration

Figure 18:
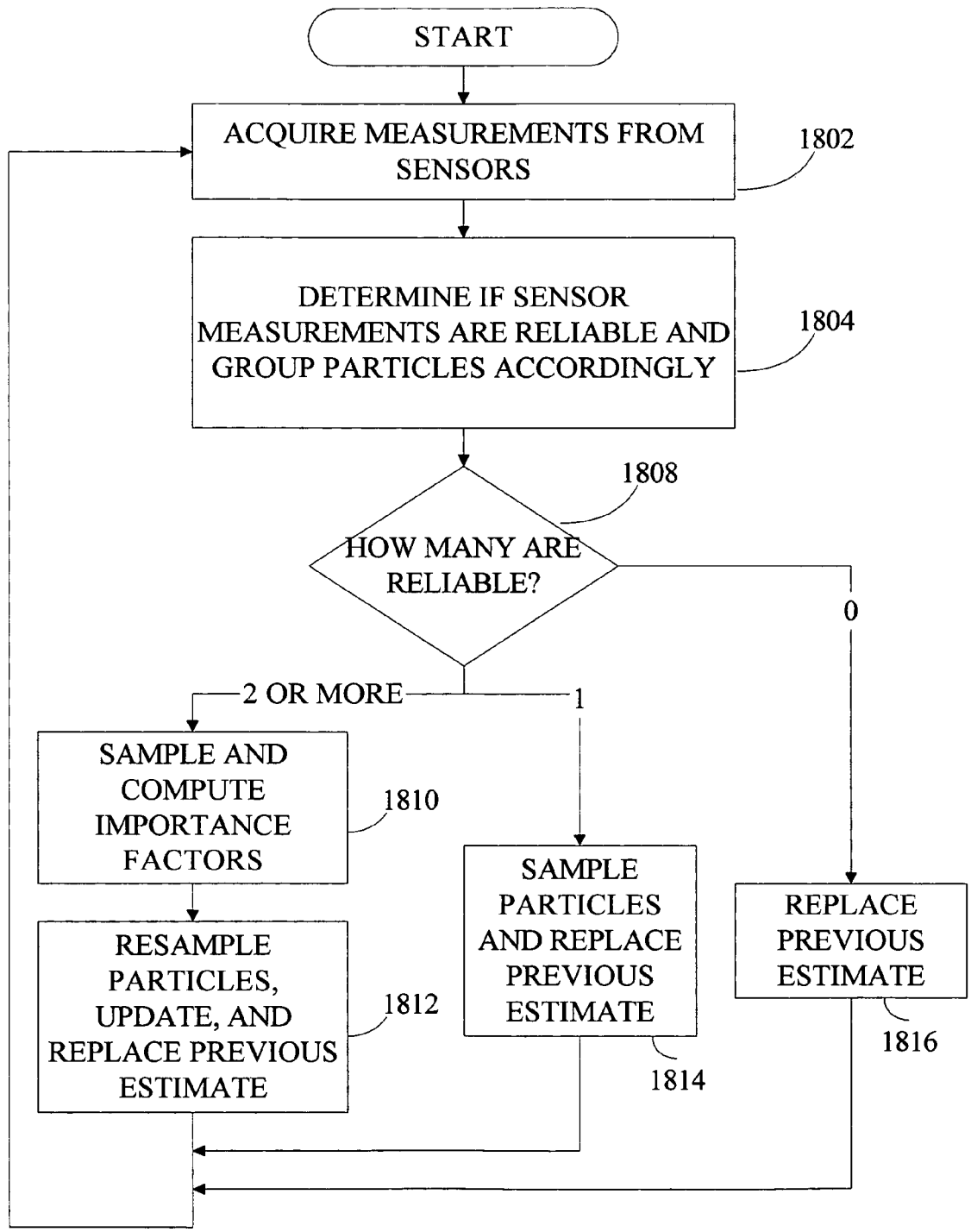
FIG. 18 is a flowchart that generally illustrates a process useful for fusing sensor measurements in a sequential manner.

FIG. 18 generally illustrates a process for updating the probability density function of the characteristic x by fusing the prior density function $p(x_{old})$ with measurements from the sensors. For example, in a 2-sensor system, the prior density function $p(x_{old})$ can be fused with measurements $M_B$ and $M_C$, with the resulting density function denoted $p(x_{new}|x_{old}, M_B, M_C)$, where $x_{new}$ denotes the updated estimate of the characteristic x. While the process will generally be described in the context of a 2-sensor system, it will be understood by the skilled practitioner that the principles and advantages described herein are applicable to systems with more than 2 sensors.

In one embodiment, $p(x_{old})$ corresponds to the probability density function associated with the most recently estimated value of the characteristic x. In another embodiment, $p(x_{old})$ corresponds to the probability density function associated with another previously estimated value of the characteristic x. In the latter case, measurement $M_B$ and measurement $M_C$ can correspond to the accumulated sets of measurements that have been acquired from sensors B and C, respectively, since the time associated with $x_{old}$. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1802, in which measurements from sensors B and C are acquired. In another embodiment, the process can acquire measurements from additional sensors in the state 1802. The process advances to a state 1804 and determines whether the measurements acquired at the state 1802 are to be considered reliable or unreliable. Selected examples of criteria by which sensor measurements can be considered unreliable were discussed in greater detail earlier in connection with the state 1704 of FIG. 17. As an additional example, an odometry measurement from a wheel odometer can be considered unreliable if it is suspected that a kidnapping event has occurred. In one embodiment, measurement $M_B$ is considered reliable only when the value of $x_{old}$ is also considered reliable. By way of example, $x_{old}$, which corresponds to a value of unknown characteristic x at the time of a previous measurement, can be considered reliable if an uncertainty measure, such as a covariance, associated with $x_{old}$ does not exceed a predetermined threshold.

In the state 1804, the $N_{Tot}$ particles are initially unassociated with measurements. Based upon the determination of reliability, the process proceeds to associate the $N_{Tot}$ particles in the following manner. If the measurements from two or more sensors, such as sensor B and sensor C, are considered reliable, then the $N_{Tot}$ particles can be allocated among measurements from the two or lore sensors. For example, if the measurements from both sensor B and sensor C are considered reliable, then a fraction of the $N_{Tot}$ particles can be associated with sensor B, and the remaining particles can be associated with sensor C. The particles do not have to be evenly distributed among the sensors. For example, in one embodiment where sensor B corresponds to a dead reckoning measurement and sensor C corresponds to a global measurement, such as from a camera, about ninety percent of the $N_{Tot}$ particles (rounded to the nearest integer) are associated with sensor B, and the remaining particles are associated with sensor C.

In another illustrative embodiment, where a third sensor D is used, and when the measurements from sensor B, sensor C, and sensor D are considered reliable, about ninety percent of the $N_{Tot}$ particles (rounded to the nearest integer) are associated with sensor B, about five percent of the $N_{Tot}$ particles (rounded to the nearest integer) are associated with sensor C, and the remaining particles are associated with sensor D. Other appropriate fractions will be readily determined by one of ordinary skill in the art.

If measurements from only one of the sensors, such as only one of sensor B and sensor C, are considered reliable, then in one embodiment, approximately all $N_{Tot}$ particles can be associated with the sensor for which the measurements are considered reliable, and zero particles are associated with the sensor for which the measurements are considered unreliable.

If none of the measurements from the sensors, such as from sensor B and sensor C in a two-sensor system, is considered reliable, then no particles are associated with the sensors, and approximately all particles can remain unassociated. The number of particles associated with sensor B is denoted herein by $N_B$, and the number of particles associated with sensor C is denoted herein by $N_C$.

A particle associated with sensor B is termed a "primary particle" herein, and a particle associated with sensor C is termed a "dual particle" herein. In one embodiment, this grouping is performed in a manner such that a first particle and a second particle have equal, or approximately equal, probabilities of being grouped as primary particles; in particular, the grouping is done in a uniform, or an approximately uniform, and random manner. The process then advances to a decision block 1808.

At the decision block 1808, the process selects a processing path based on the number of measurements that are considered reliable as determined earlier in connection with the state 1804. If two or more of the measurements, such as both measurements $M_B$ and $M_C$, are considered reliable, the process proceeds along the processing path associated with two or more reliable measurements and proceeds from the decision block 1808 to a state 1810.

At the state 1810, the process generates one or more random samples x̃ from the conditional distribution corresponding to $p(x|x_{old}, M_B)$, where the number of random samples is given by the number of particles $N_B$ associated with sensor B. The random samples can be indexed as $\tilde{x}_k$, where k=1, 2, ..., $N_B$. The process also computes an importance factor $w_k$ associated with each sample $\tilde{x}_k$ based at least in part on measurement $M_C$ and based at least in part on the random sample $\tilde{x}_k$. In one embodiment, the importance factor $w_k$ is computed according to the formula $w_k=p(M_C|\tilde{x}_k)$. In a system with more than two sensors, the importance factor $w_k$ can be computed using data that is considered reliable from the other sensors. For example, in a system with two additional sensors, the importance factor $w_k$ can be computed according to the formula $w_k=p(M_C, M_D, M_E, \ldots|\tilde{x}_k)$, where $M_D$ and $M_E$ represent measurements from the additional sensors.

Next, the process generates one or more random samples x from the conditional likelihood distribution corresponding to $p(M_C|x)$, where the number of random samples is given by the number of particles $N_C$ associated with sensor C. The random samples can be indexed as $\tilde{x}_k$, where k=$N_B$+1, $N_B$+2, ..., $N_B$+$N_C$. The process also computes an importance factor $w_k$ associated with each sample $\tilde{x}_k$, based at least in part on measurement $M_B$ and random sample $\tilde{x}_k$. In one embodiment, the importance factor $w_k$ is computed according to the formula $w_k=p(\tilde{x}_k|M_B)$. The process then advances to a state 1812.

At the state 1812, the process resamples the $N_{Tot}$ particles, with replacement, where, for example, $N_{Tot}$ is equal to the sum of $N_B$ and $N_C$ when sensor data from measurements $M_B$ and $M_C$ are fused. The $N_{Tot}$ particles are resampled from the new set of particles $\tilde{x}_1, \tilde{x}_2, \ldots, \tilde{x}_{N_{Tot}}$, wherein the probability that a particular particle is resampled relates to the importance factor associated with that particle. This resampled set of particles is used to approximate $p(x_{new}|x_{old}, M_B, M_C)$, the updated distribution of $x_{new}$. Then, the previous estimate of $p(x_{old})$ is replaced with the computed approximation of $p(x_{new}|x_{old}, M_B, M_C)$. The process then returns to the state 1802 and waits for additional sensor measurements.

Returning now to the decision block 1808, when exactly one of the measurements, such as one of measurement $M_B$ and measurement $M_C$, is considered reliable, the process proceeds along the processing path associated with one reliable measurement and proceeds from the decision block 1808 to a state 1814.

In the state 1814, the process selects the measurement that is considered reliable. The determination of which measurement is considered reliable can be reused from the determination previously made in the state 1804. For example, when measurement $M_B$ is considered the only reliable measurement, the process generates one or more random samples x̃ from the conditional probability density distribution corresponding to $p(x_{new}|x_{old}, M_B)$, where the number of random samples is given by the number of particles $N_B$ associated with sensor B. The random samples can be indexed as $\tilde{x}_k$, where k=1, 2, ..., $N_B$. Next, the estimate of $p(x_{old})$ is replaced with the random samples $\tilde{x}_1, \tilde{x}_2, \ldots, \tilde{x}_{N_B}$, to be used in the next cycle, i.e., when new measurements from at least one of the sensors becomes available.

When, for example, the measurement $M_C$ is considered the reliable measurement, the process generates one or more random samples x̃ from the conditional distribution corresponding to $p(M_C|x)$, where the number of random samples is given by the number of samples $N_C$ associated with sensor C. The random samples can be indexed as $\tilde{x}_k$, where k=1, 2, ..., $N_C$. In one embodiment, the process also sets an importance factor $w_k$ associated with each sample $\tilde{x}_k$ equal to a constant, such as 1. In another embodiment, the importance factor $w_k$ is not computed or assigned. Next, the estimate of $p(x_{old})$ is replaced with the random samples $\tilde{x}_1, \tilde{x}_2, \ldots, \tilde{x}_{N_C}$, to be used in the next cycle, i.e., when new measurements from at least one of the sensors B and C becomes available. The process then returns to the state 1802 and waits for additional sensor measurements.

Returning now to the decision block 1808, if none of the measurements is considered reliable, such as neither of the measurement $M_B$ nor measurement $M_C$ in a two-sensor system, the process proceeds along the processing path associated with zero reliable measurements and proceeds from the decision block 1808 to a state 1816.

At the state 1816, the process replaces the previous estimate of $p(x_{old})$ with random samples $\tilde{x}$ from the uniform distribution $p(x)=K$. In one embodiment, K is a constant selected so that $p(x)$ satisfies the definition of a probability density. In another embodiment, K is a non-negative number, but need not be selected so that $p(x)$ satisfies the definition of a probability density. It will be understood, however, that the possible values for K should not include zero or negative numbers. In one embodiment, the value of K is selected to be approximately the inverse of the total number of particles $N_{Tot}$, which can be a constant value for a constant number of particles or can vary with an adaptively-varying total number of particles. The new estimate of $p(x_{old})$ can be used in the next cycle, i.e., when new measurements from at least one of sensors B and C becomes available.

The process then returns to the state 1802 and waits for additional sensor measurements.

Sequential Robust Sensor Fusion

Example 1

In Example 1 (Sequential), operation of the system is described where the system fuses measurements from two or more reliable sensors. In this example, data for a mobile robot is robustly fused. In the illustrated example, sensor B corresponds to a dead reckoning sensor, such as a wheel odometer, coupled to a robot, and measurement $M_B$ from sensor B is based on dead reckoning data, such as odometry measurements, relative to a reliable pre-existing robot pose estimate $x_{old}$. Sensor C corresponds to a visual sensor, such as a camera coupled to the robot, and measurement $M_C$ from sensor C is based on visual estimates, such as visual measurements, of robot pose relative to a pre-existing map. For the purposes of this example, measurements $M_B$ and $M_C$ are always reliable. Other examples that will be described later illustrate process behavior in the presence of an unreliable measurement.

With reference to the exemplary environment of the apartment 1602 described earlier in connection with FIG. 16, the example starts with a previously estimated pose $x_{old}$ that indicates that a previous position of the robot is relatively likely to correspond to a part of the apartment 1602 corresponding to the living room 1614 in the apartment 1602 and relatively unlikely to be located in parts of the apartment 1602 corresponding to the kitchen 1604, the dining room 1606, the family room 1608, the bathroom 1610, and the bedroom 1612 in the apartment 1602. In this example, the dead reckoning sensor B provides a measurement $M_B$ indicating that the robot has moved a relatively short distance relative to the size of the pre-existing map such that the robot could still be in the living room 1614 or could have moved to the family room 1608, the bathroom 1610, or the bedroom 1612, but could not have moved to a relatively distant room, such as the kitchen 1604 or the dining room 1606. Then, based on measurement $M_B$ provided by the dead reckoning sensor B, the system can estimate $p(x|x_{old}, M_B)$ such that $p(x|x_{old}, M_B)$ indicates that the robot is relatively likely to be in the family room 1608, the bathroom 1610, the bedroom 1612, or the living room 1614 and relatively unlikely to be in the kitchen 1604 or the dining room 1606.

Suppose further that the visual sensor C receives a visual measurement $M_C$ corresponding to an image of a table, and suppose that the robot's map of the apartment 1602 indicates that a table is present in some parts of the apartment 1602, such as in the dining room 1606 and the living room 1614, but is not present in other parts of the apartment 1602, such as in the kitchen 1604, the family room 1608, the bathroom 1610, and the bedroom 1612. Then, based on the visual measurement $M_C$ corresponding to the image received by the visual sensor C, the system can estimate $p(M_C|x_{new})$ such that $p(M_C|x_{new})$ indicates that the robot is relatively likely to be in the dining room 1606 or the living room 1614, but relatively unlikely to be in the kitchen 1604, the family room 1608, the bathroom 1610, or the bedroom 1612.

As described above in the example, both measurements $M_B$ and $M_C$ indicate that the robot is relatively likely to be in the living room 1614. Based on measurements $M_B$ and $M_C$, the system can advantageously estimate the fused probability density $p(x_{new}|x_{old}, M_B, M_C)$ such that $p(x_{new}|x_{old}, M_B, M_C)$ indicates that the robot is relatively likely to be in the living room 1614 and relatively unlikely to be in the other rooms in the apartment 1602.

Sequential Robust Sensor Fusion

Example 2

In Example 2 (Sequential), operation of the system is described in the context of one reliable sensor. In this example, sensor B corresponds to a dead reckoning sensor, such as a wheel odometer, coupled to a robot, and measurement $M_B$ from sensor B is based on dead reckoning data, such as odometry measurements, relative to a reliable pre-existing robot pose estimate $x_{old}$. Sensor C corresponds to a visual sensor, such as a camera coupled to the robot, and measurement $M_C$ from sensor C is based on visual estimates, such as visual measurements, of robot pose relative to a pre-existing map. For the purposes of this example, measurement $M_B$ is considered reliable, and measurement $M_C$ is unreliable.

With reference to the exemplary environment of the apartment 1602 illustrated in FIG. 16, a previously estimated pose $x_{old}$ indicates that the previous position of the robot is relatively likely to correspond to a part of the apartment 1602 corresponding to the living room 1614 and relatively unlikely to correspond to parts of the apartment 1602 corresponding to the kitchen 1604, the dining room 1606, the family room 1608, the bathroom 1610, and the bedroom 1612 in the apartment 1602. Suppose further that the dead reckoning sensor B receives a measurement $M_B$ indicating that the robot has moved a relatively short distance relative to the size of the pre-existing map such that the robot could still be in the living room 1614 or could have moved to the family room 1608, the bathroom 1610, or the bedroom 1612, but could not have moved to a relatively remote location such as the kitchen 1604 or the dining room 1606. Then, based on measurement $M_B$ provided by the dead reckoning sensor B, the system can estimate $p(x|x_{old}, M_B)$ such that $p(x|x_{old}, M_B)$ indicates that the robot is relatively likely to be in the family room 1608, the bathroom 1610, the bedroom 1612, or the living room 1614 and is relatively unlikely to be in the kitchen 1604 or the dining room 1606.

Suppose further that the visual sensor C receives a visual measurement $M_C$ corresponding to an image of a table, and suppose that the robot's map of the apartment 1602 indicates that a table is present in some parts of the apartment 1602, such as in the dining room 1606 and the living room 1614, but not in other parts of the apartment 1602, such as in the kitchen 1604, the family room 1608, the bathroom 1610, and the bedroom 1612. Based on visual measurement $M_C$ corresponding to the image received by visual sensor C, the system estimates $p(M_C|x_{new})$ where $p(M_C|x_{new})$ is still computed, such that $p(M_C|x_{new})$ indicates that the robot is relatively likely to be in the dining room 1606 or the living room 1614, and is relatively unlikely to be in the kitchen 1604, the family room 1608, the bathroom 1610, or the bedroom 1612. However, because the visual measurement $M_C$ is considered unreliable, the estimate $p(M_C|x)$ is not used in the computation of the system's estimate of $p(x)$ to the same degree as when measurement $M_C$ is considered reliable. In one embodiment, the estimate $p(M_C|x)$ is not used at all when measurement $M_C$ is considered unreliable, and it will be understood that where it is not used at all, the function $p(M_C|x)$ need not even be computed.

In the illustrated example, the system can estimate the probability density $p(x_{new}|x_{old}, M_B)$ such that $p(x_{new}|x_{old}, M_B)$ indicates that the robot is relatively likely to be in the family room 1608, the bathroom 1610, the bedroom 1612, or the living room 1614 and is relatively unlikely to be in the kitchen 1604 or the dining room 1606.

Robust Sensor Fusion in VSLAM Localization

One embodiment of a visual simultaneous localization and mapping system (VSLAM) for a mobile device estimates the pose (position and orientation) S of the mobile device based on a combination of incremental measurements and global measurements. For example, the relative measurements can include a measurement $M_B$ from a dead reckoning sensor B, such as a wheel odometer, and the global measurements can include a measurement $M_C$ from a sensor C, such as a camera, a laser range finder, a SONAR sensor, an IR sensor, a LIDAR sensor, and the like.

The accumulated dead reckoning measurement $M_B$ corresponds to dead reckoning measurements collected subsequent to a previous value of pose, referred to as the "old" pose $S_{old}$. The measurement $M_B$ can be associated with the control action that transforms the pose from the old pose $S_{old}$ to a "new" pose $S_{new}$. By way of example, the measurement $M_B$ can indicate that the device has moved two meters in a direction of 35 degrees relative to the old pose and has changed orientation by 15 degrees.

The uncertainty in the dead reckoning measurement $M_B$ can be modeled by a probability density function $p(S_{new}|S_{old}, M_B)$. It is desirable that the expression for the dead reckoning function returns the value for $p(S_{new}|S_{old}, M_B)$ for a proposed value of $S_{new}$, a given value of $S_{old}$, and a given value of $M_B$.

In one embodiment, the functional expression for $p(S_{new}|S_{old}, M_B)$ is given by Equation 30, Equation 31, and Equation 32.

$$p(S_{new} \mid S_{old}, M_B) = (2\pi)^{-3/2}(\det \Omega)^{-1/2} \qquad \text{Equation 30}$$
$$\exp\left(-\frac{1}{2}(S_{new} - S_{new,pred})\Omega^{-1}(S_{new} - S_{new,pred})^T\right)$$

$$M_B = \begin{bmatrix} \Delta_1^{odom} \\ \Delta_2^{odom} \\ \Delta_3^{odom} \end{bmatrix} \qquad \text{Equation 31}$$

$$S_{new,pred} \begin{bmatrix} x_{old} + \Delta_1^{odom}\cos(\theta_{old} + \Delta_2^{odom}) \\ y_{old} + \Delta_1^{odom}\sin(\theta_{old} + \Delta_2^{odom}) \\ \theta_{old} + \Delta_3^{odom} \end{bmatrix} \qquad \text{Equation 32}$$

In Equation 30, the matrix $\Omega$ corresponds to the covariance matrix associated with the measurements from the sensor B. The matrix $\Omega$ indicates the incremental uncertainty in localization for localization calculated based only on the old pose estimate $S_{old}$ and a measurement $M_B$. It will be understood that appropriate values for the covariance matrix $\Omega$ associated with measurement $M_B$ can vary according to the characteristics of the sensor used. For example, the matrix $\Omega$ can correspond to the odometry matrix $C_{odom}(D)$ or to the dead reckoning covariance $C_{dr}$ described earlier in connection with FIG. 13. Other appropriate computations for the covariance matrix $\Omega$ associated with the measurements $M_B$ will be readily determined by one of ordinary skill in the art.

A measurement $M_C$ from sensor C can correspond to a measurement of the location of the device in a global map. The measurement $M_C$ can be referred to as a "global measurement."

The uncertainty in the global measurement $M_C$ can be modeled by a probability density function $p(M_C|S_{new})$. It is desirable that sensor C returns a value for global measurement $M_C$ that corresponds, or approximately corresponds, to the density function for $p(M_C|S_{new})$ for a given value of $S_{new}$. For example, the value for $p(M_C|S_{new})$ should be zero if the global measurement $M_C$ is impossible given the value of $S_{new}$.

In one embodiment, we assume that the functional expression for $p(M_C|S_{new})$ is given by Equation 33 and Equation 34.

$$p(M_C \mid S_{new}) = \qquad \text{Equation 33}$$
$$(2\pi)^{-3/2}(\det \Sigma)^{-1/2}\exp\left(-\frac{1}{2}(M_C - S_{new})\Sigma^{-1}(M_C - S_{new})^T\right)$$

$$M_C = S_{new,meas} \qquad \text{Equation 34}$$

In Equation 33, the matrix $\Sigma$ corresponds to the covariance matrix associated with a measurement $M_C$ from sensor C. The matrix $\Sigma$ indicates the uncertainty in localization for localization calculated based only on a measurement $M_C$. In one embodiment, the sensor covariance matrix $\Sigma$ corresponds to a diagonal matrix diag ($25 \text{ cm}^2$, $25 \text{ cm}^2$, $0.001 \text{ rad}^2$). It will be understood that appropriate values for the covariance matrix $\Sigma$ associated with measurements for sensor C will vary according to the characteristics of the sensor used, and appropriate values for the covariance matrix $\Sigma$ associated with the measurements $M_C$ may also vary according to external parameters such as, in the context of a visual sensor, lighting conditions, texture observed in the environment, and the like. Other appropriate values for the covariance matrix $\Sigma$ associated with the measurements $M_C$ will be readily determined by one of ordinary skill in the art.

The value for $S_{old}$ corresponds to the value of the pose S at the time of a previous sensor measurement if such a previous sensor measurement exists. If no prior measurement has been processed, as is the case before the first set of measurements has been processed, then, in one embodiment, the uniform density can be assigned to $p(S_{old})$ so that the values assigned to $p(S_{old})$ are relatively uniform, such as the same value. In one embodiment, the method can set $p(S_{old})=K$, where K is a constant selected so that $p(S_{old})$ satisfies the definition of a probability density. In another embodiment, K may be a constant, but need not be chosen so that $p(S_{old})$ completely satisfies the definition of a probability density. By way of example, if a first pose $S_1$ is approximately twice as likely as a second pose $S_2$, then the probability density $p(S_1)$ associated with the first pose $S_1$ should be approximately twice as large as the probability $p(S_2)$ associated with the second pose $S_2$.

In one embodiment, robust sensor fusion in VSLAM is conducted according to the description of sequential robust sensor fusion described earlier in connection with FIG. 18, in which a measurement $M_B$ from sensor B corresponds to dead reckoning measurements and a measurement $M_C$ from sensor C corresponds to global measurements, wherein a measurement $M_B$ is associated with the dead reckoning from an old pose to a new pose, and wherein a measurement $M_C$ is associated with a global measurement acquired at the new pose.

Robust Sensor Fusion in VSLAM Mapping and Localization

As will be described in further detail herein, the systems and methods described earlier in connection with FIGS. 1-15 can advantageously be modified to provide the VSLAM system with the benefits of the robust sensor fusion techniques described herein.

Example of a System Architecture for VSLAM

Figure 19:
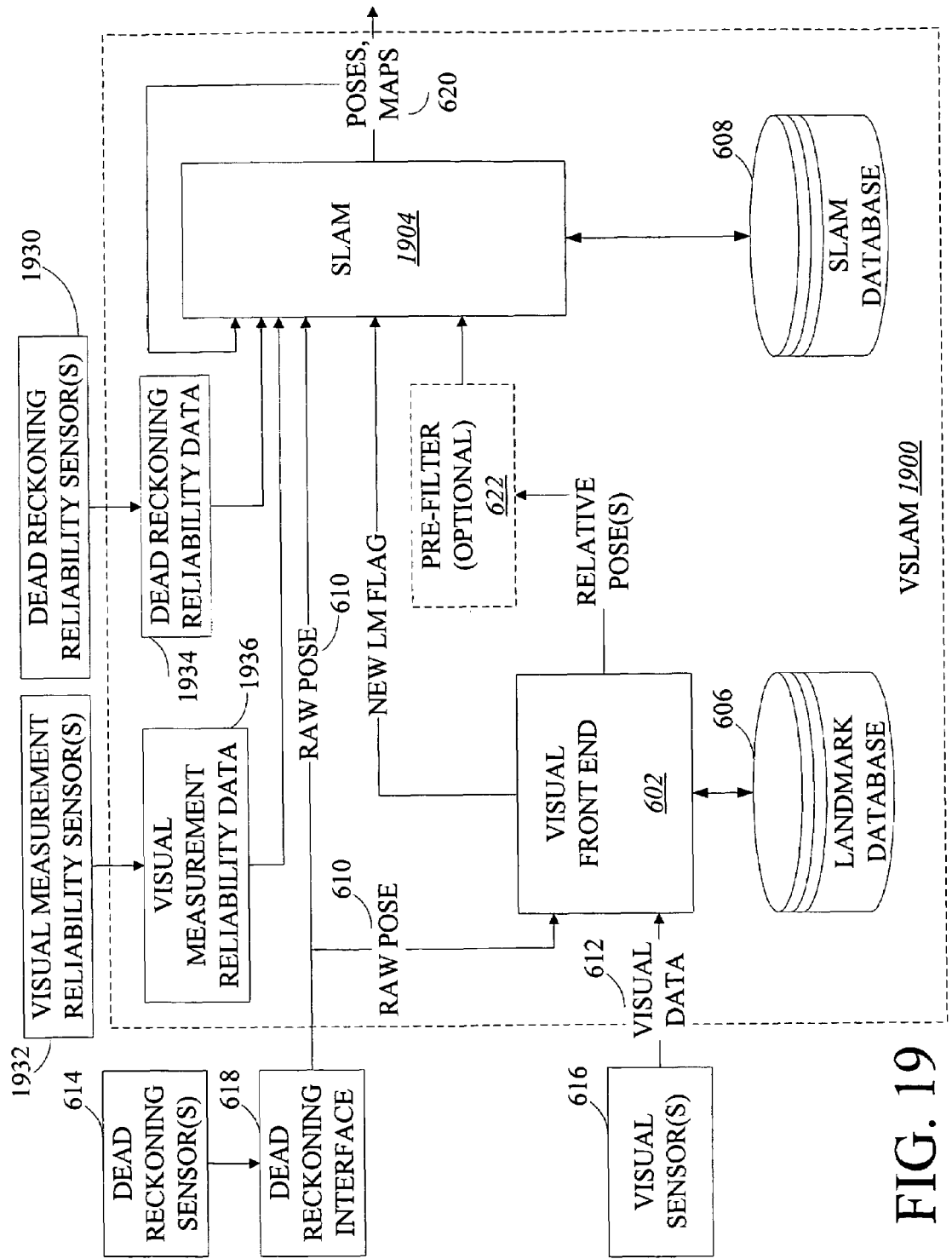
FIG. 19 illustrates one embodiment of a system architecture for a VSLAM system.

FIG. 6 illustrates one embodiment of a system architecture for a VSLAM system. FIG. 19 illustrates a corresponding system architecture that advantageously provides a VSLAM system 1900 with the benefits of the robust sensor fusion techniques described herein. Some of the components and/or modules of the VSLAM system 1900 illustrated in FIG. 19 were described in greater detail earlier in connection with FIG. 6. It will be understood that the VSLAM system 1900 can be implemented in a variety of ways, such as by dedicated hardware, by software executed by a microprocessor, or by a combination of both dedicated hardware and software.

Inputs to the VSLAM system 1900 include raw pose data 610 from one or more dead reckoning sensors 614 and also include visual data 612 from one or more visual sensors 616. The dead reckoning sensor 614 can include, for example, an optical wheel encoder. The visual sensor 616 can include, for example, a camera. Additional inputs to the VSLAM system 1900 include dead reckoning reliability data 1934 from one or more dead reckoning reliability sensors 1930 and visual measurement reliability data 1936 from one or more visual measurement reliability sensors 1932. The dead reckoning reliability sensor 1930 can provide an indication that the data provided by the dead reckoning sensors 614 and/or the dead reckoning interface 618 has temporarily become unreliable. The dead reckoning reliability sensor 1930 can, optionally, also provide an indication that a previous pose estimate $S_{old}$ is unreliable because, for example, an uncertainty measure associated with the previous pose estimate $S_{old}$ is unacceptably large. In one embodiment, the dead reckoning reliability sensor 1930 corresponds to a kidnapping sensor that can detect when the robot has been kidnapped. One example of a kidnapping sensor is a mechanical switch that can detect if the robot is lifted off of the ground. Another example of a kidnapping sensor is an infrared sensor that can detect if the robot is lifted off of the ground.

The visual measurement reliability sensor 1932 can provide an indication that the visual data 612 provided by the visual sensors 616 has temporarily become unreliable. In one embodiment, the visual measurement reliability sensor 1932 corresponds to a sensor that can detect if the robot is accelerating or decelerating too quickly to produce a reliable visual measurement. One example of such a sensor is an accelerometer. In another embodiment, the visual measurement reliability sensor 1932 corresponds to a sensor that can detect if the visual sensor was moving with an unacceptably high angular velocity at the time the image was acquired. It will be understood by one of ordinary skill in the art that an embodiment of the system can still advantageously attain some or all of the advantages described herein while using only one of the dead reckoning reliability sensor 1930 and the visual measurement reliability sensor 1932. It will be understood that the dead reckoning sensor 614 can communicate with the VSLAM system 1900 via the dead reckoning interface 618, such as via a driver or via a hardware abstraction layer. The raw pose data 610 can correspond to distance traveled, to velocity, to acceleration, and the like, and can depend on the type of dead reckoning sensor used. Outputs from the VSLAM system 1900 can include one or more poses and maps 620.

The raw pose data 610 and the visual data 612 are provided as inputs to the Visual Front End 602, one embodiment of which was described earlier in connection with FIG. 6. The Visual Front End 602 can perform a variety of functions, such as identify landmarks, identify 3-D features for landmarks, calculate delta pose, and the like. Examples of processes that can be performed by the Visual Front End 602 were described in greater detail earlier in connection with FIGS. 9 and 10. A system architecture for the Visual Front End 602 was described in greater detail earlier in connection with FIG. 14.

The Visual Front End 602 can use the raw pose data 610 to determine the approximate distance traveled between the images used for measurements in the visual data 612, which are then used in computations to measure the displacements to the features. When new physical landmarks are recognized, corresponding records or entries can be added to the landmark database 606, one embodiment of which was described earlier in connection with FIG. 6 and FIG. 8. A sample data, structure for the landmark database 606 was described earlier in connection with FIG. 8. Newly recognized landmarks can also be indicated to a SLAM module 1904. For example, a "new landmark" flag can be activated, and a "new landmark" identifier or tag can be provided to the SLAM module such that the appropriate records in the SLAM database 608 and the landmark database 606 can be matched. One embodiment of the SLAM database 608 was described in greater detail earlier in connection with FIG. 6 and FIG. 8. When previously recognized landmarks are encountered, the Visual Front End 602 can provide the SLAM module 1904 or an optional Pre-Filter module 622 with one or more identifiers or tags to indicate the one or more landmarks encountered, relative pose information, such as relative pose information ($\Delta x$, $\Delta y$, and $\Delta \theta$), and data reliability measures as applicable.

The optional Pre-Filter module 622 analyzes the data reliability measures provided by the Visual Front End 602. The data reliability measures can be used as an indication of the reliability of the identification of the physical landmark by the Visual Front End 602. For example, the Pre-Filter module 622 can advantageously be used to identify a landmark measurement identified by the Visual Front End 602, which may have been inaccurately measured and can correspond to an outlier with respect to other landmarks in a map. In one embodiment, when the Pre-Filter module 622 identifies a potentially inaccurate visual measurement, the Pre-Filter module 622 does not pass the identified visual landmark data onto the SLAM module 1904 such that the VSLAM system 1900 effectively ignores the potentially inaccurate landmark measurement. Pre-filtering of data to the SLAM module 1904 can advantageously enhance the robustness and accuracy of one or more poses (position and orientation) and maps 620 estimated by the SLAM module 1904.

A process that can be performed by the Pre-Filter module 622 was described in greater detail earlier in connection with FIG. 12. A system architecture of the Pre-Filter module 622 was described in greater detail earlier in connection with FIG. 15.

The SLAM module 1904 maintains one or more poses and maps 620. In one embodiment, the SLAM module 1904 maintains multiple particles or hypotheses, and each particle is associated with a pose and a map. FIGS. 7A and 7B illustrate an example of relationships between particles, poses, and maps.

The SLAM module 1904 receives the raw pose data 610 from the dead reckoning interface 618. It will be understood that the nature of the raw pose data 610 can vary according to the type of dead reckoning sensor 614 and the type of output specified by the dead reckoning interface 618. Examples of the raw pose data 610 can include distance measurements, velocity measurements, and acceleration measurements. The dead reckoning data is used by the SLAM module 1904 to estimate course and distance traveled from a prior pose. It will be understood that where multiple hypotheses are used by the SLAM module 1904, that the dead reckoning data is used to estimate course and distance traveled from relatively many prior poses.

Other inputs to the SLAM module 1904 include visual localization data from the Visual Front End 602 and/or the optional Pre-Filter module 622. Additional inputs to the SLAM module 1904 include reliability indications 1934 from the dead reckoning reliability sensor 1930 and/or reliability indications 1936 from the visual measurement reliability sensor 1932. As a robot with VSLAM travels in an environment, the robot observes visual landmarks. When a new visual landmark is encountered, the SLAM module 1904 can store the robot's global reference frame location for the particles in the SLAM database 608. For example, the robot's pose can be estimated from a previous location and the course and distance traveled from a last known pose.

When a previously created landmark is observed, the SLAM module 1904 is provided with a new estimate of relative pose information, such as $\Delta x$, $\Delta y$, and $\Delta \theta$ to the observed landmark, from the Visual Front End 602 or the optional Pre-Filter module 622. The SLAM module 1904 uses the change in pose information to update the one or more poses and maps 620 maintained. Accordingly, the visually observed landmarks can advantageously compensate for drift in dead reckoning measurements.

An example of a process for performing SLAM will be described in greater detail later in connection with FIG. 21.

SLAM Processing for New Landmarks

To provide the VSLAM system with the benefits of the robust sensor fusion techniques described herein, the procedure associated with SLAM processing for new landmarks described earlier in connection with FIG. 11 can be replaced with the procedure associated with SLAM processing for new landmarks will now be described. A process that can be used in a SLAM module when returning to an existing landmark will be described later in connection with FIG. 21.

FIG. 20 is a flowchart that generally illustrates a process that can be used in a SLAM module when creating a new visual landmark. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like. In a SLAM module, a landmark is represented by the pose of the landmark reference frame in the global reference frame, i.e., the transformation (rotation and translation) that relates the landmark reference frame to the global reference frame.

Returning to the process illustrated in FIG. 20, the process begins at a state 2002, where the process receives an indication that a new landmark has been observed. For example, the process can receive the indication of the new landmark and a corresponding identifier for the new landmark from the state 1020 of the process described earlier in connection with FIG. 10. The process advances from the state 2002 to a decision block 2003.

In the decision block 2003, the process determines whether or not the dead reckoning data provided to the SLAM system is considered reliable. In one embodiment, the determination as to whether the dead reckoning data is considered reliable is provided by a dead reckoning reliability sensor, such as the dead reckoning reliability sensor 1930 described earlier in connection with FIG. 19. Additionally, in one embodiment, the dead reckoning data is considered reliable only if a previous estimate of pose $S_{old}$ is also considered reliable. If the dead reckoning data provided to the SLAM system is not considered reliable, the process proceeds from the decision block 2003 to a state 2016. If the dead reckoning data provided to the SLAM system is considered reliable, the process proceeds to a state 2004.

In the state 2016, the system rejects the landmark that is currently being processed and the new landmark is not entered into the SLAM database 608. In one embodiment, where the new landmark has already been added to the landmark database 606, the process also deletes the new landmark created by the Visual Front End 602 by deleting the features, 3-D positions, 2-D image locations, landmark identifier, feature identifiers, and other data associated with the landmark created in connection with the states 1018, 1020 of FIG. 10. In another embodiment, the Visual Front End 602 temporarily stores a new landmark and waits for an acknowledgment or handshake from the SLAM module 1904 that the new landmark has been accepted before storing the new landmark to the landmark database 606. The temporary storage can be accomplished by, for example, adding a field to the Landmark Table 802. The process then ends.

Returning now to the decision block 2003, if the dead reckoning data provided to the SLAM system is considered reliable, the process proceeds to the state 2004. In the state 2004, the process computes the change in pose from a last update time for the SLAM system. In one embodiment, all the particles of a SLAM system are updated at the same time such that the last update time for a particular particle is the same as the last update time for the other particles.

The change in pose is computed by retrieving data provided by the dead reckoning sensors and/or interface. In one embodiment, the process retrieves the appropriate data from a data store, such as from a database including the Dead Reckoning Data Matrix 812 described earlier in connection with FIG. 8. For example, a timestamp associated with the last update time for the particles and a timestamp associated with the recognition of the observed landmark can be used to identify the appropriate data to be retrieved from the Dead Reckoning Data Matrix 812. In one embodiment, the process computes a change in pose $[\Delta_1, \Delta_2, \Delta_3]^T$ from the dead reckoning data as expressed earlier in Equation 1, the results of which will be used later to estimate or predict the pose of a robot in the global reference frame and/or update the landmark pose.

In Equation 1, the change in pose from a first dead reckoning pose at time k $(x_k, y_k, \theta_k)$ to a second dead reckoning pose at time l $(x_l, y_l, \theta_l)$ is computed. In one embodiment, the change in pose is computed by a function call, such as a call to a "DeltaPose" subroutine. A variable $\Delta_1^{odom}$ corresponds to the Euclidean distance between $(x_k, y_k)$ and $(x_l, y_l)$. A variable $\Delta_2^{odom}$ corresponds to the bearing from the robot at time k to the robot at time l. A variable $\Delta_3^{odom}$ represents the change in heading from the robot at time k to the robot at time l. The "mod" in Equation 1 denotes the arithmetic modulus operator. The process advances from the state 2004 to the beginning of a loop 2006.

Where multiple particles are used to track multiple hypotheses, the loop updates each particle that is maintained. The loop starts at a state 2008. In the state 2008, the process retrieves the landmark identifier for the newly defined landmark. In one embodiment, the same landmark identifier is used to identify a landmark in a SLAM process as the identifier for the landmark in a visual localization process. Of course, a different landmark identifier can also be generated and cross-referenced. It should also be noted that the SLAM process does not need to store graphical information, such as 3-D features, of the landmark. Rather, the SLAM process can operate by identification of which landmark was encountered, such as the Landmark ID, such that a database record identifier can be used to identify the landmarks within SLAM. The process advances from the state 2008 to a state 2010.

In the state 2010, the process adds the new landmark pose to the database. It should be noted that in the illustrated embodiment, the initial estimate of the new landmark pose is the estimated pose of the robot corresponding to when the landmark was observed that is stored in the database and not the estimated position in space of the physical landmark itself. To add the new landmark pose to the database, the process estimates the current pose of the robot for the particle corresponding to the particular iteration of the loop. In one embodiment, the current pose is estimated by combining the change in pose from the dead reckoning data as calculated in the state 2004 with the previous pose of the robot for the particle as retrieved from the last time that the particle was updated. Equation 2 expresses one way to combine the change in pose $[\Delta_1^{odom}, \Delta_2^{odom}, \Delta_3^{odom}]^T$ with a previous pose $(x_k, y_k, \theta_k)$ to generate a new pose $(x_l, y_l, \theta_l)$, which is used as the new landmark pose. It will be understood that the subscripts of k and l as used in the state 2010 represent different variables than the same subscripts of k and l as used in the state 2004.

In one embodiment, the new robot pose $(x_l, y_l, \theta_l)$ is computed by a function call, such as a call to a "PredictPose" subroutine. The process advances from the state 2010 to a state 2012.

In the state 2012, the process initializes the landmark covariance matrix $C_m^k$ associated with the particle corresponding to the iteration of the loop, where m is a particle loop variable and where k is a landmark loop variable. In one embodiment, the landmark covariance matrix $C_m^k$ is initialized to a diagonal 3×3 matrix. In one embodiment, the landmark covariance matrix $C_m^k$ is initialized to a diagonal matrix of diag (81 cm$^2$, 81 cm$^2$, 0.076 rad$^2$). Other suitable initialization values for the landmark covariance matrix $C_m^k$ will be readily determined by one of ordinary skill in the art. The values for the landmark covariance matrix $C_m^k$ can be stored in a record in the Map Table 816. It will be understood that appropriate initialization values can vary in a very broad range and can depend on a variety of factors, including camera specification, dead reckoning equipment precision, and the like. The process proceeds from the state 2012 to the end of the loop 2014. The process returns to the beginning of the loop 2006 when there are remaining particles to be updated. Otherwise, the process ends.

SLAM Processing for Revisiting Landmarks

To provide the VSLAM system with the benefits of the robust sensor fusion techniques described herein, the procedure associated with SLAM processing for revisiting landmarks described earlier in connection with FIG. 13 can advantageously be replaced with the procedure associated with SLAM processing for revisiting landmarks will now be described.

Figure 21B:
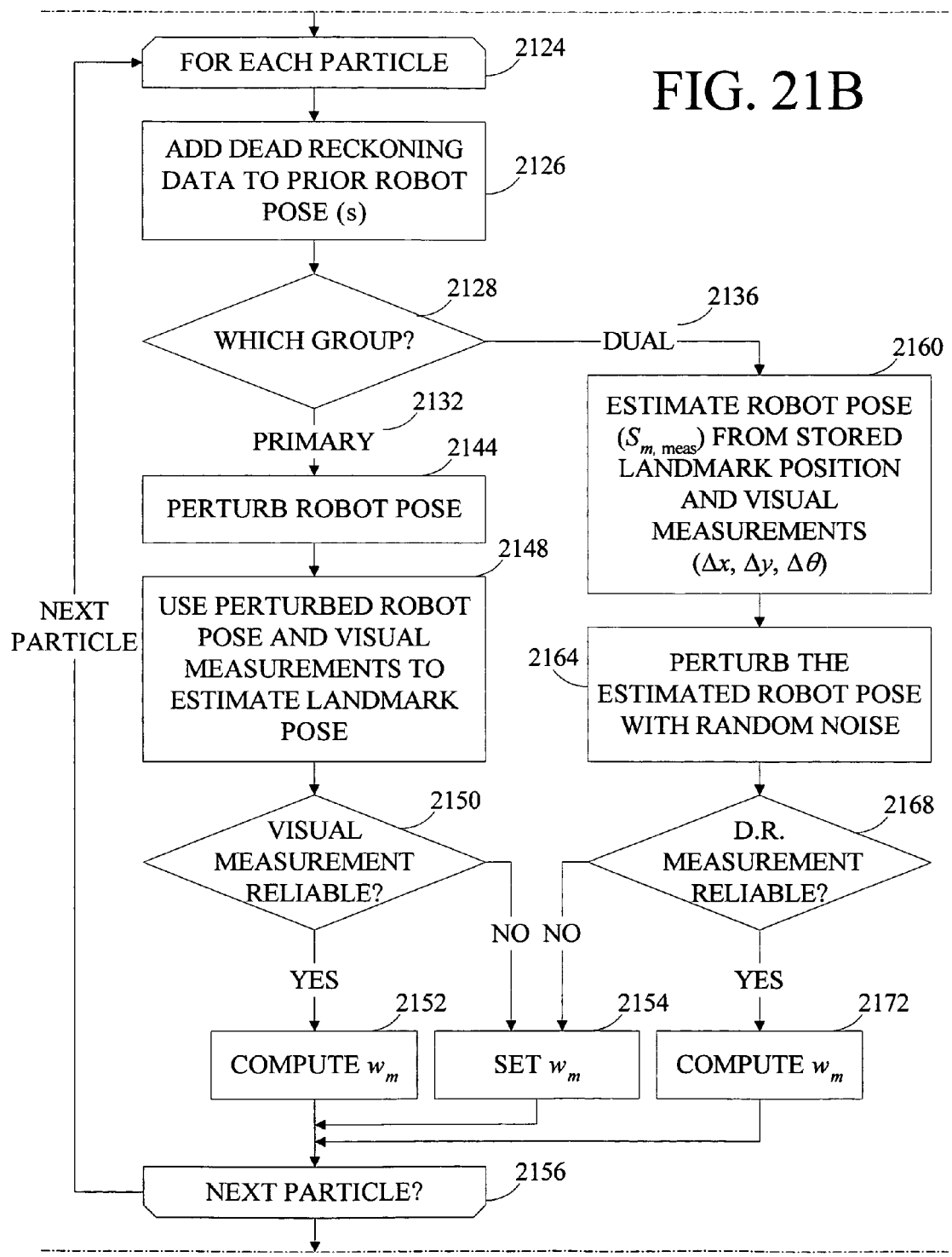
FIG. 21 consists of FIGS. 21A, 21B, and 21C and is a flowchart that generally illustrates a process useful in a SLAM module when re-encountering a landmark.
Figure 21C:
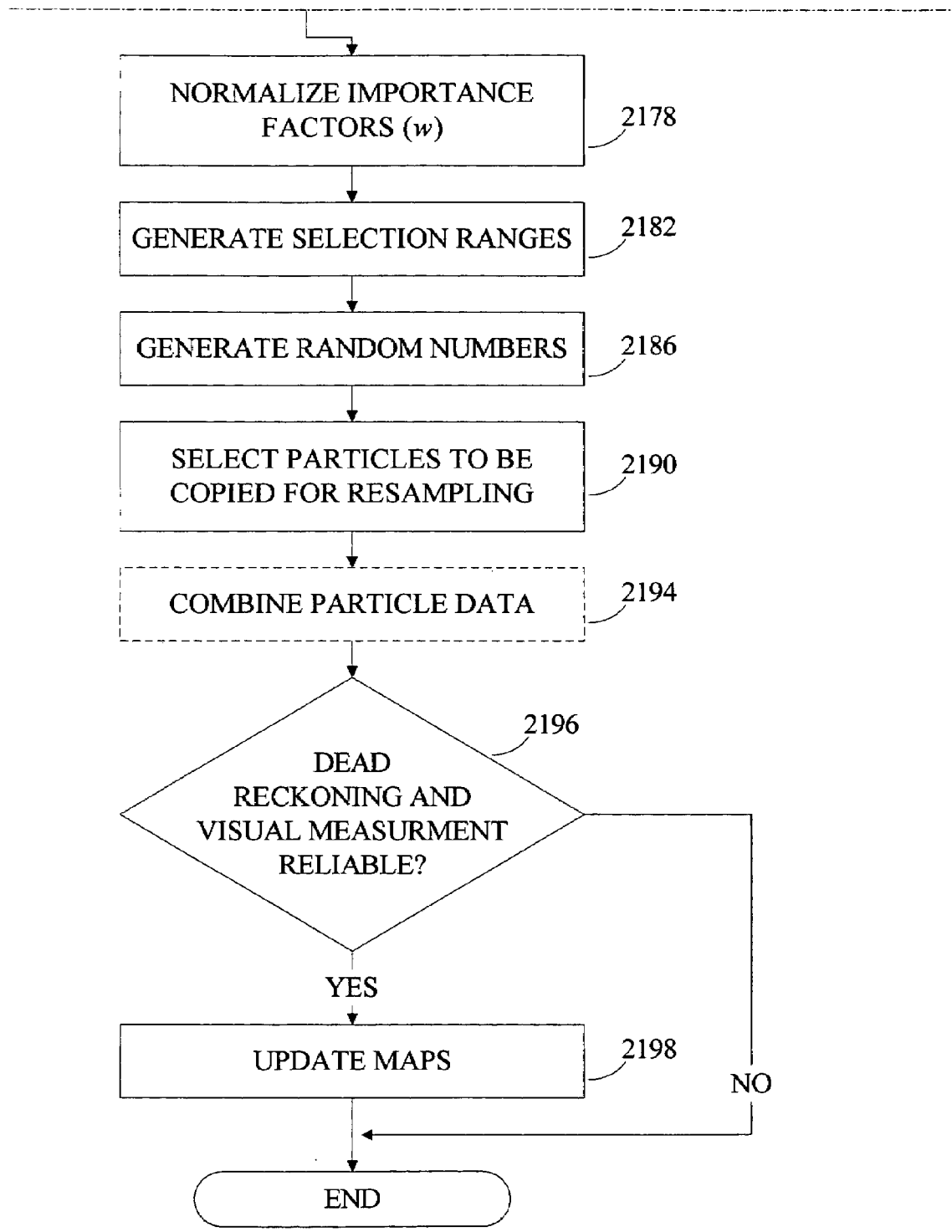

FIG. 21 is a flowchart that generally illustrates a process that can be used in a SLAM module when a landmark is re-encountered. The illustrated SLAM process advantageously updates one or more particles with information obtained from a combination of one or more visual sensors and one or more dead reckoning sensors. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 2102, where the process receives matching landmark data. The process can be used with or without a Pre-Filtering process, such as the process described earlier in connection with FIG. 12. For example, the SLAM process of FIG. 21 can receive unfiltered landmark measurement data from the state 920 of FIG. 9 or can receive filtered data from the state 1212 of FIG. 12. The process advances from the state 2102 to a state 2104.

In the state 2104, a sub-matrix is extracted from dead reckoning data, such as from the Dead Reckoning Data Matrix 812. In one embodiment, the sub-matrix, denoted D, corresponds to a 3×M matrix as illustrated in Equation 4, which was described earlier in connection with FIG. 13. The process advances from the state 2104 to a state 2105.

In the state 2105, the process computes the change in pose traveled from a last update time for the SLAM system. In one embodiment, all the particles of a SLAM system are updated at the same time such that the last update time for a particular particle is the same as the last update time for the other particles. An example of change in pose computations were described earlier in connection with the state 1104 of FIG. 11 and the state 2004 of FIG. 20. The process advances from the state 2105 to a state 2108.

In the state 2108, the covariance for dead reckoning data is computed. The dead reckoning covariance estimates errors in the dead reckoning data. It will be understood that the dead reckoning covariance can be computed by a variety of techniques, and that the computation can vary depending on the type of dead reckoning sensor used. In one embodiment, where the dead reckoning sensor is an odometer, the covariance is computed as follows and will be denoted "odometer covariance," and denoted $C_{odom}(D)$ and corresponds to a 3×3 matrix. While illustrated generally in the context of odometry, it will be understood by the skilled practitioner that the principles and advantages described herein will be applicable to other forms of dead reckoning sensors such that in another embodiment, the odometry covariance $C_{odom}(D)$ can correspond to a dead reckoning covariance $C_{dr}$.

The error noise modeled with the odometer covariance $C_{odom}(D)$ models the uncertainty in the dead reckoning from a pose A to another pose B for the values in the data sub-matrix D. In one embodiment, the odometer covariance $C_{odom}(D)$ corresponds to the final value of a matrix $C_{temp}$, that is, starts from an initial condition and is iteratively calculated between columns of the data sub-matrix D, for example, iteratively computed M−1 times. The value of the matrix $C_{temp}$ is initialized to a random noise covariance matrix $C_{RN}$ as expressed in Equation 5.

In one embodiment, the random noise covariance matrix $C_{RN}$ corresponds to a diagonal matrix diag (2.8 cm$^2$, 2.8 cm$^2$, 0.0001 rad$^2$). It will be understood that appropriate values for the random noise covariance matrix $C_{RN}$ can vary according to the characteristics of the dead reckoning sensor used. Other appropriate values for the random noise covariance matrix $C_{RN}$ will be readily apparent to one of ordinary skill of the art. The process then advances from the state 2108 to a state 2109 (**I renumbered this because I added some optional states to the chart).

In the state 2109, the process determines whether at least one of the dead reckoning measurements or the visual measurements provided as inputs to the SLAM system are reliable. Examples of criteria that can be used to determine whether measurements can be considered reliable or unreliable were described in greater detail earlier in connection with the state 1704 of FIG. 17. These determinations can be based in part on input from the dead reckoning reliability sensor 1930 and/or input from the visual measurement reliability sensor 1932 described earlier in connection with FIG. 19. These determinations can also be based in part on a determination that the data reckoning data and/or the visual measurements correspond to outliers or to otherwise suspicious data. For example, the Pre-Filter module 622 can provide an indication that the visual measurements are unreliable. The determinations made in the state 2109 can be stored for use later in the process. In addition, it should be noted that the determinations made in the state 2109 can correspond to binary determinations of whether a measurement is considered reliable, to a relative measurement of how reliable a measurement is, or to both. The process advances from the state 2109 to an optional state 2110 or to the beginning of a loop 2112.

In the optional state 2110, the process determines whether the previous estimate of pose $S_{old}$ is also considered reliable. In one embodiment, the dead reckoning data is considered reliable only when the previous estimate of pose $S_{old}$ is also considered reliable. The determination of whether the previous estimate of pose $S_{old}$ is considered reliable can be accomplished by, for example, computation of an uncertainty measure, such as a covariance, associated with the previous estimate of pose $S_{old}$. If the uncertainty measure exceeds a predetermined threshold, the previous estimate of pose $S_{old}$ can be considered unreliable. The determination of whether the previous estimate of pose $S_{old}$ is considered reliable can advantageously be stored for use later in the process, can be retrieved from a prior calculation, can be incorporated into the consideration of the reliability of the dead reckoning measurement provided in the state 2109, and the like. The process advances from the optional state 2110 to an optional state 2111.

In one embodiment with the optional state 2111, the process varies the primary rate at least partially in response to the relative reliability of the measurements. It will be understood that the determination in the state 2109 can correspond to a binary characterization of the reliability of the measurements and that in the optional state 2111, the process determines the relative reliability of a measurement that is considered to be reliable. The process advances from the optional state 2111 to the beginning of the loop 2112.

The process then enters the beginning of the loop 2112 that executes $N_{Tot}$ times, where $N_{Tot} = N_B + N_C$ and where $N_{Tot}$ corresponds to the total number of particles used to represent the probability density function. Similarly, when there are four sensors, B, C, D and E, $N_{Tot} = N_B + N_C + N_D + N_E$ where $N_{Tot}$ corresponds to the total number of particles used to represent the probability density function.

In the loop that includes the beginning of the loop 2112, a state 2116, and the end of the loop 2120, the process associates a particle with either a first group or a second group. A particle belonging to the first group is termed "primary particle" herein. A particle belonging to the second group is termed a "dual particle" herein. The rate of probability at which particles are allocated to the first group is termed "primary rate" herein. It will be understood that the primary rate can vary in a very broad range.

In one embodiment, the primary rate is about 0.9 such that about 90% of the particles are grouped as primary particles and about 10% of the particles are grouped as dual particles. In one embodiment, two different particles in the multiple hypotheses have about the same probability of being associated with the first group (e.g., a probability of 0.9) or with the second group (e.g., a probability of 0.1), and such association is performed in an approximately random manner.

An appropriate value for the primary rate can depend on the relative reliability of dead reckoning measurements versus the reliability of visual measurements over relatively short distances, which was determined earlier in the state 2109. For example, where dead reckoning measurements are relatively unreliable, relatively lower values for the primary rate are used.

In one embodiment, when dead reckoning measurements and/or a previous pose estimate $S_{old}$ are considered unreliable, the primary rate is approximately equal to 0. In another embodiment, when visual measurements are considered unreliable, the primary rate is equal to 1. In another embodiment, when both dead reckoning measurements and visual measurements are considered unreliable, this step is skipped, and the particles are not associated as either primary or dual. Upon completion of the loop, the process proceeds to the beginning of a loop 2124, which starts at a state 2126.

In the state 2126, the process predicts or estimates a new robot pose for the m-th particle $S_{m,pred}$ from the previous robot pose for the m-th particle $s_m$ $(x_{m,old}, y_{m,old}, \theta_{m,old})^T$ by retrieving the change in pose $[\Delta_1^{odom} \Delta_2^{odom}, \Delta_3^{odom}]^T$ obtained via dead reckoning data as described earlier in connection with the state 1305 of FIG. 13, the state 2105 of FIG. 21 and Equation 1, and combining the change in pose $[\Delta_1^{odom}, \Delta_2^{odom}, \Delta_3^{odom}]^T$ with the previous pose $s_m$ $(x_{m,old}, y_{m,old}, \theta_{m,old})^T$ using the process described in the state 1110 of FIG. 11, in the state 2010 of FIG. 20, and in Equation 2, where $(x_k, y_k, \theta_k) = (x_{m,old}, y_{m,old}, \theta_{m,old})$, and the new robot pose $S_{m,pred}$ corresponds to $(x_l, y_l, \theta_l)^T = (x_{m,pred}, y_{m,pred}, \theta_{m,pred})^T$. The process advances from the state 2126 to a decision block 2128.

In the decision block 2128, the process selects a primary processing path 2132 or a dual processing path 2136. The primary processing path 2132 includes a state 2144, a state 2148, a decision block 2150, a state 2152, and a state 2154. The dual processing path 2136 includes a state 2160, a state 2164, a decision block 2168, a state 2172, and the state 2154. It should be noted that the processing illustrated in the state 2154 varies depending on the processing path.

In the state 2144, the process retrieves the predicted pose calculated in the state 2126 and perturbs the predicted pose. In one embodiment, the process adds simulated Gaussian random noise $(\epsilon_{x,m}, \epsilon_{y,m}, \epsilon_{\theta,m})^T$ to the predicted pose $S_{m,pred} = (x_{m,pred}, y_{m,pred}, \theta_{m,pred})^T = (S_{m,pred}(1), S_{m,pred}(2), S_{m,pred}(3))^T$ to produce the perturbed predicted pose $\tilde{S}_{m,pred}$. In one embodiment, the simulated Gaussian random noise $(\epsilon_{x,m}, \epsilon_{y,m}, \epsilon_{\theta,m})^T$ is sampled from a Gaussian distribution with mean $(0, 0, 0)^T$ and covariance $C_{odom}$.

Equation 12 expresses a calculation for the perturbed predicted pose. Equation 12 was described earlier in connection with FIG. 13. The process advances from the state 2144 to the state 2148.

In the state 2148, the process predicts or estimates the landmark pose $L_{m,meas}^k$ from the perturbed predicted pose $\tilde{S}_{m,pred}$ and from the visual measurements obtained from the visual localization module and/or the Pre-Filter module. Later, this predicted or estimated landmark pose $L_{m,meas}^k$ will be compared to a current landmark pose estimate $L_m^k$ from the current map of the landmark associated with the particle. Equation 14, discussed earlier in connection with FIG. 13, expresses one formula that can be used to predict the predicted landmark pose $L_{m,meas}^k$. The process advances from the state 2148 to the decision block 2150.

In the decision block 2150, the process determines whether to compute an importance factor $w_m$ for the particular particle or whether to use a uniform value for the importance factor $w_m$. When the determination made in the state 2109 indicates that the visual measurements are reliable, the process proceeds from the decision block 2150 to the state 2152 to compute a value for the importance factor $w_m$. Alternatively, if the determination was made in the state 2109 that the visual measurements currently in use are unreliable, then the process proceeds from the decision block 2150 to the state 2154, where the importance factors $w_m$ of all primary particles should be set to a uniform value, such as a constant with a value of 1, and the process advances from the state 2154 to the end of the loop 2156. It will be understood that the illustrated process can be modified or rearranged in a variety of ways. For example, the process can be rearranged to place the decision block 2150 after the decision block 2128 so that the state 2144 and the state 2148 can be skipped when visual measurements are considered unreliable.

In the state 2152, the process computes an importance factor $w_m$ for the primary processing path 2132. The importance factor $w_m$ can be computed by application of Equation 15 to Equation 18 described earlier in connection with FIG. 13. The process proceeds from the state 2152 to the end of the loop 2156.

The process repeats the loop by returning from the end of the loop 2156 to the beginning of the loop 2124 to process other particles. Otherwise, the process proceeds to a state 2178.

Returning now to the decision block 2128, processing of particles that are "dual" will now be described. The dual processing path 2136 starts at the state 2160.

In the state 2160, a hypothetical robot pose based on the current (last updated) pose estimate of the landmark, denoted $L_m^k$, and the acquired measurement of the landmark from the visual localization module and/or the Pre-Filter module, denoted $\Delta x$, $\Delta y$, and $\Delta \theta$ is computed. This produces a visually-estimated robot pose termed a "measured pose" $S_{m,meas}$, as illustrated in Equation 19, which was described earlier in connection with FIG. 13.

In the state 2164, the measured pose $S_{m,meas}$ is perturbed with random noise $(\epsilon_{x,m}, \epsilon_{y,m}, \epsilon_{\theta,m})^T$ to generate a perturbed measured pose $\tilde{S}_{m,meas}$. In one embodiment, the random noise $(\epsilon_{x,m}, \epsilon_{y,m}, \epsilon_{\theta,m})^T$ is sampled from a Gaussian distribution with mean $(0, 0, 0)^T$ and sensor covariance $C_{sensor}$. Equation 20 expresses a formula which can be used to calculate the perturbed measured pose $\tilde{S}_{m,meas}$. The process advances from the state 2164 to the decision block 2168.

In the decision block 2168, the process determines whether to compute an importance factor $w_m$ for the particular particle or whether to use a uniform value for the importance factor $w_m$. When the determination made in the state 2109 indicates that the dead reckoning measurements are reliable and also, in one embodiment, if the previous estimate of pose $S_{old}$ is considered reliable, the process proceeds from the decision block 2168 to the state 2172 to compute a value for the importance factor $w_m$. Alternatively, if the determination was made in the state 2109 that at least one of the dead reckoning measurement or in the optional state 2110 that the previous estimate of pose $S_{old}$ currently in use is unreliable, then the process proceeds from the decision block 2168 to the state 2154, where the importance factors $w_m$ of all dual particles should be set to a uniform value. For example, the uniform value can correspond to the constant value of 1, and the process advances from the state 2154 to the end of the loop 2156.

In the state 2172, the process computes an importance factor $w_m$ for the dual processing path 2136 by computing Equation 21, Equation 22, Equation 23, and Equation 24, which were described in greater detail earlier in connection with FIG. 13. Equation 24 corresponds to an expression for the computation of the importance factor $w_m$ for a dual particle. A scale factor of 1/f, such as ⅕, is applied in the computation of Equation 24 to account for real-life visual measurements, which may exhibit actual noise characteristics that differ from than that of Gaussian noise.

The process then advances from the state 2172 to the end of the loop 2156. The loop repeats until the processing of the particles is complete. When processing of the particles is complete, the process advances to the state 2178. In the illustrated process, the state 2178, a state 2182, a state 2186, and a state 2190 correspond to a sub-process for resampling particles in a probabilistic manner. An example of a sub-process useful for resampling particles in a probabilistic manner was described earlier in connection with Table 1, Table 2, the state 1378, the state 1382, the state 1386, and the state 1390, all of FIG. 13. Alternatively, if the dead reckoning measurements, the visual measurements, and/or the previous pose estimate $S_{old}$ are considered unreliable, then the resampling process may be skipped entirely. In particular, if both the dead reckoning measurements and the visual measurements are considered unreliable, a new set of samples generated from a uniform distribution should be used to estimate $S_{old}$ in the subsequent beginning of the loop 2124.

The process can proceed from the state 2190 to an optional state 2194. In the optional state 2194, the process combines the multiple particle data for applications in which a single pose estimate is desired. It will be understood that the pose from the particles can be combined in many ways. In one embodiment, the location and heading are computed according to an average of the poses, as expressed in Equation 26, Equation 27, and Equation 28, where $s_m = (t, x_m, y_m, \theta_m)$.

A composite pose $\overline{S}$ can be provided by the SLAM process and can be expressed by $\overline{S} = (\overline{x}, \overline{y}, \overline{\theta})^T$. This composite pose $\overline{S}$ can be provided as an input to, for example, a robot behavior control program such as a behavioral program for vacuum cleaning. In alternative examples of computing a composite pose $\overline{S}$, the composite pose can be weighted using probabilities and/or importance factors, can be averaged by selecting data only from high probability particles, and the like. The process advances from the optional state 2194 to a decision block 2196.

In the decision block 2196, the process considers whether the dead reckoning data and visual measurements in use are considered reliable, a determination that was made earlier in connection with the state 2109. If either the dead reckoning data, the visual measurements, or the previous pose estimate $S_{old}$ currently in use are considered unreliable, the process ends without updating any maps, i.e., the process ends with localization, but without updating the mapping. If, on the other hand, the dead reckoning data and the visual measurements currently in use are considered reliable, the process proceeds from the decision block 2196 to a state 2198.

At this point in the illustrated process, the robot poses for the particles have been updated and processed. In the state 2198, the process updates the maps for the particles by updating the landmark pose estimate $L_m^k$ for the observed landmark of a particle with a statistical filter. It will be understood that the state 2198 can include a loop to update the maps of each of the particles.

In one embodiment, a Kalman filter is used to update the landmark pose estimate $L_m^k$. An example of the Kalman filter was described earlier in connection with Equation 29 of FIG. 13.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

APPENDIX A

Incorporation by Reference of Commonly Owned Applications

The following patent applications, commonly owned and filed on the same day as the present application, are hereby incorporated herein in their entirety by reference thereto:

| Title | Application No. | Attorney Docket No. |
|---|---|---|
| "NON-SEQUENTIAL SELECTIVE INTEGRATION OF SENSOR DATA" | | EVOL.049A1 |
| "SEQUENTIAL SELECTIVE INTEGRATION OF SENSOR DATA" | | EVOL.049A2 |
| "ROBUST SENSOR FUSION FOR MAPPING AND LOCALIZATION IN A SIMULTANEOUS LOCALIZATION AND MAPPING (SLAM) SYSTEM" | | EVOL.049A3 |

What is claimed is:

1. A method in a visual simultaneous localization and mapping (VSLAM) system of fusing sensor measurements for localization of a mobile device, the method comprising:

using a probability density function p(x) represented by a plurality of particles to estimate a value for a pose of the mobile device, where the pose includes both location and orientation;

observing visual features that are associated with a landmark pose;

receiving an indication of whether dead reckoning data corresponding to a dead reckoning measurement is trustworthy, where the dead reckoning measurement corresponds to an incremental change in pose from a prior pose;

receiving an indication of whether visual data for a visual measurement is trustworthy, where the visual measurement is associated with the landmark pose;

if the dead reckoning data and the visual data are trustworthy, then performing:

apportioning a particle in the plurality of particles to one of at least a first subset and a second subset of the plurality of particles, where the first subset and the second subset are mutually exclusive;

performing for a particle associated with the first subset:

computing a predicted robot pose by combining the dead reckoning measurement and the prior pose for the particle;

perturbing the predicted robot pose to generate a perturbed predicted pose; and using the perturbed predicted robot pose as the estimate for the pose associated with the particle;

performing for a particle associated with the second subset:

retrieving the associated landmark pose;

using the associated landmark pose and the visual measurement to generate an estimated visual pose;

perturbing the estimated visual pose to generated a perturbed estimated visual pose; and using the perturbed estimated visual pose as the estimate for the value of the pose of the mobile device for the particle;

and, if one of the dead reckoning measurement and the visual measurement is not trustworthy, then performing:

estimating a first pose by using a selected one of the dead reckoning measurement and the visual measurement, where the selected one is trustworthy;

perturbing the first pose to generate a perturbed pose; and using the perturbed pose as the estimate for the value of the pose of the mobile device for the particle.

2. The method as defined in claim 1, wherein the sensor measurements are fused to compensate for errors in sensor measurements.

3. The method as defined in claim 1, further comprising if none of the dead reckoning measurement and the visual measurement is trustworthy, then not updating the estimate for the value of the pose with the dead reckoning measurement or the visual measurement.

4. The method as defined in claim 1, further comprising determining that a dead reckoning measurement is trustworthy when both the dead reckoning measurement itself is trustworthy and the prior pose is trustworthy.

5. The method as defined in claim 1, wherein if the dead reckoning data and the visual data are trustworthy, further updating a global landmark pose corresponding to the visual measurement for the maps of the particles using the dead reckoning measurement and visual data.

6. A method in a simultaneous localization and mapping (SLAM) system of fining sensor measurements for localization of a mobile device, the method comprising:

(a) using a probability density function p(x) represented by a plurality of particles to estimate a value for a pose of the mobile device, where the pose includes both location and orientation (b) in the absence of an observation of a globally-referenced measurement, using a dead reckoning measurement and a prior pose to estimate a current pose for a particle, (c) when a globally-referenced measurement is observed, then:

(d) allocating the particles according to sensors that are providing trustworthy measurements so that a particle is associated with a sensor;

(e) performing (f) and (g), for a particle:

(f) estimating a new pose for the particle by using a measurement from an associated sensor for estimation of pose end perturbing the estimation of pose to generate the new pose;

(g) generating an importance factor for the particle based at least partially on whether at least one trustworthy measurement other than the measurement used to compute the pose for the particle is available; and (h) repeating at least a portion of (f) and (g) for other particles; and (i) resampling the particles with replacement using the generated importance factors to at least partially influence a probability with which a particle will be resampled.

7. The method as defined in claim 6, wherein the sensor measurements are fined to compensate for errors in sensor measurements.

8. The method as defined in claim 6, wherein estimating the new pose for the particle further comprises, when the measurement corresponds to a dead reckoning measurement, using the measurement from the dead reckoning sensor and a prior pose for the particle.

9. The method as defined in claim 6, wherein generating an importance factor further comprises:
if measurements from one or more other sensors are also considered trustworthy, then using corresponding measurements from the one or more other sensors to compute a second pose for the particle and to generate the importance factor at least partially based on a comparison between the second pose and the new pose; and
otherwise, setting the importance factor to a uniform value.

10. The method as defined in claim 6, wherein generating an importance factor further comprises:
if measurements from one or more other sensors are also considered trustworthy, then using corresponding measurements from the one or more other sensors to compute a second pose for the particle and to generate the importance factor at least partially based on a comparison between the second pose and the new pose; and
otherwise, setting the importance factor using predefined criteria.

11. The method as defined in claim 6, wherein generating an importance factor further comprises:
if measurements from one or more other sensors are also considered trustworthy, then using corresponding measurements from the one or more other sensors to compute a second pose for the particle and to generate the importance factor at least partially based on a comparison between the second pose and the new pose; and
otherwise, setting the importance factor to a predetermined value.

12. The method as defined in claim 6, further comprising determining that a dead reckoning measurement is trustworthy when both the dead reckoning measurement itself is trustworthy and the prior pose is trustworthy.

13. The method as defined in claim 6, wherein the globally-referenced measurement corresponds to a difference between a global landmark pose that is visually recognized and a pose that is being estimated.

14. The method as defined in claim 6, further comprising:
determining that at least the globally-referenced measurement and a dead reckoning measurement are both trustworthy; and
at least partially in response to the determination of trustworthiness, updating a global landmark pose corresponding to the globally-referenced measurement for a map corresponding to the particle by using the dead reckoning measurement and the globally referenced measurement.

15. A method of integrating measurements from a plurality of sensors to estimate a multi dimensional value x, the method comprising:

using a probability density function $p(x)$ to estimate the multi-dimensional value x, where the probability density function $p(x)$ is represented by a plurality of particles;
determining whether at least two measurements from the plurality of sensors are trustworthy, and if so, then performing for a particle:
selecting a trustworthy measurement from the plurality of sensors,
using the selected trustworthy measurement to update the multi-dimensional value x for the particle;
otherwise, if only one measurement is trustworthy, updating the particles with the trustworthy measurement; and
otherwise, if no measurement is trustworthy, then not updating the particles.

16. The method as defined in claim 15, wherein using the selected trustworthy measurement to update the multi-dimensional value x for the particle further comprises computing the updated value for the multi-dimensional value x with the selected trustworthy measurement independently of other measurements from other sensors.

17. The method as defined in claim 15, wherein using the randomly selected trustworthy measurement to update the multi-dimensional value x km the particle further comprises combining a prior estimate of the multi-dimensional value x with the trustworthy measurement to update the multi-dimensional value x.

18. The method as defined in claim 16, wherein performing for the particle further comprises:
using a trustworthy measurement other than the trustworthy measurement used to calculate the updated multi-dimensional value x to calculate an alternative estimate for the multi-dimensional value x;
perturbing the updated multi-dimensional value x;
comparing the updated multi-dimensional value x to the alternative estimate for the multi-dimensional value x; and
generating an importance factor based on the comparison that is associated with the particle and is used for resampling of particles.

19. A method of integrating measurements from a plurality of sensors to estimate a value x, the method comprising:
using a probability density function $p(x)$ to estimate the value x in a mobile device, where the probability density function $p(x)$ is represented by a plurality of particles;
determining which of the measurements from the plurality of sensors are trustworthy; and
at least partially in response to determining that two or more of the measurements are trustworthy, updating the probability density function $p(x)$ with the two or more trustworthy measurements to integrate the measurements, wherein for a particular particle of the probability density function $p(x)$, a new value x for the particle is calculated without using at least a selected one of the two or more trustworthy measurements.

20. The method as defined in claim 19, further comprising randomly selecting the one or more trustworthy measurements that are not used to calculate the new value x.

21. The method as defined in claim 19, further comprising:
using the at least one unused trustworthy measurement to compute a second value associated with the particle; and
resampling the updated particles to generate an updated probability density function $p(x)$, wherein the second value affects a probability with which the particle is resampled.

* * * * *